(12) United States Patent
Gunn et al.

(10) Patent No.: US 7,716,579 B2
(45) Date of Patent: May 11, 2010

(54) DATA ENTRY FOR PERSONAL COMPUTING DEVICES

(75) Inventors: Harold David Gunn, Vancouver (CA); John Chapman, Vancouver (CA)

(73) Assignee: 602531 British Columbia Ltd. (CA)

( * ) Notice: Subject to any disclaimer, the term of this patent is extended or adjusted under 35 U.S.C. 154(b) by 45 days.

(21) Appl. No.: 11/133,770

(22) Filed: May 19, 2005

(65) Prior Publication Data

US 2005/0210402 A1 Sep. 22, 2005

Related U.S. Application Data

(60) Division of application No. 09/631,101, filed on Aug. 1, 2000, now Pat. No. 7,293,231, which is a continuation of application No. PCT/CA00/00285, filed on Mar. 15, 2000, which is a continuation-in-part of application No. 09/272,700, filed on Mar. 18, 1999, now abandoned.

(51) Int. Cl.
*G06F 17/00* (2006.01)
(52) U.S. Cl. ............. 715/256; 715/261; 715/268; 715/760; 345/179; 382/187
(58) Field of Classification Search ........... 715/530, 715/531, 534, 541, 255, 256, 261, 268; 365/189.01; 345/156, 173, 179; 382/187
See application file for complete search history.

(56) References Cited

U.S. PATENT DOCUMENTS 3,644,898 A * 2/1972 Post ........................... 715/534
4,211,497 A    7/1980 Montgomery ............... 400/486
4,330,845 A * 5/1982 Damerau .................... 715/507
4,396,992 A    8/1983 Hayashi et al. ............. 364/900
4,471,459 A * 9/1984 Dickinson et al. .......... 715/533
4,499,553 A    2/1985 Dickinson et al.
4,559,598 A   12/1985 Goldwasser et al. ........ 364/419
4,648,044 A * 3/1987 Hardy et al. ................ 706/60

(Continued)

FOREIGN PATENT DOCUMENTS

EP          0 352 377 A1      1/1990

(Continued)

OTHER PUBLICATIONS

SofType Version 3.1 Screendumps generated from demo version of software, downloaded from <"http://onn.com/bmanes/st31dmz.exe">, 21 Figures.*

(Continued)

*Primary Examiner*—Doug Hutton
*Assistant Examiner*—James H Blackwell
(74) *Attorney, Agent, or Firm*—Townsend and Townsend and Crew LLP

(57) ABSTRACT

A method, system and computer-readable media for supporting text entry on a personal computing device by activating automated searching to search for completion candidates which are based on a partial text entry received from a user. The completion candidates are displayed in a search list. The user may select a completion candidate from among the completion candidates in the search list to correspondingly modify the partial text entry, or the user may decline all of the completion candidates displayed in the search list and terminate the automated searching. The system may further provide a digital keyboard for use in entering text.

29 Claims, 23 Drawing Sheets

U.S. PATENT DOCUMENTS

| | | | |
|---|---|---|---|
| 4,689,768 A * | 8/1987 | Heard et al. | 715/533 |
| 4,730,252 A | 3/1988 | Bradshaw | 364/403 |
| 4,744,050 A | 5/1988 | Hirosawa et al. | 364/900 |
| 4,774,666 A | 9/1988 | Miyao et al. | 364/419 |
| RE32,773 E | 10/1988 | Goldwasser et al. | 364/419 |
| 4,782,464 A | 11/1988 | Gray et al. | |
| 4,783,761 A * | 11/1988 | Gray et al. | 715/533 |
| 4,786,765 A * | 11/1988 | Yamanami et al. | 178/19.06 |
| 4,807,181 A | 2/1989 | Duncan, IV et al. | 364/900 |
| 4,847,766 A * | 7/1989 | McRae et al. | 715/532 |
| 4,891,786 A | 1/1990 | Goldwasser | 364/900 |
| 4,969,097 A | 11/1990 | Levin | 364/419 |
| 4,980,855 A * | 12/1990 | Kojima | 715/533 |
| 5,040,113 A | 8/1991 | Mickunas | 364/419 |
| 5,060,154 A | 10/1991 | Duncan, IV | |
| 5,067,165 A | 11/1991 | Nishida | |
| 5,096,423 A | 3/1992 | Goldwasser | 434/118 |
| 5,203,704 A | 4/1993 | McCloud | 434/156 |
| 5,220,649 A | 6/1993 | Forcier | 715/541 |
| 5,220,652 A | 6/1993 | Rowley | 395/275 |
| 5,258,748 A | 11/1993 | Jones | |
| 5,261,112 A * | 11/1993 | Futatsugi et al. | 715/533 |
| 5,297,041 A | 3/1994 | Kushler et al. | 364/419.15 |
| 5,305,205 A | 4/1994 | Weber et al. | |
| 5,327,161 A | 7/1994 | Logan et al. | 345/157 |
| 5,329,609 A | 7/1994 | Sanada et al. | |
| 5,347,295 A | 9/1994 | Agulnick et al. | 345/156 |
| 5,392,447 A * | 2/1995 | Schlack et al. | 715/863 |
| 5,487,616 A | 1/1996 | Ichbiah | 400/489 |
| 5,500,935 A | 3/1996 | Moran et al. | 395/156 |
| 5,559,942 A * | 9/1996 | Gough et al. | 715/802 |
| 5,574,482 A | 11/1996 | Niemeier | 345/173 |
| 5,594,640 A * | 1/1997 | Capps et al. | 715/532 |
| 5,596,699 A | 1/1997 | Driskell | 395/352 |
| 5,606,674 A * | 2/1997 | Root | 715/769 |
| 5,621,641 A | 4/1997 | Freeman | 395/796 |
| 5,623,406 A | 4/1997 | Ichbiah | 395/753 |
| 5,649,223 A | 7/1997 | Freeman | 395/796 |
| 5,657,397 A * | 8/1997 | Bokser | 382/225 |
| 5,666,139 A | 9/1997 | Thielens et al. | |
| 5,689,667 A | 11/1997 | Kurtenbach | 395/352 |
| 5,704,029 A | 12/1997 | Wright, Jr. | 715/505 |
| 5,724,457 A | 3/1998 | Fukushima | |
| 5,734,749 A | 3/1998 | Yamada et al. | |
| 5,745,116 A | 4/1998 | Pisutha-Arnond | 345/358 |
| 5,790,115 A | 8/1998 | Pleyer et al. | |
| 5,805,158 A | 9/1998 | Bertram et al. | |
| 5,805,159 A | 9/1998 | Bertram et al. | |
| 5,805,167 A | 9/1998 | Van Cruyningen | 345/353 |
| 5,805,911 A | 9/1998 | Miller | 395/796 |
| 5,812,697 A | 9/1998 | Sakai et al. | |
| 5,818,437 A | 10/1998 | Grover et al. | |
| 5,821,512 A * | 10/1998 | O'Hagan et al. | 235/383 |
| 5,835,635 A * | 11/1998 | Nozaki et al. | 382/226 |
| 5,838,302 A | 11/1998 | Kuriyama et al. | |
| 5,845,300 A * | 12/1998 | Comer et al. | 715/508 |
| 5,864,340 A | 1/1999 | Bertram et al. | |
| 5,881,169 A | 3/1999 | Henry, Jr. | |
| 5,896,321 A | 4/1999 | Miller et al. | 365/189.01 |
| 5,911,485 A | 6/1999 | Rossman | |
| 5,914,708 A | 6/1999 | LaGrange et al. | 345/179 |
| 5,926,178 A | 7/1999 | Kurtenbach | 345/352 |
| 5,943,039 A | 8/1999 | Anderson et al. | 345/146 |
| 5,953,541 A | 9/1999 | King et al. | |
| 5,959,629 A | 9/1999 | Masui | 345/347 |
| 5,963,666 A * | 10/1999 | Fujisaki et al. | 382/187 |
| 5,963,671 A | 10/1999 | Comerford et al. | 382/230 |
| 5,974,558 A * | 10/1999 | Cortopassi et al. | 713/323 |
| 5,977,887 A | 11/1999 | Grimmett | |
| 5,977,948 A * | 11/1999 | Nishibori | 715/841 |
| 5,982,351 A * | 11/1999 | White et al. | 715/810 |
| 6,002,390 A | 12/1999 | Masui | 345/173 |
| 6,005,549 A | 12/1999 | Forest | 345/157 |
| 6,008,799 A | 12/1999 | Van Kleeck | 345/173 |
| 6,011,554 A | 1/2000 | King et al. | |
| 6,026,233 A * | 2/2000 | Shulman et al. | 717/113 |
| 6,037,942 A * | 3/2000 | Millington | 715/835 |
| 6,084,576 A | 7/2000 | Leu et al. | 345/168 |
| 6,088,649 A | 7/2000 | Kadaba et al. | |
| 6,094,197 A | 7/2000 | Buxton et al. | 345/863 |
| 6,097,392 A * | 8/2000 | Leyerle | 715/863 |
| 6,097,841 A | 8/2000 | Gunji et al. | |
| 6,098,086 A | 8/2000 | Krueger et al. | |
| 6,101,461 A | 8/2000 | Ukigawa et al. | |
| 6,111,985 A | 8/2000 | Hullender et al. | |
| 6,144,378 A | 11/2000 | Lee | |
| 6,154,758 A | 11/2000 | Chiang | |
| 6,167,411 A * | 12/2000 | Narayanaswamy | 715/541 |
| 6,167,412 A * | 12/2000 | Simons | 708/105 |
| 6,188,789 B1 | 2/2001 | Marianetti, II et al. | 382/189 |
| 6,256,030 B1 | 7/2001 | Berry et al. | |
| 6,262,719 B1 | 7/2001 | Bi et al. | 345/179 |
| 6,275,612 B1 | 8/2001 | Imoto | |
| 6,282,315 B1 * | 8/2001 | Boyer | 382/177 |
| 6,286,064 B1 | 9/2001 | King et al. | |
| 6,292,179 B1 | 9/2001 | Lee | 345/173 |
| 6,295,372 B1 | 9/2001 | Hawkins et al. | 382/187 |
| 6,307,549 B1 | 10/2001 | King et al. | 345/352 |
| 6,369,807 B1 | 4/2002 | Nakashima | 345/179 |
| 6,377,965 B1 | 4/2002 | Hachamovitch et al. | 715/534 |
| 6,405,060 B1 * | 6/2002 | Schroeder et al. | 455/566 |
| 6,442,295 B2 * | 8/2002 | Navoni et al. | 382/229 |
| 6,473,006 B1 | 10/2002 | Yu et al. | |
| 6,487,424 B1 | 11/2002 | Kraft et al. | |
| 6,502,114 B1 | 12/2002 | Forcier | |
| 6,539,421 B1 | 3/2003 | Appelman et al. | 709/206 |
| 6,621,939 B1 * | 9/2003 | Negishi et al. | 382/291 |
| 6,654,733 B1 | 11/2003 | Goodman et al. | 706/52 |
| 6,661,920 B1 | 12/2003 | Skinner | 382/187 |
| 6,751,603 B1 * | 6/2004 | Bauer et al. | 707/1 |
| 6,801,190 B1 | 10/2004 | Robinson et al. | |
| 6,888,141 B2 * | 5/2005 | Carr | 250/338.1 |
| 6,934,906 B1 * | 8/2005 | Cheok | 715/500.1 |
| 6,970,513 B1 * | 11/2005 | Puri et al. | 375/240.25 |
| 6,978,421 B1 | 12/2005 | Aida | |
| 7,003,446 B2 * | 2/2006 | Trower et al. | 704/9 |
| 7,224,409 B2 * | 5/2007 | Chin et al. | 348/732 |
| 7,293,231 B1 | 11/2007 | Gunn et al. | |
| 7,322,023 B2 | 1/2008 | Shulman et al. | |
| 2001/0000962 A1 * | 5/2001 | Rajan | 345/302 |
| 2001/0027468 A1 * | 10/2001 | Okura | 709/202 |
| 2002/0067377 A1 | 6/2002 | McGovern | 345/816 |
| 2002/0087279 A1 | 7/2002 | Hall | |
| 2003/0137605 A1 | 7/2003 | Chin et al. | |
| 2005/0198144 A1 * | 9/2005 | Kraenzel et al. | 709/206 |
| 2005/0210020 A1 | 9/2005 | Gunn et al. | |
| 2005/0223308 A1 | 10/2005 | Gunn et al. | |
| 2007/0188472 A1 | 8/2007 | Ghassabian | |

FOREIGN PATENT DOCUMENTS

| | | |
|---|---|---|
| EP | 0 643 357 A2 | 3/1995 |
| EP | 0 643 357 A3 | 3/1996 |
| EP | 0 844 570 A2 | 5/1998 |
| EP | 0 844 571 A2 | 5/1998 |
| EP | 0 858 023 A2 | 8/1998 |
| EP | 0472444 B1 | 8/1998 |
| EP | 0 858 023 A3 | 9/1998 |
| EP | 0 844 570 A3 | 8/1999 |
| EP | 0 844 571 A3 | 8/1999 |
| EP | 0982676 A1 | 3/2000 |
| JP | 10105324 A | 4/1998 |
| JP | 10154033 A | 6/1998 |
| JP | 10154144 A | 6/1998 |

| | | |
|---|---|---|
| JP | 11143614 | 5/1999 |
| JP | 11167569 A | 6/1999 |
| JP | 10333818 | 4/2002 |
| WO | WO 96/09579 | 3/1996 |
| WO | WO 98/11480 | 3/1998 |
| WO | WO 99/28811 | 6/1999 |
| WO | WO 01/95095 A2 | 12/2001 |
| WO | WO 2004/107101 A2 | 12/2004 |

OTHER PUBLICATIONS

SofType 3.1 Help File, circa 1997, downloaded from <"http://onn.com/blnanes/st31dmz.exe">, 38 pages.*

Toshiyuki Masui, Sony Computer Science Laboratory Inc., Shinagawa, Tokyo, "An Efficient Text Input Method for Pen-based Computers", Proceedings of the ACM Conference on Human Factors in Computing Systems, Apr. 1998, pp. 328-335.

Toshiyuki Masui, Sony Computer Science Laboratories, Inc., Shinagawa, Tokyo, "Integrating Pen Operations for Composition by Example".

Don Hopkins, "The Design and Implementation of Pie Menus", Dr. Dobb's Journal, Dec. 1991 (http://art.ned/~hopkins/Don/piemenus/ddj/piemenus.hml).

Jason I. Hong, "Java Pie Menus", Sep. 4, 1999 (jttp://www.cs.berkeley.edu/~jasonh/download/sotware/piemenu/).

Don Hopkins, "A Description of Pie Menus" (http://catalog.com/hopkins/piemenus/PieMenuDescription.html).

Don Hopkins, "Natural Selection: The Evolution of Pie Menus", BayCHI, Oct. 13, 1998 (http://catalog.com/hopkins/piementis/Natural Selection.html).

Russell Nelson, "Pie Menu Window Manager", Jun. 3, 1998 (http://www.crynwr.com/piewm/).

Don Hopkins, "ActiveX Pie Menus" (http://catalog.com/hopkins/piemenus/ActiveXPieMenus.html).

Don Hopkins, "Pie Menu References" (http://catalog.com/hopkins/piemenu-references.html).

Don Hopkins, "Pie Menus" (http://art.net/~hopkins/Don/piemenus/index.html).

Tom Nantais, et al., IEEE Transactions on Rehabilitation Engineering, "A Predictive Selection Technique for Single-Digit Typing With a Visual Keybaord", No. 3 Sep. 1994.

"GtkPieMenu" 1999 orfelyus (2 pages).

Operation Guide; 1997; 2 pages; Mercedes-Benz of North America, Inc.; Montvale, New Jersey, United States.

Auto Pilot System—Operation Guide; 1998; 2 pages; Mercedes-Benz AG; Germany.

COMAND Betriebsanleitung- Operation Guide; 1998; 3 pages; Mercedes-Benz AG; Germany.

3Com. "PalmPilot™ Handbook," 1997, 3Com Corporation, Table of Contents and pp. 37-39.

Advisory Action dated Sep. 16, 2005, issued in related U.S. Appl. No. 09/631,101, filed Aug. 1, 2000.

Baeza-Yates, R.A. et al. "A New Approach to Text Searching (Preliminary Version)," Oct. 1992, Communications of the ACM, vol. 35, No. 10, pp. 74-82.

Bellman, T. et al. "A Probabilistic Character Layout Strategy for Mobile Text Entry," Proceedings of Graphics Interface '98, 1998, Canadian Information Processing Society: Toronto, pp. 168-176.

Bohan, M. et al. "A Psychophysical Comparison of Two Stylus-Driven Soft Keyboards," 1998, Department of Psychology, Wichita State University: Wichita, Kansas, six pages.

Callan, J. et al. "An Empirical Comparison of Pie vs. Linear Menus," May 15-19, 1988, Proceedings of the CHI '88 Conference on Human Factors in Computing Systems, Washington, D.C., pp. 95-100, Abstract.

Darragh, J.J. et al. "The Reactive Keyboard: A Predictive Typing Aid," Nov. 1990, IEEE Computer, vol. 23, No. 11 pp. 41-49.

European Examination Report dated Feb. 7, 2002, issued in related European Application No. 00 910 460.5.

Euroepan Examination Report dated Nov. 8, 2004, issued in related European Application No. 01 981 991.1.

European Examination Report dated Jun. 23, 2005, issued in related European Application No. 01 981 991.1.

Garay-Vitoria, N. et al. "A Comparison of Prediction Techniques to Enhance the Communication Rate," 2004, UI4AII, LNCS, Springer-Verlag, vol. 3196, pp. 400-417.

International Preliminary Examination Report dated Jun. 19, 2001, issued in related PCT Application No. PCT/CA00/00285 filed Mar. 15, 2000.

International Preliminary Examination Report dated Sep. 12, 2003, issued in related PCT Application No. PCT/CA01/01473 filed Oct. 18, 2001.

Jones, P.E. "Virtual Keyboard with Scanning and Augmented by Prediction," 1998, Proc. 2nd Euro. Conf. Disability Virtual Reality & Assoc. Tech. Skovde, Sweden, pp. 45-51.

MacKenzie, I.S. et al. "Alphanumeric Entry on Pen-Based Computers," 1994, International Journal of Human-Computer Studies vol. 41, pp. 775-792, located at <http://www.yorku.ca/mack/IJHCS.html>, last visited on Nov. 30, 2006, eighteen pages.

MacKenzie, I.S. et al. "Text Entry Using Soft Keyboard," 1999, Behaviour & Information Technology, vol. 18, pp. 235-244, located at <http://www.yorku.ca/mack/BIT3.html>, last visited on Nov. 30, 2006, fifteen pages.

MacKenzie, I.S. et al. "The Design and Evaluation of a High-Performance Soft Keyboard," May 15-20, 1999, ACM, pp. 25-31.

Mankoff, J. et al. "Cirrin: A World-Level Unistroke Keyboard for Pen Input," 1998, ACM, pp. 213-214.

Masui, T. "POBox: An Efficient Text Input Method for Handheld and Ubiquitous Computers," Date Unknown, Proc. of 1st Intl. Symp. on Handheld and Ubiquitous Computing, Computer Science, vol. 1707, pp. 289-300.

Notice of Allowability dated Aug. 8, 2007, issued in related U.S. Appl. No. 09/631,101, filed Aug. 1, 2000.

Office Action dated Jan. 20, 2004, issued in related U.S. Appl. No. 09/631,101, filed Aug. 1, 2000.

Office Action dated Jan. 14, 2005, issued in related U.S. Appl. No. 09/631,101, filed Aug. 1, 2000.

Office Action dated Jun. 14, 2005, issued in related U.S. Appl. No. 09/631,101, filed Aug. 1, 2000.

Office Action dated Mar. 20, 2006, issued in related U.S. Appl. No. 09/631,101, filed Aug. 1, 2000.

Office Action dated Oct. 18, 2006, issued in related U.S. Appl. No. 10/399,560, filed Apr. 18, 2003.

Office Action dated Jan. 5, 2007, issued in related U.S. Appl. No. 09/631,101, filed Aug. 1, 2000.

Office Action dated May 18, 2007, issued in related U.S. Appl. No. 11/134,759, filed May 19, 2005.

Office Action dated Jun. 4, 2007, issued in related U.S. Appl. No. 09/631,101, filed Aug. 1, 2000.

Office Action dated Jul. 17, 2007, issued in related U.S. Appl. No. 10/399,560, filed Apr. 18, 2003.

Venolia, D. et al. "T-Cube: A Fast, Self-Disclosing Pen-Based Alphabet," Apr. 24-28, 1994, Human Factors in Computing Systems, Boston, MA, pp. 265-270.

Wu, S. et al "AGREP—A Fast Approximate Pattern-Matching Tool." Jan. 1992, Proceedings of USENIX Technical Conference, San Francisco, CA, pp. 153-162.

Office Action dated Jan. 26, 2009 for U.S. Appl. No. 11/036,267.

Office Action dated Jan. 26, 2009 for U.S. Appl. No. 11/134,810.

Office Action dated Feb. 4, 2009 for U.S. Appl. No. 11/134,759.

SofType 3.1 Help File, circa 1997, downloaded from <http://orin.com/binaries/st31dmz.exe>, 38 pages.

SofType Version 3.1 Screendumps generated from demo version of software, downloaded from <http://orin.com/binaries/st31dmz.exe>, 21 Figures.

Bohlman, Eric, "KeyCache—The Universal Input Accelerator, Version 2.1," copyright Sep. 29, 1994, OMS Development, documentation, downloaded from <http://www.sac.sk/files.php?d=16&I=K>, 12 pages.

NCIP, listing of Word Prediction & Writing Tools, circa 1997, downloaded from <http://www2.edc.org/ncip/LIBRARY/wp/Pubs.htm>, 7 pages.

National Council on Disability Document Archive, software guide to alternative input and output programs, circa 1996, downloaded from <http://www.dimenet.com/disnews/archive.php?mode=P&id=49>, 12 pages.

Wivik 2 REP Software manual, circa Feb. 1998, Orentke Romich Company, downloaded from <http://web.archive.org/web/20001204165600/wivik.com/html/downloads.htm>, 128 pages.

Office Action dated Apr. 15, 2008 issued for U.S. Appl. No. 10/399,560.

Office Action dated Apr. 3, 2008 issued for U.S. Appl. No. 11/134,759.

Office Action dated Apr. 30, 2008 issued for U.S. Appl. No. 11/036,267.

Office Action dated Jan. 7, 2009 issued for U.S. Appl. No. 10/399,560.

Office Action dated Sep. 29, 2009 issued for U.S. Appl. No. 10/399,560.

Office Action dated Nov. 24, 2009 issued for U.S. Appl. No. 11/036,267.

Notice of Allowance dated Nov. 30, 2009 issued for U.S. Appl. No. 11/134,810.

* cited by examiner

DATA ENTRY FOR PERSONAL COMPUTING DEVICES

CROSS-REFERENCES TO RELATED APPLICATIONS

This application is a Divisional of application Ser. No. 09/631,101, filed Aug. 1, 2000 now U.S. Pat. No. 7,293,231; which is a Continuation of PCT application PCT/CA00/00285, filed Mar. 15, 2000; which is a Continuation-In-Part of application Ser. No. 09/272,700, filed Mar. 18, 1999 now abandoned.

FIELD OF THE INVENTION

The present invention relates generally to computer-assisted data entry and more particularly to a method, system, and apparatus for computer-assisted text generation and entry using a pointing device with a personal computing device, and to computer-readable media having executable instructions for supporting text generation and entry using a pointing device.

BACKGROUND OF THE INVENTION

The wide-spread adoption of miniaturized personal computing devices, such as hand-held devices and personal digital assistants (PDAs), has led to an increasing use of devices to send and receive text and data. One example of this trend is pen-based computing, wherein users enter text and commands into hand-held personal computers via a touch-sensitive screen. While such pen-based computing is popular, especially with the increasing power of miniature computing devices, it does present challenges to a user entering data in an application running on the hand-held device. For instance, many hand-held computers and personal digital assistants require that the user enter data according to a predetermined scripting style, such as with the PalmPilot™ series of PDAs. Other hand-held devices provide a handwriting recognition system which requires that the computer learn the user's handwriting style. While such data entry mechanisms are useful, they are relatively difficult to use and complex to learn and can be prone to error in the event the user deviates from the predetermined scripting style or the user's traditional handwriting style.

Many pen-based computing systems, both large and small, offer the user the option to enter text using an on-screen digital keyboard. On-screen digital keyboards are typically miniaturized replica of conventional full-sized physical keyboards, such as QWERTY keyboards. Many on-screen keyboards have shown themselves to be less than efficient for entering text. When using a pointing device such as a pen, a user is typically required to enter text one character at a time by tapping out individual character selections from the on-screen keyboard. This "hunt-and-peck" method of typing with a single pointing device is time-consuming, especially when a user is entering large amounts of data.

Another common challenge when entering data into a personal computing device with a single pointing device such as a pen or stylus, and in particular when entering text, is that each letter making up the word or phrase must be entered manually. The longer the word or phrase, the greater the amount of manual entry required.

Text completion systems have been developed in an effort to assist users with text entry. In general, these systems predict and suggest a complete word completion based on a partial text entry entered by a user. These systems allow a user to type in the partial text entry and then accept a predicted text completion for the partial text entry. This avoids the keystrokes that would otherwise be required to type the complete text desired by a user. While such text completion systems provide some basic assistance for users to more rapidly enter text than would be required if every character of the desired text had to be typed in independently, there remains a need in the art for a more flexible text completion system for use with a single pointing device. It would also be desirable for such a text completion system to employ a convenient selection technique which would reduce the amount of movement of the pointing device required to enter text into a computer. It would further be desirable if such a system were applicable to both large and small personal computing devices.

Another problem in the art is that soft, or digital, keyboards have tended to be continually displayed so as to permanently consume screen space or have needed to be manually invoked and dismissed by the user. It would be desirable if a digital keyboard could automatically appear and disappear as required.

SUMMARY OF THE INVENTION

The above and related desires are addressed in the present invention by providing a novel and non-obvious method, system and computer-readable instructions for computer-assisted text generation and entry using a pointing device with a personal computing device.

In one aspect of the present invention the user can rapidly enter and search for text using a data entry system through a combination of entering one or more characters on a digitally displayed keyboard with a pointing device and using a search list to obtain a list of completion candidates. The user can activate the search list to obtain a list of completion candidates at any time while entering a partial text entry with the data entry system. When the search list is active, a list of completion candidates is displayed on a graphical user interface for the user to select from and the user can perform one of several actions. The user can deactivate the search list and return to modifying the current partial text entry and other text. The user can select one of the completion candidates in the search list and use the selected completion candidate to replace the partial text entry which the user is currently entering. When the user deactivates the interactive search list, the user can immediately continue adding to or modifying the current partial text entry being entered, and may re-invoke the search list to further search for completion candidates based on the modified partial text entry. In the second case, the selected completion candidate is used to replace the partial text entry that the user is currently entering, and the data entry system begins monitoring for a new partial text entry from the user.

In one embodiment, when the search list is active the user may use one of the completion candidates in the search list to initiate a further automated search to obtain a more refined list of completion candidates. In this embodiment, multi-level search lists and searching are available to help accelerate completion of a partial text entry. As a result, the user can automatically initiate an iterative search wherein a completion candidate listed in the search list is used as the new partial text entry to dynamically obtain a new list of completion candidates, which is then displayed in the search list. The automated ability to use the search list to obtain a refined list of completion candidates allows the user to quickly make good use of search results that are only partially successful. When the search list is revised with a new list of completion candidates, the user can then choose one of the completion candidates in the new list, or the user can repeat the iterative search process once again by choosing one of the completion candidates in the new list and activating a further iterative search. In addition, the user may return to keyboard entry with the last completion candidate selected by the user in the previous iteration of the search list. This latter feature provides the user with the convenience of being able to automatically and seamlessly continue entering the desired word, phrase, or character sequence using the last completion candidate selected by the user in the previous iteration of the interactive search list. Thus, the user can quickly and easily replace the user's current partial text entry with a partially successful completion candidate and continue building upon or modifying this partial completion candidate using the keyboard while at the same time allowing the user the flexibility to re-enter the search list at any time.

In another aspect of the present invention, there is provided a method of processing text entered into a personal computing device with a pointing device. With this method, a partial text entry is received and used to obtain a dynamically generated list of completion candidates. The list of completion candidates is displayed in a search list within a graphical user interface. A user input signal associated with the pointing device is received. If the user input signal corresponds to a first type of user selection with the pointing device, then the search list is deactivated. If the user input signal corresponds to a second type of user selection with the pointing device, then the partial text entry is replaced with a completion candidate from the search list.

In one embodiment, if the user input signal corresponds to a third type of user selection with the pointing device, then a refined list of completion candidates is dynamically obtained based on one of the completion candidates from the search list. The refined list is displayed in the search list for further user selection.

In another aspect of the present invention, there is provided a method of processing an input string at least partially entered into a personal computing device with a pointing device. This aspect includes performing a search of a set of completion candidates to locate a plurality of possible completion candidates for completing the input string in response to a prior located possible completion candidate or a character selectable by a user. At least one of the plurality of possible completion candidates and characters selectable by the user are displayed.

In another aspect of the present invention, a method is provided of user-based text entry. With this aspect, a set of position coordinates for a pointing device is monitored relative to a user interface and a digital keyboard is displayed on the user interface at a last known set of coordinates for the pointing device whenever the digital keyboard is activated for user input.

In another aspect of the present invention, a method is provided for interchanging the display of a digital keyboard and a search list. The digital keyboard is displayed on a user interface when a user is entering text a keystroke at a time. As the digital keyboard is displayed, user input is monitored. If the user input corresponds to activating the search list, then the digital keyboard is replaced with the search list. If the user input corresponds to terminating use of the search list once activated, then the search list is replaced with the digital keyboard.

In another aspect of the present invention, a digital keyboard is configured to include a plurality of characters assigned to predetermined locations within a layout for the digital keyboard according to a predetermined frequency distribution associated with the plurality of characters. The plurality of characters includes less commonly used characters and more commonly used characters based on the predetermined frequency distribution. The digital keyboard is displayed on a graphical user interface with the less commonly used characters displayed substantially further from a center of the digital keyboard than the more commonly used characters.

In another aspect of the present invention there is provided a system for computer-assisted text generation and entry. The system includes an input interface, a processing unit and a computer-readable medium. The input interface receives user input signals based on actions with a pointing device. The computer-readable medium contains computer-readable instructions for directing the processing unit to assist with text generation and entry based on user input received via the input interface with the pointing device. The computer-readable medium includes instructions for receiving a partial text entry; for obtaining a dynamically generated list of completion candidates based on the partial text entry; for displaying the list of completion candidates in a search list on a display device; and for receiving a user input signal associated with the pointing device from the input interface. If the user input signal corresponds to a first type of user selection with the pointing device, the computer-readable instructions are programmed to deactivate the search list. If the user input signal corresponds to a second type of user selection with the pointing device, the computer-readable instructions are programmed to replace the partial text entry with a completion candidate from the search list.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

In the accompanying drawings which illustrate embodiments of the invention.

Figure 1:
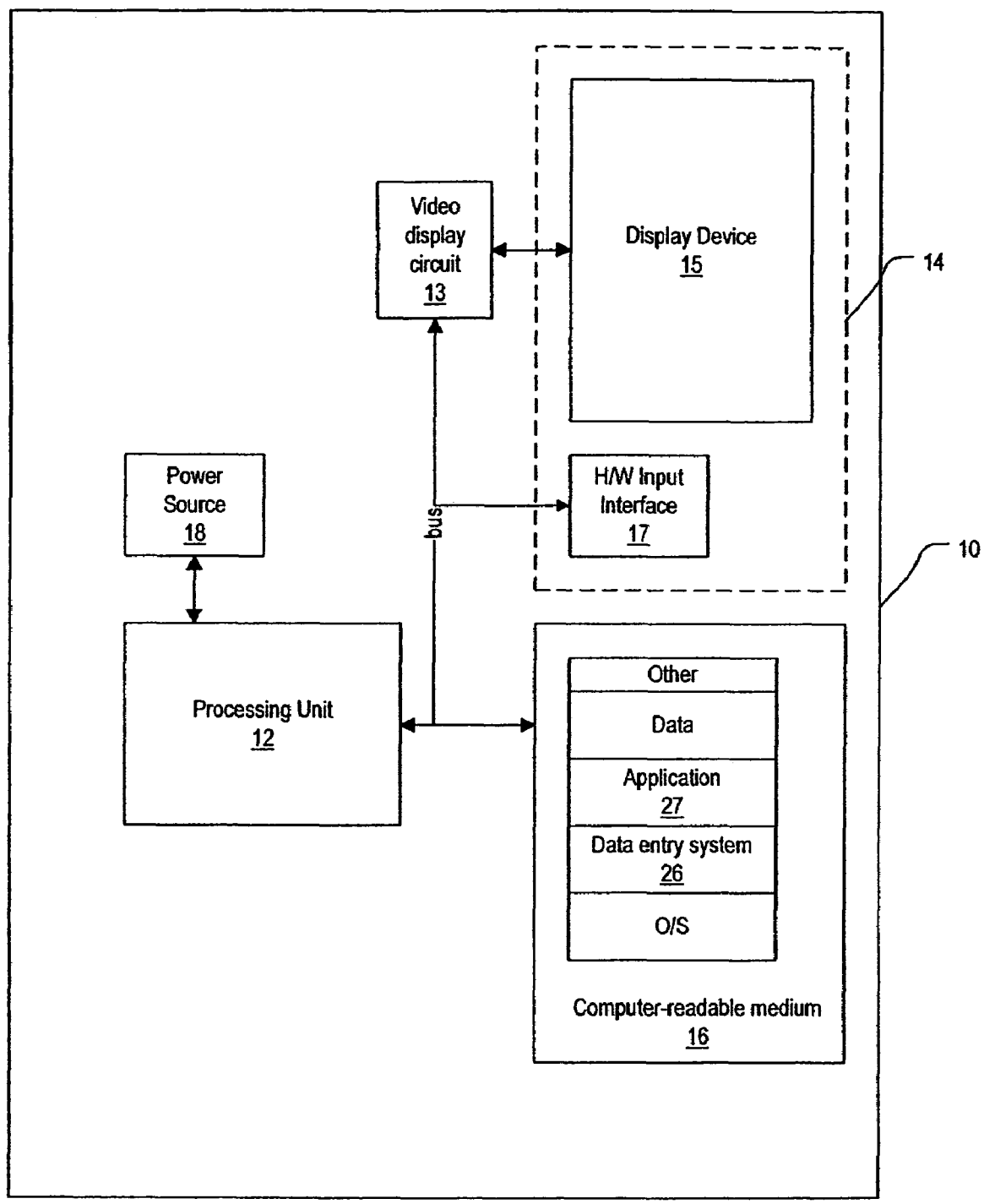
FIG. 1 is a schematic diagram of a personal computing device loaded with a data entry system, according to a first embodiment of the invention.

It will be appreciated that for simplicity and clarity of illustration, elements illustrated in the accompanying drawings have not necessarily been drawn to scale. For example, the dimensions of some of the elements are exaggerated relative to other elements for clarity. Further, where considered appropriate, reference numerals and labels have been repeated among the drawings to indicate corresponding or analogous elements and features.

DETAILED DESCRIPTION

Reference will now be made in detail to implementations and embodiments of the invention, examples of which are illustrated in the accompanying drawings.

Introduction

In one aspect of the present invention the user can rapidly enter and search for text using a data entry system through a combination of entering one or more characters on a digitally displayed keyboard with a pointing device and using an interactive search list to dynamically obtain a list of completion candidates. The user can activate the interactive search list to obtain a dynamically generated list of completion candidates at any time while entering a partial text entry with the data entry system. In this specification "partial text entry" means a sequence of one or more characters making up a leading portion of a word, phrase or character sequence. When the interactive search list is active, a dynamically generated list of completion candidates is displayed on a graphical user interface for the user to select from. The list of completion candidates is retrieved from at least one dictionary by a candidate prediction system which retrieves completion candidates that are most likely to contain the completion candidate desired by the user. Candidate prediction is based on statistical measures ranking the entries within the dictionary relative to each other.

When the interactive search list is active, the user can perform one of several actions with the data entry system including any of the following:

(1) the user can deactivate the interactive search list and return to modifying the current partial text entry and other text; or (2) the user can select one of the completion candidates in the interactive search list and use the selected completion candidate to replace the partial text entry which the user is currently entering.

In the first case, when the user deactivates the interactive search list, the user can immediately continue adding to or modifying the current partial text entry being entered, and may re-invoke the interactive search list to further search for completion candidates based on the modified partial text entry. In the second case, the selected completion candidate is used to replace the partial text entry that the user is currently entering, and the data entry system begins monitoring for a new partial text entry (of a word, phrase, or character sequence) from the user.

In certain embodiments of the present invention, as illustrated further below, a third action available to the user when the interactive search list is activated is to:

(3) use one of the completion candidates in the interactive search list to initiate a further automated search to obtain a more refined dynamic list of completion candidates from the dictionary.

In the third case, multi-level search lists and searching are available to help accelerate completion of a partial text entry. In this latter case, the user can automatically initiate an iterative search wherein a completion candidate listed in the interactive search list is used as the new partial text entry to dynamically obtain a new list of completion candidates, which is then displayed in an updated interactive search list. The automated ability to use the interactive search list to dynamically obtain a refined list of completion candidates allows the user to quickly make good use of search results that are only partially successful. When the interactive search list is updated with a new list of completion candidates, the user can then choose one of the completion candidates in the new list, or the user can repeat the iterative search process once again by choosing one of the completion candidates in the new list and activating a further iterative search. In addition, the user may return to keyboard entry with the last completion candidate selected by the user in the previous iteration of the interactive search list. This latter feature provides the user with the convenience of being able to automatically and seamlessly continue entering the desired word, phrase, or character sequence using the last completion candidate selected by the user in the previous iteration of the interactive search list. Thus, the user can quickly and easily replace the user's current partial text entry with a partially successful completion candidate and continue building upon or modifying this partial completion candidate using the keyboard while at the same time allowing the user the flexibility to re-enter the interactive search list at any time.

As discussed further in this specification, other actions may also be carried out by the user when the interactive search list is active.

Operation Environment

FIG. 1 shows a schematic diagram of a personal computing device 10 for text entry according to a first embodiment of the invention. The personal computing device 10 shown in FIG. 1 contains at least one processing unit 12 (such as a CPU or a similar processor or multiprocessor) connected by a bus to a computer-readable medium 16. The computer-readable medium 16 provides a memory store for software and data residing within the personal computing device 10. The computer-readable medium 16 can include one or more types of computer-readable media including volatile memory such as Random Access Memory (RAM), and non-volatile memory, such as a hard disk or Read Only Memory (ROM). Preferably, the computer-readable medium 16 includes a combination of volatile and non-volatile memory. In the first embodiment, the computer-readable medium 16 contains an operating system, a data entry system 26 and an application 27 receptive to user-based text entry such as a word processor. The computer-readable medium 16 may also store alternative or other applications such as a browser or micro-browser, an e-mail application, and/or other end-user applications.

The operating system can be any of several well-known operating systems depending on the personal computing device used. For example, for hand-held devices, the operating system can be PalmOS™, Windows CE™, or an equivalent operating system. For larger systems, such as with work stations or desktop computers, a more robust operating system may be used such as, for example, Windows 95™, Windows 98™, Windows NT™, Windows 2000™, MacOS™, UNIX, Linux or the like. For the purposes of the first embodiment, the operating system is PalmOS™.

The data entry system 26 is implemented as software that runs on the processing unit 12 to support computer-assisted text generation and entry for the user, although in other alternatives the data entry system 26 can be implemented as computer-readable instructions in firmware or embedded in hardware components. In the first embodiment, electronic text and documents are generated and maintained by the application 27 and the user authors and edits the electronic text and documents with the data entry system 26 which communicates with the application 27 through an application programming interface (API). This allows the data entry system 26 to be portable so that it can be used by one or more applications to accept text and data entry from the user. As an alternative, the data entry system 26 may be integrated into part of an application.

The personal computing device 10 includes a graphical display device 15 and a hardware input interface 17 receptive to user input from a pointing device. In this specification, the term "pointing device" means an input device that allows a user to select one choice amongst one or many choices (a user-based selection). Some pointing devices enable a user to make user-based selections by pointing to a desired choice and include, by way of example, a pen, stylus, or finger. More generally, pointing devices capable of supporting user-based selections include, by way of example, the pointing devices above capable of pointing, as well as other input devices such as a mouse, trackball or the like.

The graphical display device 15 is connected to and controlled by the processing unit 12 via a video display circuit 13. The graphical display device 15 may be a CRT, a liquid crystal display, or an equivalent computer display.

In the first embodiment, the personal computing device 10 is a personal digital assistant wherein the graphical display device 15 and the hardware input interface 17 are combined in the form of a touch-sensitive screen 14 that serves both as a graphical display 15 and as an input interface receptive to generating coordinate position signals in response to contact from a pointing device such as a pen or stylus. It will be appreciated by those skilled in the art that the personal computing device 10 is represented in the following discussion as a personal digital assistant for illustration purposes only, and that the invention may be practised with other personal computing devices including hand-held devices, personal computers and other microprocessor-based electronic devices, mobile telephones, internet appliances, and embedded devices, having a suitable graphical display and an input interface receptive to user input via a pen, stylus, finger, mouse, or an equivalent pointing device that allows the user to select one choice from many. Other types of equivalent personal computing devices to which the features and aspects of the present invention are applicable include, by way of example, an internet appliance controlled via a remote control (for instance, running an Internet service through a television via a set top box and a remote control). In other embodiments, the hardware input interface 17 may be a digitising tablet, a pressure-sensitive input surface or a proximity sensing input surface. It will also be appreciated that the personal computing device 10 may be powered by an internal (18) or external power source.

Figure 2:
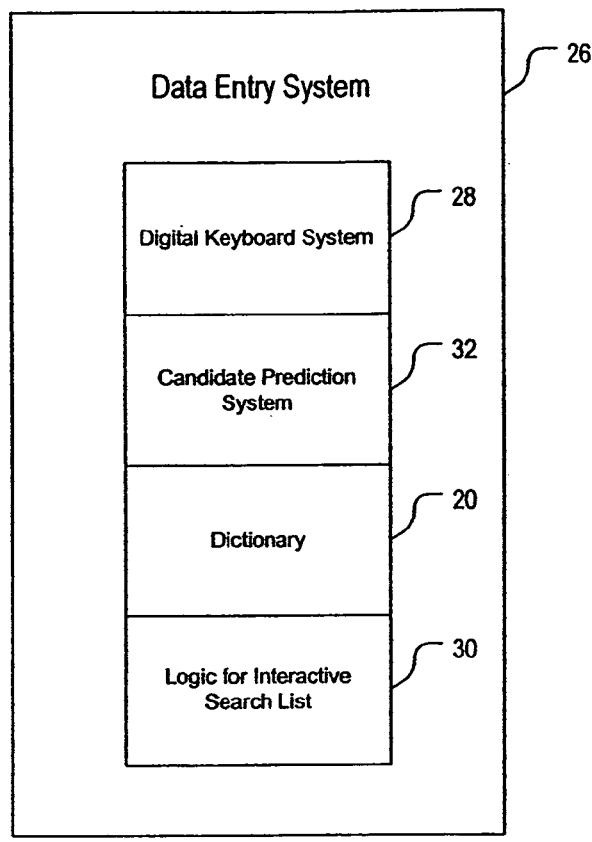
FIG. 2 is a schematic diagram of the data entry system of the first embodiment.

As shown in FIG. 2, the data entry system 26 includes computer-readable instructions for a digital keyboard 28, a candidate prediction system 32, a dictionary 20, and an interactive search list 30. The digital keyboard 28 provides an interface for the user to enter text and data into the personal computing device 10 (FIG. 1). As the user enters in characters via the digital keyboard 28 to construct a word, phrase, or character sequence, the characters entered by the user are stored in a search string as a partial text entry. The search string is used by the candidate prediction system 32 to search the dictionary 20 for completion candidates that begin with the current partial text entry being stored in the search string. The interactive search list 30 is used to display for user selection the list of completion candidates retrieved by the candidate prediction system 32. In the first embodiment, the data entry system 26 supports gesture-based user input for the selection of completion candidates from the interactive search list 30 as will be described in further detail below.

Digital Keyboard

Figure 3:
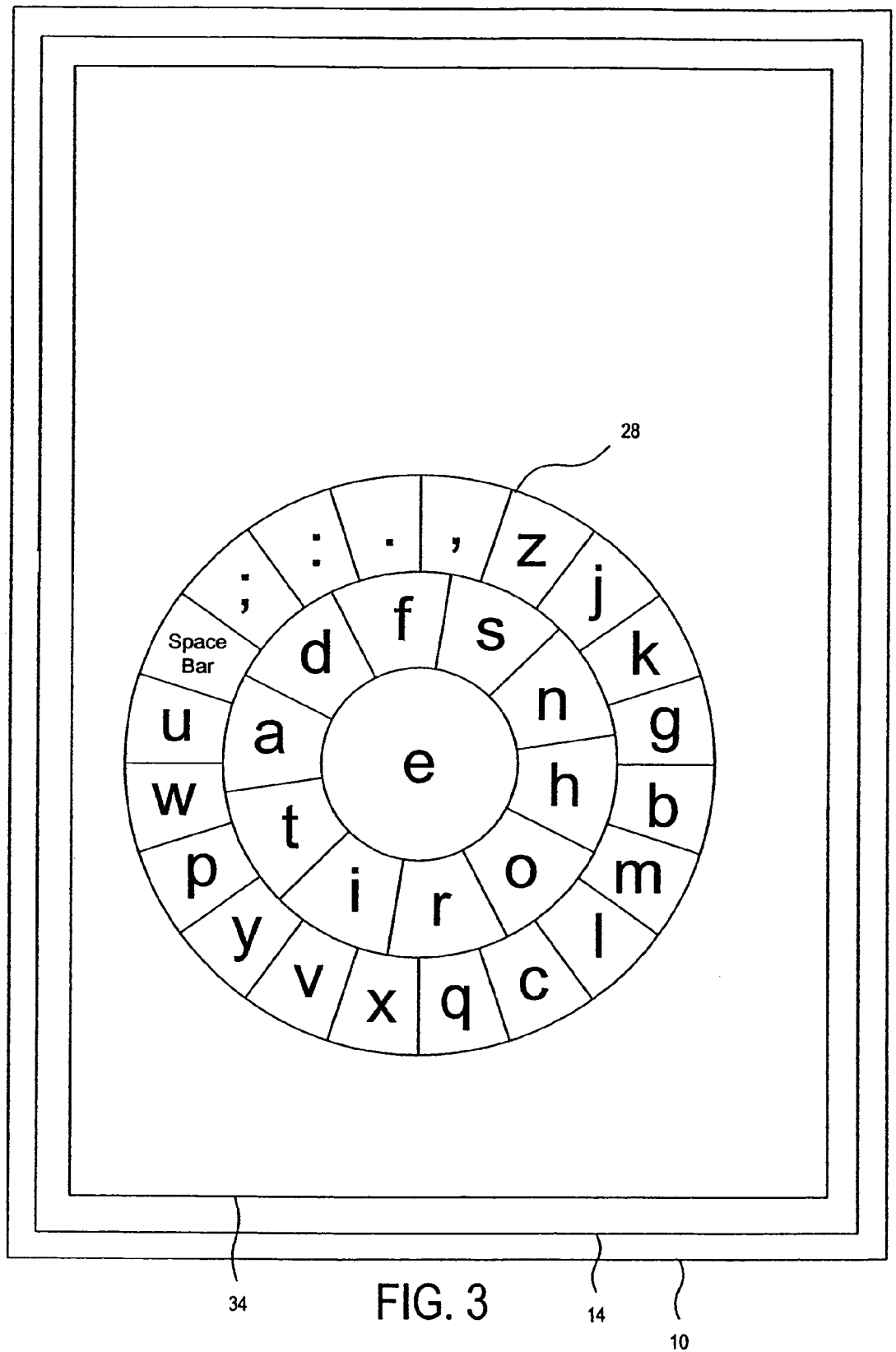
FIG. 3 is a schematic representation illustrating the display of a digital keyboard on a graphical user interface within the personal computing device of the first embodiment.

As illustrated in FIG. 3, an image of the digital keyboard 28 is displayed on a graphical user interface 34 within the screen area of the touch-sensitive screen 14 once the data entry system 26 is initialised and ready to receive input from the user. The digital keyboard 28 contains a plurality of keys each of which is associated with at least one character from a set of characters. For example, when the English alphabet or a character set containing the English alphabet is used, each key on the digital keyboard 28 can contain one or more letters from the English alphabet. It should be noted that reference to the English alphabet is by way of example only, and that the digital keyboard 28 can be configured to contain and display any set of characters which the user may then select and use to enter text into the personal computing device 10. The terms "character set" and "set of characters" refer in this specification to a set containing a plurality of letters, numbers and/or other typographic symbols. Examples of character sets include, but are not limited to, one or more alphabets of a written language (e.g. English, French, German, Spanish, Chinese, or Japanese), and binary-coded character sets such as ASCII (American Standard Code for Information Interchange), EBCDIC (Extended Binary Coded Decimal Interexchange Code), and BCD (Binary Coded Decimal).

In the first embodiment, the digital keyboard 28 displays digital keys containing characters from the English alphabet along with special characters selected from the ASCII character set. Words, phrases, and character sequences can be typed into an electronic document or electronic text by simply using the pointing device to tap or select in sequence each key for the desired word, phrase, or character sequence. As will be discussed further below, the user can also use the digital keyboard 28 to initiate an automated search for completion candidates to more rapidly and flexibly enter words, phrases, and/or character sequences in an automated manner. As will also be discussed later in this specification, several enhancements to the digital keyboard 28 may be implemented to further enhance the user's ability to quickly, efficiently, and flexibly enter text using a pointing device.

Dictionary

Figure 4:
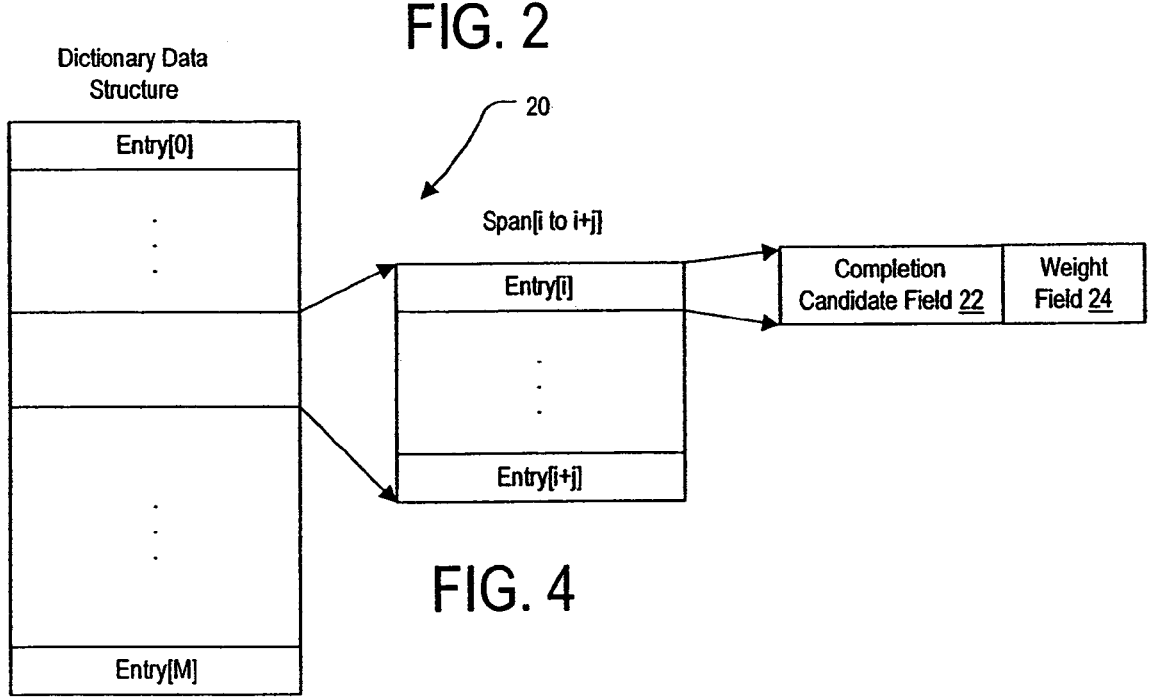
FIG. 4 is a schematic representation of a data structure for a dictionary according to the first embodiment.

FIG. 4 shows a sample data structure for the dictionary 20. Preferably, as in the first embodiment, the dictionary 20 contains completion candidates with weight values for ranking completion candidates relative to each other. The dictionary 20 contains a plurality of entries, with each entry having a completion candidate field 22 for storing a completion candidate and a weight field 24 for storing a numeric value associated with the completion candidate stored in a corresponding completion candidate field 22. Each completion candidate stored in the dictionary 20 represents a word, phrase, or character sequence according to a particular language. Character sequences may include, but are not limited to, word continuations. Word continuations represent a leading part of a word, but not an entire word. In the first embodiment where the dictionary is based on American english, word continuations may include, by way of example, such common word prefixes as "com", "con", "dis", "expl", "inter", "mis", "para", "pre", "syn", "tele", "trans" and "univers". Obtaining a list of completion candidates which can include common word prefixes reduces user effort in terms of the number of steps required to generate a desired text entry. Furthermore, certain character combinations such as word prefixes are shared across multiple completion candidates which can speed up learning of the locations of completion candidates within sub-levels of the interactive search list 30 when multi-level searching (i.e. iterative searching) is available.

Each weight field 24 stores a weight value for ranking the corresponding completion candidate stored in the corresponding completion candidate field 22 with other completion candidates in the dictionary 20. The weight value stored in a weight field 24 may be based on one of many metrics. By way of example, each weight field 24 may contain a value representing a degree of common usage of the completion candidate stored in the corresponding completion candidate field 22 relative to the other completion candidates in the dictionary 20. As another example, the weight fields 24 may contain numeric values based on what words or phrase came before the completion candidate stored in the corresponding completion candidate from an analysis of a large corpus of text. Each weight field 24 may also be supplemented with one or more related fields.

Candidate Prediction System

Referring to FIG. 2, the candidate prediction system 32 is programmed to dynamically search the dictionary 20 for completion candidates that begin with the partial text entry entered by the user. The candidate prediction system 32 retrieves completion candidates from the dictionary 20 by determining which dictionary entries are more likely to be the ones that the user is attempting to type. In the first embodiment, the completion candidates are obtained from the dictionary 20 on the basis of frequency values stored in the weight field 24 for each entry. In the first embodiment, completion candidates having the highest weight values are retrieved. The frequency values represent the frequency of usage of the entries relative to each other. These frequency values may be predetermined on the basis of an analysis of a large corpus of text or may be dynamically generated or modified on the basis of the specific user's usage of words, phrases, and/or character sequences through the data entry system 26. Other statistical measures may also be employed to enhance the candidate prediction system 32, such as ranking information or identifying the frequency with which an entry in the dictionary 20 follows any of the other entries in the dictionary 20.

Preferably, the candidate prediction system 32 retrieves all possible completion candidates limited by one or more predetermined metrics. In the first embodiment, the total number of completion candidates retrieved is limited by a predetermined maximum number of displayable completion candidates. The maximum number of completion candidates retrieved by the candidate prediction system 32 is preferably a small but significant number sufficient enough to provide the user with as many potential candidates as possible without unduly saturating the user with an excessive number of candidates and without unduly delaying the user's ability to quickly review and select from the candidates selected. The maximum number of completion candidates is also preferably sufficiently large enough to provide a variety of completion candidates (if available) for the user to choose from so as to avoid an excessive amount of multi-level searching to complete a partial text entry. In the case of the first embodiment, the maximum number of displayable completion candidates is set to five. The data entry system 26 can be configured by the user to present a greater or lesser number of completion candidates. Preferably, the completion candidates are displayable in a configuration that can also be selected by the user. Making the number of completion candidates that can be displayed a user-configurable feature provides enhanced capabilities for computer-assisted text generation and entry with the data entry system 26.

Interactive Search List

The interactive search list 30 receives completion candidates retrieved from the dictionary 20 by the candidate prediction system 32 and presents the user with a list of these completion candidates. The interactive search list 30 can be displayed to the user in any of several different ways depending on which options the data entry system 26 has been programmed with and which of those options have been selected by the user, as will be discussed later in this specification. In the first embodiment, the interactive search list 30 is displayed on the touch-sensitive screen 14 as an interactive vertical list of completion candidates. As described further below, the interactive search list 30 is programmed to support multi-level searches so that the user can quickly use a completion candidate from one level of search results to drill deeper into the dictionary 20 for a narrower set of completion candidates.

Figure 5:
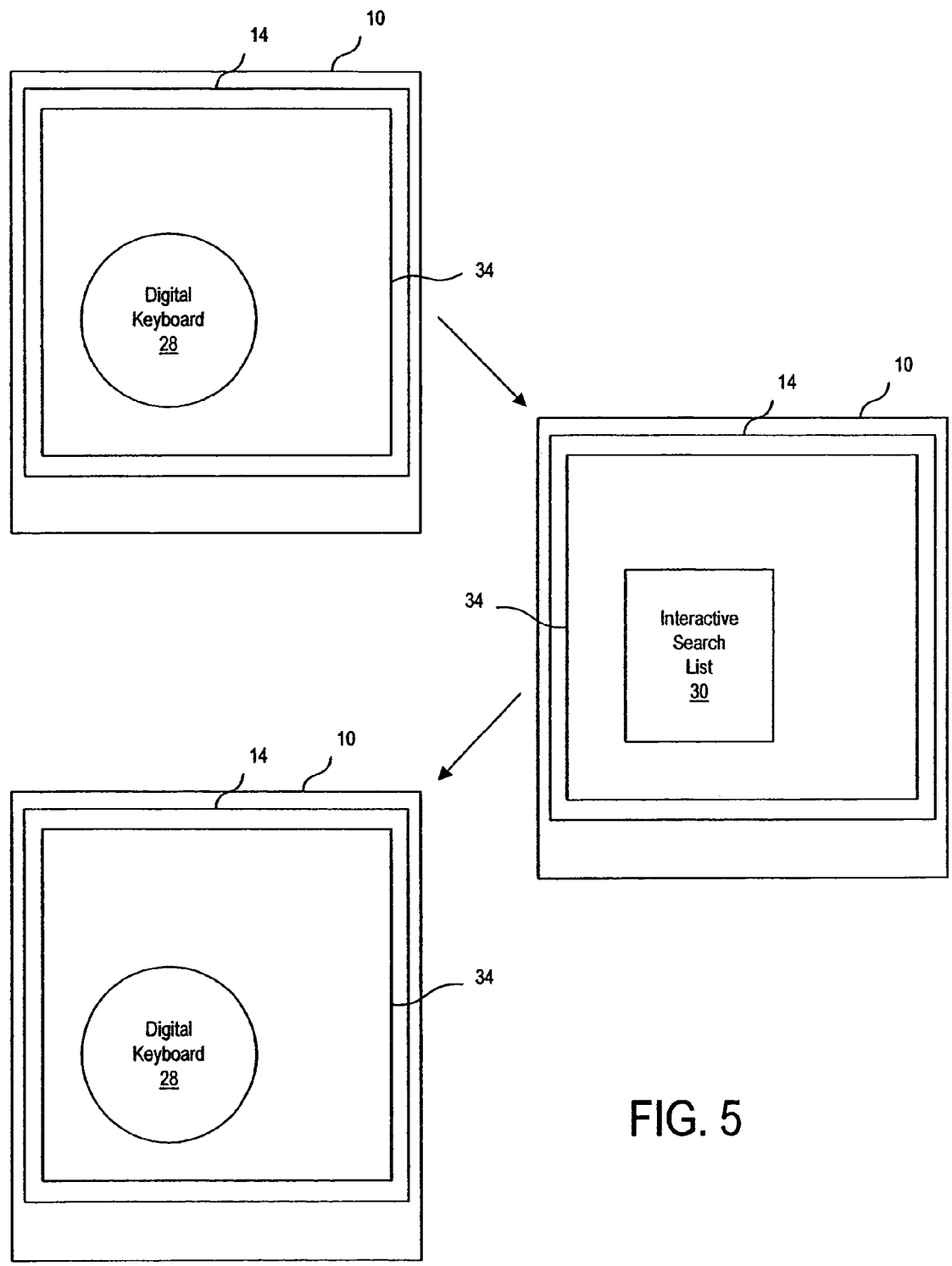
FIG. 5 is a schematic representation illustrating the interchangeable display of the digital keyboard and an interactive search list according to the first embodiment.

In the first embodiment, the digital keyboard 28 and the interactive search list 30 are also interchangeably displayed on the graphical user interface 34, as further illustrated in FIG. 5. When the digital keyboard 28 and the interactive search list 30 are interchangeable, the user can easily and quickly swap between entering characters or otherwise modifying a partial text entry from the digital keyboard 28 and using the interactive search list 30 to rapidly and flexibly complete the entry of words, phrases, and/or character sequences. When the digital keyboard 28 and the interactive search list are interchangeable, the image of the digital keyboard 28 and the image of the interactive search list 30 share substantially the same display area on the graphical user interface 34. The data entry system 26 for the first embodiment is preferably programmed to automatically swap between the digital keyboard 28 and the interactive search list 30 depending upon the input provided by user from the pointing device. This latter feature minimizes disruption to the user's attention to the data entry process since the user's attention remains focussed on the same region of the graphical user interface 34 for both the digital keyboard 28 and the interactive search list 30. Interchanging the display of the digital keyboard 28 and the interactive search list 30 within the graphical user interface 34 provides for a space-efficient layout for the use of the data entry system 26 on the touch-sensitive screen 14. The interchangeability of the digital keyboard 28 and the interactive search list 30 can also minimize hand movement as the user switches between using the digital keyboard 28 and the interactive search list 30 without having to move the pointing device to another part of the touch-sensitive screen 14 (or, more generally, without having to move the pointing device to another part of the hardware input interface). This arrangement can be particularly useful for smaller personal computing devices such as PDAs or other hand-held devices, or where the amount of space on the graphical user interface 34 used by the data entry system 26 needs to be minimized.

The interactive search list 30 enables the user to more rapidly and flexibly complete the entry of words, phrases, and/or character sequences than would otherwise be required if the user were to simply type in each individual character of the desired entry.

Overview of Methodology

The basic data entry methodology of the present invention as applied to a personal computing device 10 of the first embodiment will now be described. In what follows, reference is made to FIG. 1 to 5.

In the first embodiment, the user interfaces with the personal computing device 10 via the touch-sensitive screen 14 using a pen as a pointing device. However, it should be noted that the following methodology can be used with various other pointing devices, such as a stylus, finger, track ball, or mouse. If a mouse or an equivalent pointing device is used in place of a pen, stylus, or finger, then for the first embodiment the act of depressing a mouse button should be considered equivalent to touching the touch-sensitive screen 14 or touch pad with a stylus, pen, or finger, and similarly, releasing a depressed mouse button should be considered equivalent to lifting the stylus, pen, finger or other pointing device from the touch-sensitive screen 14 (or a touch pad or pressure sensitive pad).

With the data entry system 26 of the first embodiment two primary entry modes are available to the user: a keyboard mode and a search mode. In the keyboard mode, the user can enter text a character (or keystroke) at a time by simply pointing and selecting on keys on the digital keyboard 28 with the pointing device. With each selection of a key on the digital keyboard 28, the one or more characters that are associated with that key are forwarded to the application 27 for entry into text in, for example, a document or data entry field. In the search mode, the user can search for and select amongst completion candidate suggestions for the completion of a word, phrase, or character sequence as further described below.

In the first embodiment, when the user begins entering a word, phrase or character sequence using the digital keyboard 28, the candidate prediction system 32 automatically begins searching the dictionary 20 for candidate words, phrases, and/or character sequences that the user may be attempting to enter. The searching of the dictionary 20 performed by the candidate prediction system 20 begins automatically in response to the emerging character sequence entered by the user. This is done by searching the dictionary 20 for completion candidates that begin with the leading character or characters which the user has entered (i.e. the partial text entry). The leading characters manually entered by the user with the pointing device are stored temporarily as a search string. The search string is used by the candidate prediction system 32 to search the dictionary 20 for potential completion candidates. The candidate prediction system 32 retrieves completion candidates on the basis of which entries in the dictionary 20 are most likely to contain the completion candidate that the user is attempting to type based on the partial text entry currently entered as indicated by the weight fields in the dictionary.

The completion candidates retrieved from the dictionary 20 by the candidate prediction system 32 are provided to the interactive search list logic which causes the interactive search list 30 to be produced. As each new list of completion candidates is produced by the candidate prediction system 32 the interactive search list logic produces a revised list of completion candidates as the user adds or deletes characters to or from the partial text entry with the digital keyboard 28. Whether the interactive search list 30 is displayed on the graphical user interface 34, however, depends on whether or not the interactive search list 30 has been activated. In the first embodiment, the user may activate the interactive search list 30 by pausing for a predetermined delay period L1 with the pointing device in a selection made by touching down on a key on the digital keyboard 28 containing one or more characters. The amount of time that the user must pause with the key selected is a user-configurable option. Typically, the delay chosen will be less than one second, although the delay may be configured to any time period the user desires. As soon as the user pauses on a selected key for the delay period L1, the interactive search list 30 becomes active. When the interactive search list 30 is activated, the entry mode for the data entry system 26 changes from the keyboard mode to the search mode. In addition, when the interactive search list 30 is activated in the first embodiment, the image of the digital keyboard 28 is cleared from the graphical user interface 34 and replaced by an image of the interactive search list 30.

Although the interactive search list 30 is updated continuously in the first embodiment, in an alternative configuration the interactive search list 30 may be generated once the user activates the interactive search list 30 by pausing on a selected key on the digital keyboard 28. In this alternative configuration, the interactive search list 30 is revised each time the user calls up a new or modified interactive search list 30.

Once the user has activated the display of the interactive search list 30 containing a list of completion candidates, the data entry system 26 provides the user with the flexibility to proceed with one of several operations using the pointing device. With the interactive search list 30 displayed and active, the user can do any one of the following:

(1) the user can deactivate the interactive search list 30 and return to modifying the current partial text entry and other text; or (2) the user can select one of the completion candidates in the interactive search list 30 and use the selected completion candidate to replace the partial text entry which the user is currently entering; or (3) the user can use one of the completion candidates in the interactive search list 30 to initiate a further automated search to dynamically obtain a more refined list of completion candidates from the dictionary 20; or (4) the user can scroll or cycle through the list of completion candidates displayed in the interactive search list 30, selecting and deselecting one completion candidate at a time as the user decides which of the completion candidates (if any) will be used to complete the current partial text entry or to initiate further searching; or (5) the user can gesture to or pause in a "dead zone" within the graphical user interface 34 for any length of time without triggering any further action by the data entry system 26 so as to pause to consider whether to continue using the displayed interactive search list 30 or to carry out one of the other operations listed above.

The user's action with the pointing device generates user input signals which are monitored and analyzed by the data entry system 26 to determine the type of user selection or action being made. Which operation is executed by the data entry system 26 once the interactive search list 30 is activated depends on what action the user takes with the pointing device.

If the user does not want to select any of the completion candidates presented in the interactive search list 30 and wishes to continue entering further characters or to otherwise modify the partial text entry from the digital keyboard 28, then with the interactive search list 30 active and displayed on the graphical user interface 34, the user may lift the pointing device without any significant movement or may lift the pointing device after dragging it to or returning it to a dead zone. Either of these actions causes the hardware input interface 17 to generate a user input signal which serves as an indication to the data entry system 26 that the user wishes to deactivate the interactive search list 30 and return to modifying the current partial text entry manually with the digital keyboard 28. In the first embodiment, when the interactive search list 30 is deactivated, the image of the interactive search list 30 is cleared from the graphical user interface 34 and replaced with the image of the digital keyboard 28 which is enabled for further use by the user. This allows the user to smoothly return to using the digital keyboard 28 in keyboard mode without having to relocate the pointing device. Once in keyboard mode, the user may reinitiate searching with the interactive search list 30 to obtain further completion candidates by pausing once again on a subsequently selected key (or character) on the digital keyboard 28 with the pointing device.

A completion candidate from the interactive search list 30 is selected by the user by generating a gesture with the pointing device. For the purposes of this specification the term "gesture" refers to a motion with the pointing device when the pointing device is in an active state. In general, motions making up gestures may be linear or in another computer-recognizable pattern. For the first embodiment shown in FIG. 1 to 5 and for variations thereof, a gesture is a motion with the pointing device in a particular direction for at least a minimum distance when the pointing device is in an active state. The minimum distance is used by the data entry system 26 in the first embodiment to ignore small, insignificant gestures with the pointing device. This minimizes false selections arising from inadvertent movements with the pointing device.

In the first embodiment, the pointing device is in an active state when the pointing device is held to the touch-sensitive screen 14. In alternative variations of the graphical display device 15 and the hardware input interface 17, other conditions can be used to identify when the pointing device is in an active state and are considered equivalent. For example, with a pressure-sensitive pad, the pointing device is in an active state when the pointing device is either in contact with the pressure-sensitive pad or depressed on the pressure-sensitive pad with at least a measurable amount of pressure. Alternatively, when the pointing device is a mouse, it is in an active state when a button on the mouse is pressed.

The data entry system 26 monitors the gestures made with the pointing device to determine when and if a completion candidate in the interactive search list 30 has been selected. In the first embodiment the data entry system 26 does this by monitoring the current position coordinates of the pointing device on the touch-sensitive screen 14 relative to a point of origin generated when the pointing device first activates the interactive search list 30. The current position coordinates of the pointing device are monitored so long as the pointing device remains in contact with the touch-sensitive screen 14. As the current position coordinates are received, the data entry system 26 generates a vector using the current position coordinates of the pointing device and the point of origin. This vector is used by the data entry system 26 to determine if and when a particular completion candidate in the interactive search list 30 has been selected. The data entry system 26 is programmed to associate certain types of vectors with certain entries in the interactive search list 30. Each entry in the interactive search list 30 may have associated with it one or more predetermined vectors. When the vector formed by the user matches such a predetermined vector, the data entry system 26 recognizes that the user is selecting the completion candidate displayed in the corresponding entry of the interactive search list 30. If the data entry system 26 determines that the vector currently being generated by the user's gesture is associated with one of the completion candidates in the interactive search list 30, then the associated completion candidate is selected from the interactive search list 30. Preferably, when a completion candidate is selected from the interactive search list 30, the particular selection is indicated to the user by the data entry system 26 by highlighting the selected completion candidate in the interactive search list 30.

In the first embodiment, the data entry system 26 is programmed to require that the user gesture with the pointing device towards or onto a completion candidate in the interactive search list 30 in order to select that completion candidate. The gesture need only be a minimum distance. In an alternative arrangement, however, when a user makes selections from the interactive search list 30 using gestures with the pointing device, the movement performed by the user is relative. With this "relative" mode of gesture-based candidate selection, the user need only gesture in a direction associated by the data entry system 26 with a desired completion candidate without the pointing device necessarily moving towards or onto the portion of the graphical user interface 34 where the completion candidate is displayed. In this case, the predetermined vectors associated by the data entry system 26 with entries in the interactive search list 30 correspond to unique gestures with the pointing device but not necessarily gestures which are towards or onto a particular entry in the interactive search list 30. With this relative mode of selection, gestures with the pointing device are used to select amongst the completion candidates on the interactive search list 30 even if the user is not gesturing with the pointing device towards or onto a particular completion candidate within the interactive search list 30. In this case, the user need not move the pointing device toward or onto a particular fixed location within the interactive search list 30 in order to select a specific completion candidate. Associating a gesture with a particular completion candidate in the interactive search list 30 in the above manner minimizes the amount of movement required with the pointing device to make selections from the interactive search list 30 and provides the user with the flexibility of selecting completion candidates with gestures which do not necessarily need to be towards or onto the desired completion candidate.

Once the user has selected a completion candidate from the interactive search list 30, several options are available to the user. If the completion candidate represents the entry that the user wishes to add to the text, then the user can accept the selected completion candidate for insertion into the text by lifting the pointing device up from the touch-sensitive screen 14 in less than a predetermined time limit L2 while keeping the particular completion candidate selected. This latter event generates a user input signal which instructs the data entry system 26 to terminate all searching based on the partial text entry and to signal to the application 27 to use the selected completion candidate to permanently replace the partial text entry. When the selected completion candidate is used to permanently replace the partial text entry at this point, the interactive search list 30 is cleared from the graphical user interface 34 and the image of the digital keyboard 28 is re-enabled ready to receive the next keystroke from the pointing device. With the partial text entry thus completed, the data entry system 26 begins monitoring anew for text entries by the user.

If the user wishes to change selections, the user can move through the list of completion candidates displayed in the interactive search list 30 by gesturing with the pointing device to other completion candidates in the interactive search list 30. If the user is unsure of which completion candidate to use, or wishes to pause to consider whether to continue in search mode or to return to keyboard mode, the user can gesture to or pause in a "dead zone" within the graphical user interface 34 for any length of time without triggering any further action by the data entry system 26. In the first embodiment, when the interactive search list 30 is first activated by pausing on a key on the digital keyboard 28, the data entry system 26 begins monitoring the length of the vector that the user thereafter generates to determine when and if the user is selecting a particular completion candidate from the interactive search list 30 or when the user is carrying out another recognized operation such as moving the pointing device to a dead zone. If the data entry system 26 determines that the length of the vector generated from the current position coordinates and the point of origin is less than or equal to a predetermined length, then the pointing device is deemed by the data entry system 26 to be in a dead zone on the graphical user interface 34. When the pointing device is in a dead zone, the user has the freedom to pause without activating any further operation by the data entry system 26 and without clearing the interactive search list 30. This provides the user with the option to pause and consider what their next operation will be. Other dead zones may be programmed into the graphical user interface 34 within the data entry system 26 for the user to move to with the pointing device so as to further enhance the user's ability to pause in different parts of the graphical user interface 34. If the vector being generated through a gesture is found by the data entry system 26 to exceed a predetermined length, the data entry system 26 checks to determine whether or not the particular vector being generated is associated with any of the completion candidates in the interactive search list 30 or with any other operation on the screen such as alternative or additional dead zones.

Figure 5A:
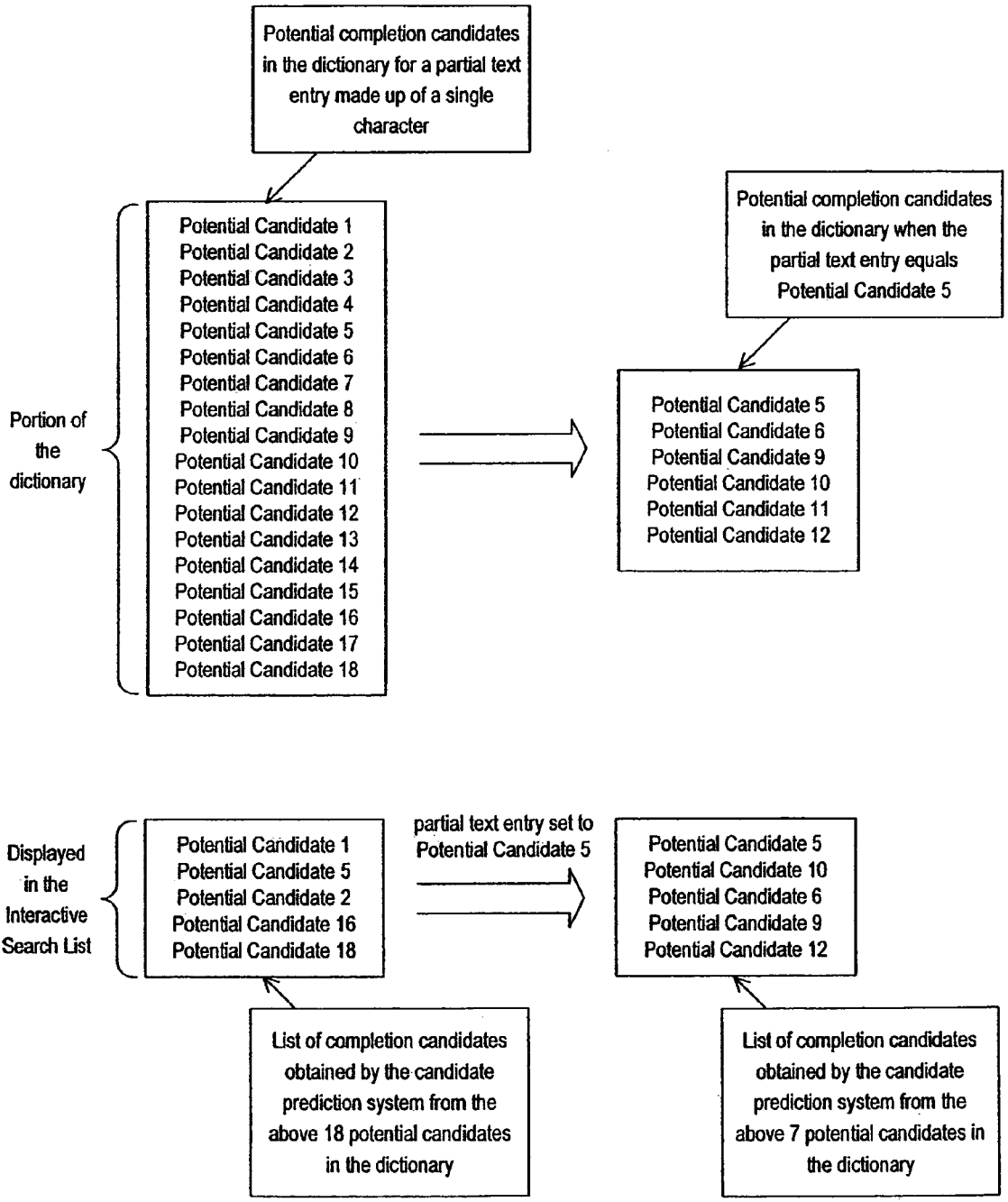
FIG. 5A is a schematic representation illustrating potential completion candidates for retrieval and display in the interactive search list according to an example of the use of the first embodiment.

If the completion candidate selected on the interactive search list 30 represents only part of the entry that the user wishes to add to the text, then the user can use the selected completion candidate to dynamically initiate a further search for a more refined list of completion candidates from the dictionary 20. The ability to dynamically search for a more refined list of completion candidates based on a selected completion candidate is also referred to in this specification as an iterative search. This iterative search tool is provided through the interactive search list 30 when the interactive search list 30 is active and displays a list of potential completion candidates for the user to select from. An iterative search is triggered in the first embodiment by the user continuing to keep a completion candidate in the interactive search list 30 selected for more than the predetermined time limit L2. The automated ability to use the interactive search list 30 to further search the dictionary 20 allows the user to make good use of search results that are only partially successful. When the user continues to keep a completion candidate selected in the interactive search list 30 for more than the predetermined time limit L2, the data entry system 26 determines that the user input corresponds to a user selection to initiate a new search using the selected completion candidate as the basis for the new search. When this happens, the candidate prediction system 32 dynamically obtains a refined list of completion candidates based on the selected completion candidate. As illustrated in FIG. 5A, the refined list of completion candidates provides a narrower list of completion candidates based on a more specific search string (ie. the selected completion candidate). Iterative searching enables one to perform multi-level searches with the interactive search list 30, so that the user can quickly use a completion candidate from one level of search results to drill deeper into the dictionary 30 for a narrower set of completion candidates.

In the first embodiment, iterative searching can be initiated when a completion candidate in the interactive search list 30 represents only a first part (i.e. a leading part) of the entry that the user wishes to add to the text.

Once the candidate prediction system 32 has obtained the refined list of completion candidates, the interactive search list 30 is redisplayed with the refined list of completion candidates. When the interactive search list 30 is redisplayed, the point of origin coordinates, used by the data entry system 26 to track vectors generated from gestures with the pointing device, are set to the position coordinates of the pointing device at the time the selected completion candidate is used to initiate the iterative search. With the interactive search list 30 redisplayed, the user can then choose one of the completion candidates in the refined list by lifting the pointing device up after selecting the particular completion candidate through a gesture, or the user can further repeat the iterative search process by selecting one of the completion candidates in the refined list and pausing with that particular completion candidate selected for the predetermined time limit L2. With the refined list of completion candidates displayed, the user may also lift the pointing device without selecting any completion candidates obtained from the iterative search. This latter action leaves the search string set to the last completion candidate selected by the user in the previous iteration of the interactive search list 30 and returns the data entry system 26 to keyboard mode. At this point, the interactive search list 30 is cleared from the graphical user interface 34, the digital keyboard 28 is redisplayed, and the data entry system 26 sends the completion candidate last selected by the user from the interactive search list 30 to the application 27 for entry into the text, thereby replacing the contents of the partial text entry currently under development by the user. New characters can then be added. As a variation, using the digital keyboard 28, the user can then, if desired, instruct the application 27 to cancel the entry of the modified partial text entry into the text by selecting a function button displayed on or associated with the digital keyboard 28.

EXAMPLE

Figure 6:
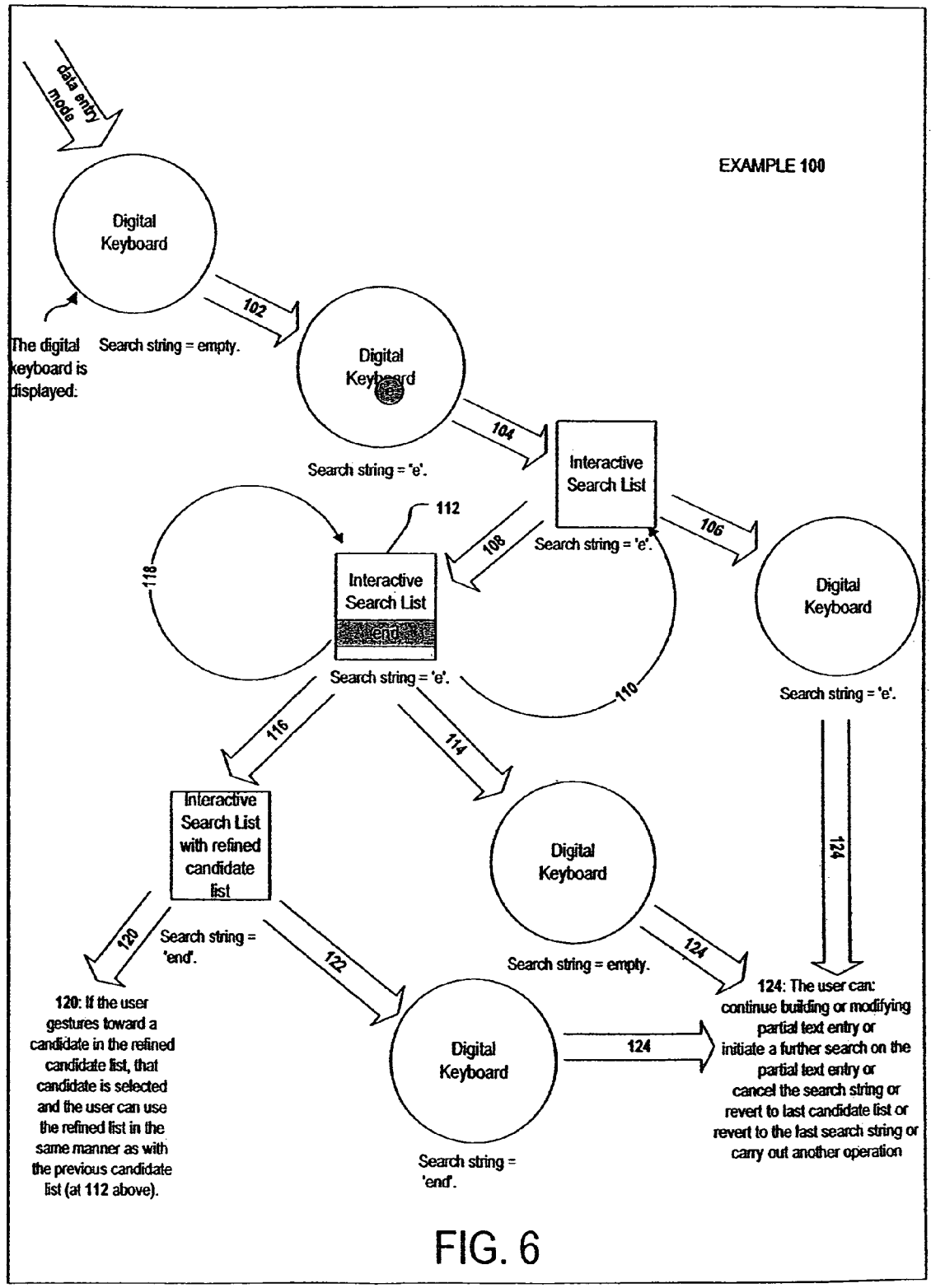
FIGS. 6 and 6A are flow diagrams illustrating, by way of example from the user's perspective, the use of the data entry system of the first embodiment.
Figure 6A:
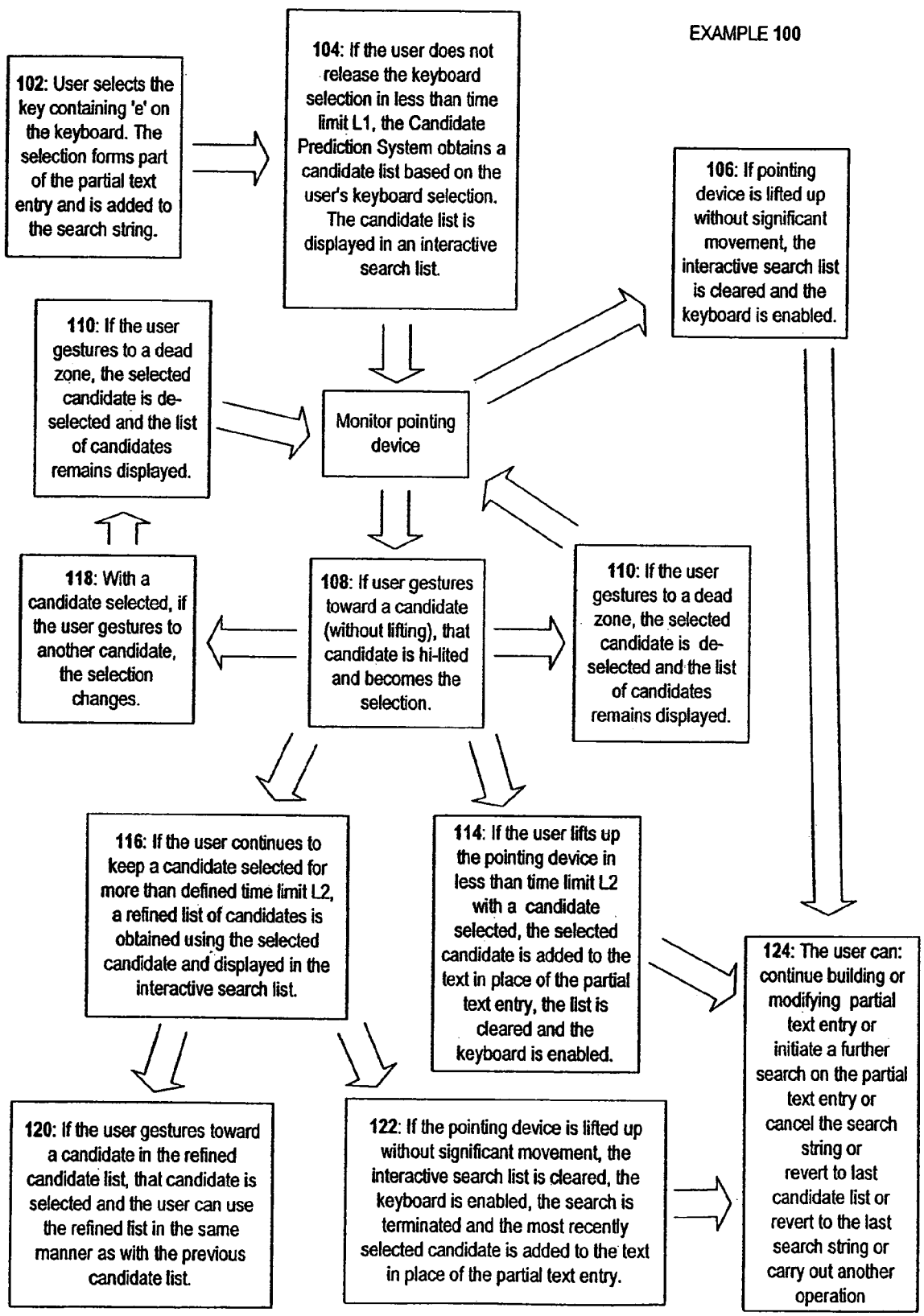

FIGS. 6 and 6A show an example 100 from the user's perspective of the operation and flexibility of the data entry system 26 for the first embodiment in FIG. 1 to 5. For the example shown in FIGS. 6 and 6A, suppose the user wishes to enter in the word "endlessly" and begins by entering at block 102 the letter "e" on the digital keyboard 28. In order to activate the interactive search list 30, the user pauses on the letter "e" for at least the predetermined time limit L1 which automatically triggers at block 104 the candidate prediction system 32 to obtain a list of completion candidates that are then displayed to the user in the interactive search list 30. Depending upon the contents of the dictionary 20 and the ranking system used to rank completion candidates stored within the dictionary 20, the desired completion candidate "endlessly" may not be one of the choices displayed in the initial interactive search list 30. Suppose for the moment, however, that the word "end" is one of the completion candidates displayed in the initial interactive search list 30. The user can select by gesture at block 108 the completion candidate "end" and use it to automatically initiate a further search of the dictionary 20 in order to retrieve a list of prioritized completion candidates which all begin with the prefix "end". As discussed, this iterative searching technique is performed with the pointing device by simply pausing while selecting a completion candidate (in this case the word "end") in the interactive search list 30 for the predetermined time limit L2 at block 116 which thereby automatically initiates a new search using the selected completion candidate as the basis for such a search. If the desired completion candidate "endlessly" appears in the updated interactive search list 30, the user can then immediately add the desired completion word by selecting it (block 120) from the interactive search list 30 and lifting the pointing device up in less than the predetermined time limit L2.

If the interactive search list 30 displayed after block 104 does not include the prefix "end" or any other prefix that would lead the user to rapidly enter the desired word "endlessly" using the data entry system 26, then the user has the option of lifting the pointing device up from the touch-sensitive screen 14 at block 106 without selecting any of the completion candidates. This type of user input notifies the data entry system 26 to clear the interactive search list 30 from the screen and to re-enable and display the digital keyboard 28. It should be noted that in this latter operation the search string continues to contain the partial text entry which the user has generated with the digital keyboard 28 (in this case the search string contains only the letter "e").

As a further illustration of the flexibility of the present data entry system 26, if the partial completion candidate "end" is used to initiate a further search and the new list of completion candidates does not include the word "endlessly" in the list of completion candidates, then the user can choose to continue building upon the partial completion candidate "end" by lifting the pointing device up from the touch-sensitive screen 14 without any of the completion candidates in the new list selected and proceeding to continue entering in characters from the digital keyboard 28. In this example the partial completion candidate "end" permanently replaces the partial text entry that the user was generating with the digital keyboard 28 in the user's electronic text, the search string is cleared and any new user input is automatically treated as being part of a new partial text entry.

It will be appreciated from the above particular that the user can follow the final steps to completing a partial completion candidate by entering in the remaining letters at the end of the partial completion candidate. For instance, if the partial completion candidate "endless" was retrieved, then the user can simply tap on the digital keyboard 28 the letters "l" and "y" followed by a space (or the end-of-entry function button) in order to notify the data entry system 26 of the completion of the current text entry. Thus, even when a complete word, phrase, or sequence of characters is not found in the dictionary 20, the use of the data entry system 26 to retrieve a partial completion candidate can result in less time and effort being expended than if the user had simply typed in each letter of the desired word, phrase, or sequence of characters.

In an alternative embodiment, the data entry system 26 is programmed with the ability to re-initiate automated searching even once the application 27 is instructed by the data entry system 26 to permanently replace the partial text entry in the text with a partial completion candidate. In this alternative, the search string is set to the partial completion candidate when the partial completion candidate replaces the partial text entry in the user's electronic text. The user may then return at any time to the automated search facility of the data entry system 26 by pausing on a key on the digital keyboard 28 for the predetermined time limit L1. For instance, if the partial completion selection "end" has already been used to initiate a further search and the user then lifts up the pointing device without selecting any of the completion candidates in the new list of completion candidates, the user can then return to automated searching with the data entry system 26 by, for example, touching on the letter "l" on the digital keyboard 28 for a sufficient period of time to initiate a search on the basis of the prefix "endl". The partial text entry "endl" will then be used by the candidate prediction system 32 to obtain a list of completion candidates that are then displayed in the interactive search list 30. If the desired completion candidate "endlessly" appears in the new list of completion candidates, the user may then choose that candidate and add it to the text by selecting that candidate and lifting the pointing device before the time limit L2 is reached. If the desired completion candidate does not appear in the interactive search list 30, the user can simply lift the pointing device without selecting any of the completion candidates and continue building upon the partial text entry "endl" by entering further characters via the digital keyboard 28. Once the desired word is complete, in order to clear the search string and instruct the data entry system 26 to treat any new user input as being part of a new partial text entry in this alternative, the user selects a key or function from the digital keyboard 28 programmed to indicate that entry of the original partial text entry has ended, as discussed further in the section below.

Forcing the End of a Partial Text Entry

As can be seen from the previous example, there will be times when the user is entering a word, phrase, or character sequence that does not appear in the dictionary 20. In this case, if the user has activated the interactive search list 30, it will be empty once the user has entered enough characters for the candidate prediction system 32 to determine that the dictionary 20 does not have any words, phrase or character sequences which could be completion candidates for the partial text entry that is currently being entered by the user. When this is the case, or when the user is completing the entry of a word, phrase, or character sequence by entering on the digital keyboard 28, the data entry system 26 needs to know when the current partial text entry being generated by the user has been completed and when another partial text entry has begun. If the user has selected and accepted a completion candidate from the interactive search list 30 in the first embodiment, then the data entry system 26 is programmed to recognize that the user has completed the current partial text entry and automatically initializes so that the next character selected from the digital keyboard 28 will be treated as a leading character for a new partial text entry. However, if the user is completing a partial text entry that is not found in the dictionary 20 and completes the partial text entry by simply entering characters from the digital keyboard 28, then the data entry system 26 may not know when the current partial text entry is completed and when the next partial text entry has begun. In order to assist in the identification of when a user has completed an entry for a word, phrase, or sequence of characters, the data entry system 26 can be programmed to monitor for an "end-of-search" signal from the user via the digital keyboard 28. In the first embodiment, an end-of-search signal is received by the data entry system 26 when a key or function button programmed to indicate an express "end-of-search" instruction is selected from the digital keyboard 28. Alternatively, the data entry system 26 can be programmed to recognize an implicit end-of-search instruction such as, for example, when the space key on the digital keyboard 28 is selected. Other non-alphabetic characters may also be used to provide an implicit end-of-search instruction.

System Flow

Figure 7:
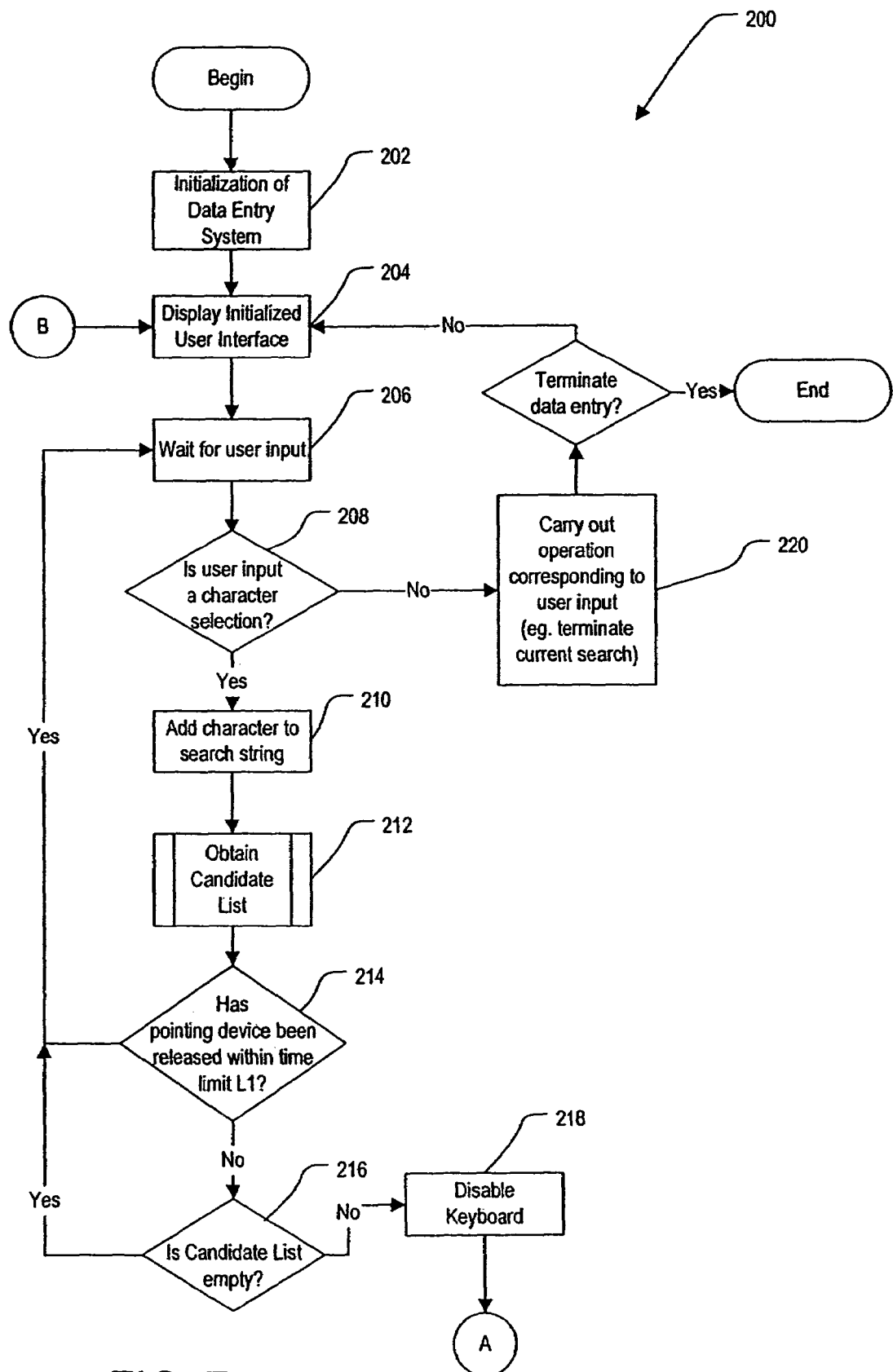
FIG. 7 to 9 are flow diagrams illustrating the flow of operation of the data entry system according to the first embodiment.
Figure 8:
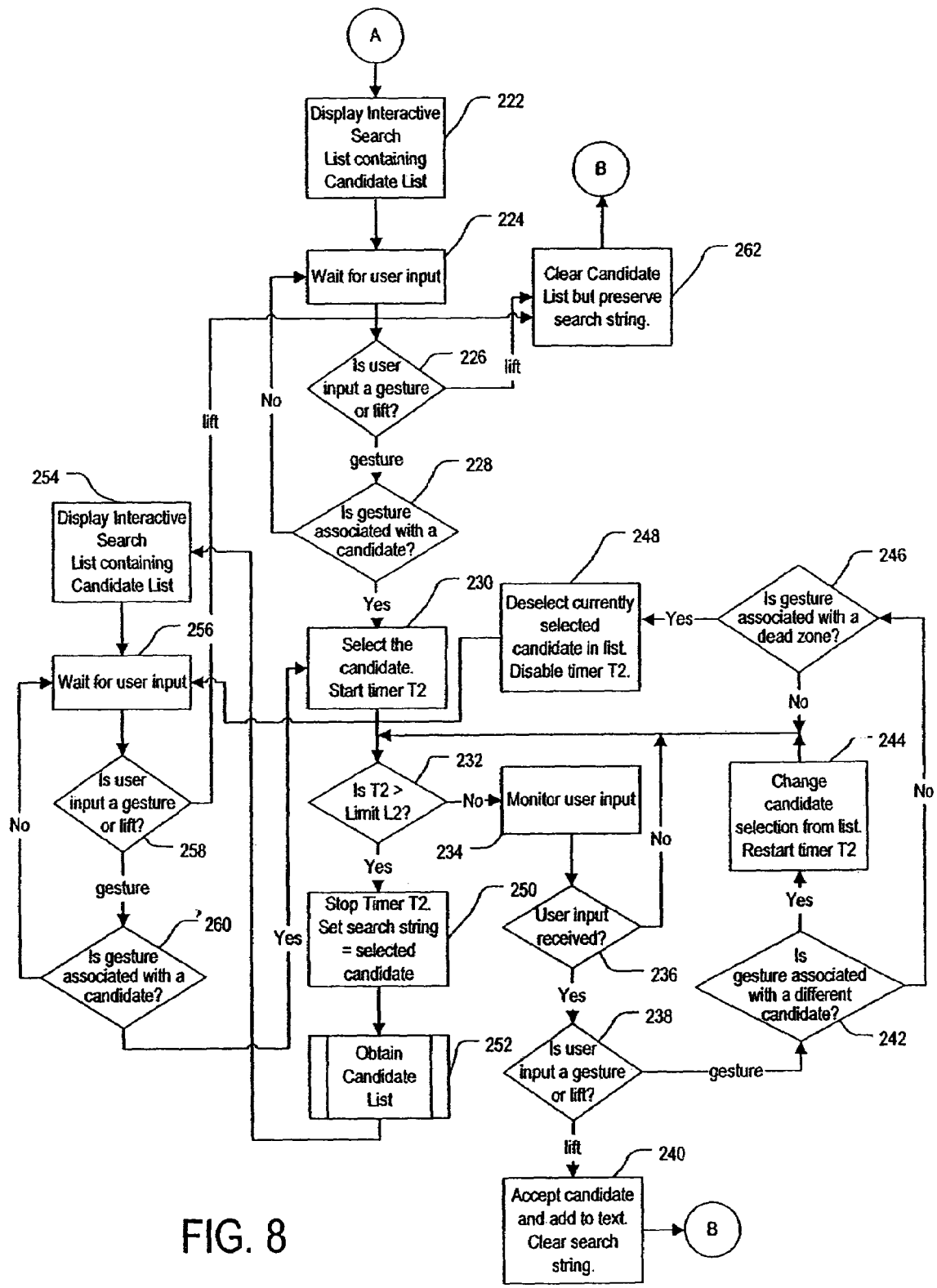

In the discussion that follows, the processing performed by the data entry system 26 running on the processing unit 12 is described in further detail. For this discussion, reference is made to FIG. 7 to 9 which are logical flow diagrams illustrating the flow of operation of the data entry system 26. The description of the computer-implemented process illustrated in FIG. 7 to 9 will be made with reference to the personal computing device 10 and the data entry system 26 shown in FIG. 1 to 5.

The data entry system 26 is initialized at block 202. This includes the initialization of variables and flags used within the data entry system 26 to track the state of user input, processing, and output. This also involves initializing the user interface for the data entry system 26 including loading and setting up the digital keyboard 28 for display, selecting the dictionary 20 to be used by the data entry system 26, identifying the type of pointing device that will be used for text entry, and setting up any user-defined configurations for the display and use of the digital keyboard 28, and the interactive search list 30. Once the data entry system 26 including the digital keyboard 28 is initialized, the user interface for the data entry system 26 is then displayed on the touch-sensitive screen 14 at block 204. In its most basic form, the user interface initially displayed comprises the digital keyboard 28. The user interface may also include one or more toolbars or display boxes for the display of the current value of the search string and the current contents of the interactive search list 30. With the interface initialized and displayed on the touch-sensitive screen 14, the data entry system 26 awaits for user input from the pointing device at block 206. Once user input is received at block 206, the data entry system 26 determines at block 208 whether the user input received by the data entry system 26 at block 206 corresponds to any of the characters displayed on the digital keyboard 28. If the user input is found at block 208 to correspond with a character displayed in the digital keyboard 28, then that character is added to the search string at block 210. As indicated earlier, the search string is used by the candidate prediction system 32 to search the dictionary 20 for potential completion candidates. In the first embodiment, the candidate prediction system 32 continuously retrieves a list of completion candidates from the dictionary 20 as contents of the search string change. As the user modifies the current partial text entry under construction, the contents of the search string are modified and used by the candidate prediction system 32 at block 212 to obtain a new list of completion candidates from the dictionary 20.

Figure 9:
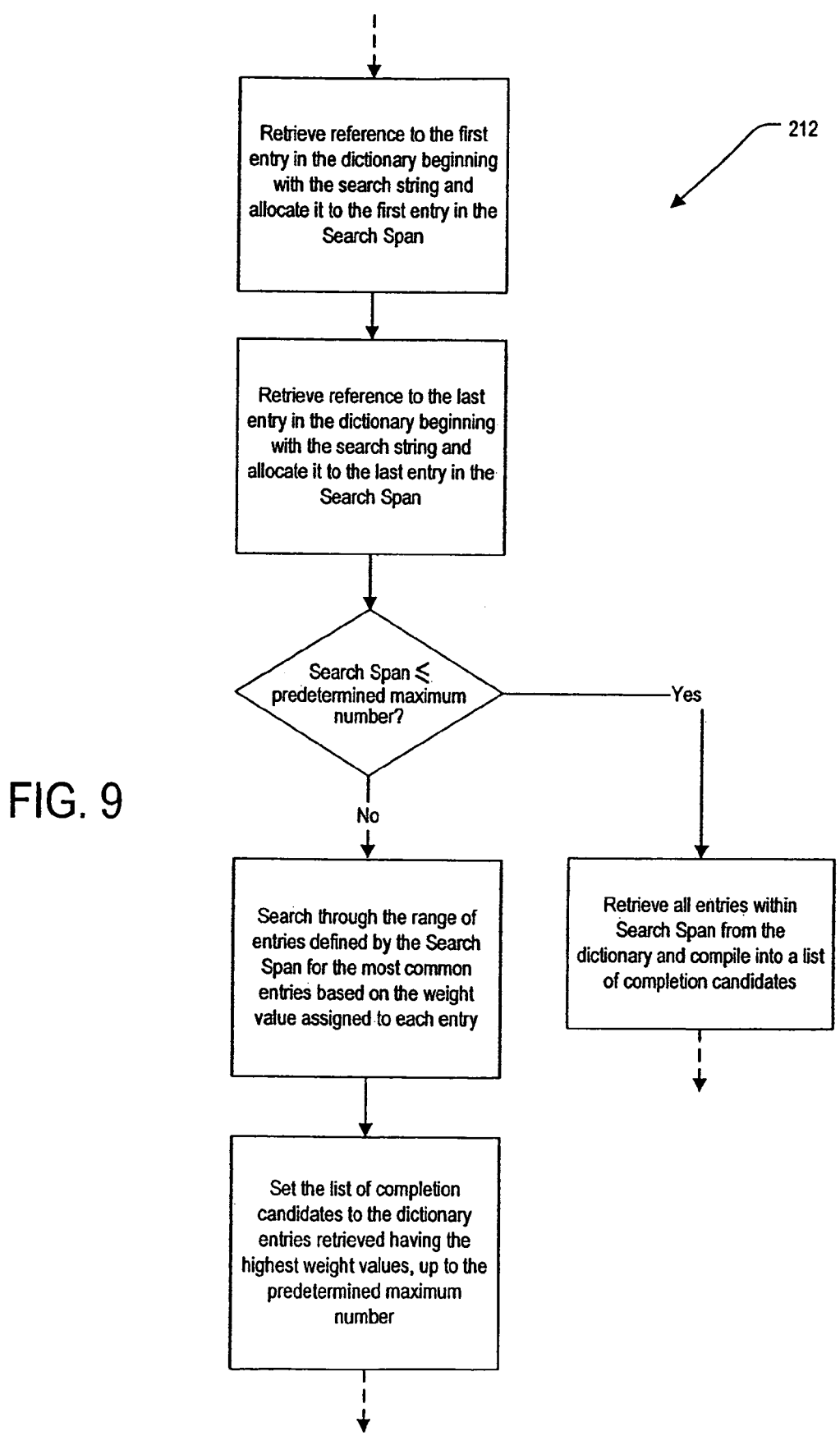

The operation of the candidate prediction system 32 for the first embodiment is further illustrated in FIG. 9. As illustrated in FIG. 9 for the first embodiment, the candidate prediction system 32 retrieves the first and last entry from the dictionary 20 that begin with the contents of the search string. The first and last entry retrieved are then used to define a search span. If the search span is greater than the number of completion candidates that the data entry system 26 is programmed to display, then the completion candidates within the search span having the highest corresponding weight values (for example, frequency values) are retrieved up to the maximum number of permissible completion candidates which may be displayed in the interactive search list 30. The completion candidates retrieved by the candidate prediction system 32 in this manner are then compiled into a list of completion candidates which is used for display in the interactive search list 30. In the case of the first embodiment, this involves very little processing as the list of completion candidates is updated whenever the partial text entry currently under development by the user is modified. As indicated earlier, however, in an alternative embodiment, the interactive search list 30 containing a list of completion candidates may be generated once the user invokes activation of the interactive search list 30 by pausing on a key on the digital keyboard 28 (i.e. following block 214).

Once a character has been added to the search string at block 210, the data entry system 26 determines at block 214 whether or not the pointing device has been released from the touch-sensitive screen 14 within the predetermined time limit L1. If the data entry system 26 finds that the pointing device has been released within the time limit L1, processing returns to block 206 where the data entry system 26 waits for further user input. This allows the user to use the digital keyboard 28 to type out a portion or all of a desired text entry by briefly tapping on keys on the digital keyboard 28 one keystroke at a time. On the other hand, if the data entry system 26 determines at block 214 that the pointing device has not been released within the time limit L1, the data entry system 26 determines at block 216 whether or not the list of completion candidates (also referred to and shown in the drawings as a candidate list) is empty. If the candidate list is found to be empty at block 216, then the candidate prediction system 32 has not found any completion candidates in the dictionary 20 which would potentially complete the partial text entry under development by the user. In this case, processing returns to block 206. From the user's perspective, with no possible candidates having been retrieved from the dictionary 20, the user can complete the desired text entry by continuing to type in the remaining characters from the digital keyboard 28 or may otherwise modify the partial text entry under development using other function keys available on the user interface (such as canceling the current partial text entry or backspacing one or more characters in the partial text entry). If, on the other hand, the list of completion candidates is found not to be empty at block 216, then the digital keyboard 28 is disabled at block 218 and the interactive search list 30 containing the candidate list obtained in block 212 is displayed within the interactive search list 30 on the touch-sensitive screen 14 at block 222 and the data entry system 26 waits for further user input at block 224.

It will be recalled that once the user has activated the display of the interactive search list 30 containing a list of completion candidates, the user can use the data entry system 26 to take one of several actions. The user can deactivate the interactive search list 30 and return to modifying or editing the current partial text entry by lifting the pointing device from the touch-sensitive screen 14 without any significant movement. If this action is detected at block 226 then the candidate list is cleared and the search string contents are preserved at block 262. Processing then returns to block 204 where the user can continue modifying the current partial text entry using the digital keyboard 28.

If, on the other hand, the user input received at block 224 is identified at block 226 as being a gesture, then the gesture is analyzed at block 228 to determine if it is associated with a completion candidate displayed in the interactive search list 30. If the gesture is found to be associated with a completion candidate in the interactive search list 30, then that completion candidate is selected from the interactive search list 30 at block 230. Preferably, when a completion candidate is selected in the interactive search list 30 at block 230, the selected completion candidate is highlighted or otherwise emphasized in some way to the user.

When a completion candidate is selected at block 230, a timer T2 is started. The timer T2 is used in the first embodiment to monitor how long the selected completion candidate remains selected by the user. As will be recalled, the user can select one of the completion candidates in the interactive search list 30 and use the selected completion candidate to either replace the partial text entry that the user is currently entering or use the selected completion candidate to initiate a further automated search to obtain a more refined list of completion candidates from the dictionary 20. In the first embodiment, the timer T2 is used to distinguish between these latter two types of operations which the user may initiate with the pointing device using the selected completion candidate. It should be noted that if the gesture analyzed at block 228 is not found to be associated with the completion candidate, then processing returns to block 224 where the data entry system 26 awaits further user input from the pointing device for analysis at block 226.

Once a completion candidate has been selected from the interactive search list 30 at block 230, the data entry system 26 monitors the timer T2 at block 232 and monitors for further user input. If the data entry system 26 detects further user input from the pointing device at block 236, the timer T2 has not exceeded the predetermined time limit L2 and the user input is analyzed at block 238 to determine whether the user has initiated a gesture or lift with the pointing device. If a lift is detected at block 238, then this event serves as an indication to the data entry system 26 that the selected candidate in the interactive search list 30 has been accepted by the user, in which case the completion candidate is added to the text in place of the potential text entry and the search string is cleared at block 240. Once a selected completion candidate has been added to the text at block 240, the data entry system 26 returns to block 204 where the initialized user interface is displayed on the touch-sensitive screen 14, and the data entry system 26 awaits for further user input at block 206. Any new characters received by the data entry system 26 are then treated as being part of a new partial text entry.

If, on the other hand, a gesture is detected at block 238, then the gesture is analyzed to determine if it is associated with a different completion candidate in the interactive search list 30 at block 242, and if the answer to the analysis of block 242 is "YES", then the data entry system 26 changes the completion candidate selection from the interactive search list 30 and restarts the timer T2 at block 244. The data entry system 26 then continues to monitor the timer T2 at block 232 and user input at block 234. From the user's perspective, a different completion candidate from the list of completion candidates is highlighted. If a gesture is detected at block 238, but that gesture is not found to be associated with a different candidate at block 242, then the data entry system 26 determines at block 246 whether the gesture is associated with a dead zone on the user interface. As discussed, dead zones are used to allow the user to deselect a selected completion candidate and to pause to consider what further action the user may wish to take. Dead zones are particularly useful when a timer such as timer T2 is used as the triggering mechanism to determine when a selected completion candidate is to be used to initiate a further automated search of the dictionary 20. If a gesture is found to be associated with a dead zone at block 246, the currently selected completion candidate from the interactive search list 30 is deselected at block 248, the timer T2 is disabled, and the data entry system 26 awaits for further user input at block 256. Otherwise, processing returns to block 232.

If the timer T2 is found at any time at block 232 to have exceeded the predetermined time limit L2, then this event serves as an indication to the data entry system 26 that the selected candidate is to be used to initiate a further automated search, in which case processing proceeds to block 250 where the search string is set to equal the selected completion candidate and a new list of completion candidates is obtained from the dictionary 20 at block 252. This new list of completion candidates is then displayed in the interactive search list 30 at block 254, and the data entry system 26 then awaits further user input at block 256. User input received at block 256 is analyzed at block 258 and if at block 258 the data entry system 26 determines that the user input corresponds to a gesture with the pointing device, the gesture is analyzed at block 260 to determine if the gesture generated by the pointing device is associated with any of the completion candidates from the new list of completion candidates displayed in the interactive search list 30. If the gesture is not associated with a completion candidate, then the data entry returns to block 256 and awaits for further user input from the pointing device. If, on the other hand, the gesture is associated with a completion candidate in the interactive search list 30, then the data entry system 26 returns to block 230 where the associated completion candidate is selected, the timer T2 is restarted, and the data entry system 26 then monitors to see, as before, whether or not the user will use the selected completion candidate to either replace the partial text entry or initiate a further automated search. It should be noted that when the new list of completion candidates is displayed in the interactive search list 30 at block 254, and the data entry system 26 awaits for user input at block 256, that the pointing device remains in contact with the touch-sensitive screen 14. This situation is similar to the one at blocks 222 and 224 except that the interactive search list 30 has been updated to contain a new list of completion candidates for the user to select from.

Data Entry System Features

The data entry system 26 may include a variety of features and aspects to further enhance functionality and flexibility of text entry for the user when a single pointing device is used. Furthermore, each of the following features and aspects individually provides a beneficial enhancement and is an embodiment of the present invention. These additional features and aspects of the present invention will now be described below.

Many of the features and aspects described below can also be applied in combination with various types of search lists containing completion candidates, including single and multi-level search lists.

As before, the following features and aspects can be applied to many types of personal computing devices and may be stored as computer-readable instructions in one or more types of computer-readable media.

Notification of Active Entry Mode

Figure 23:
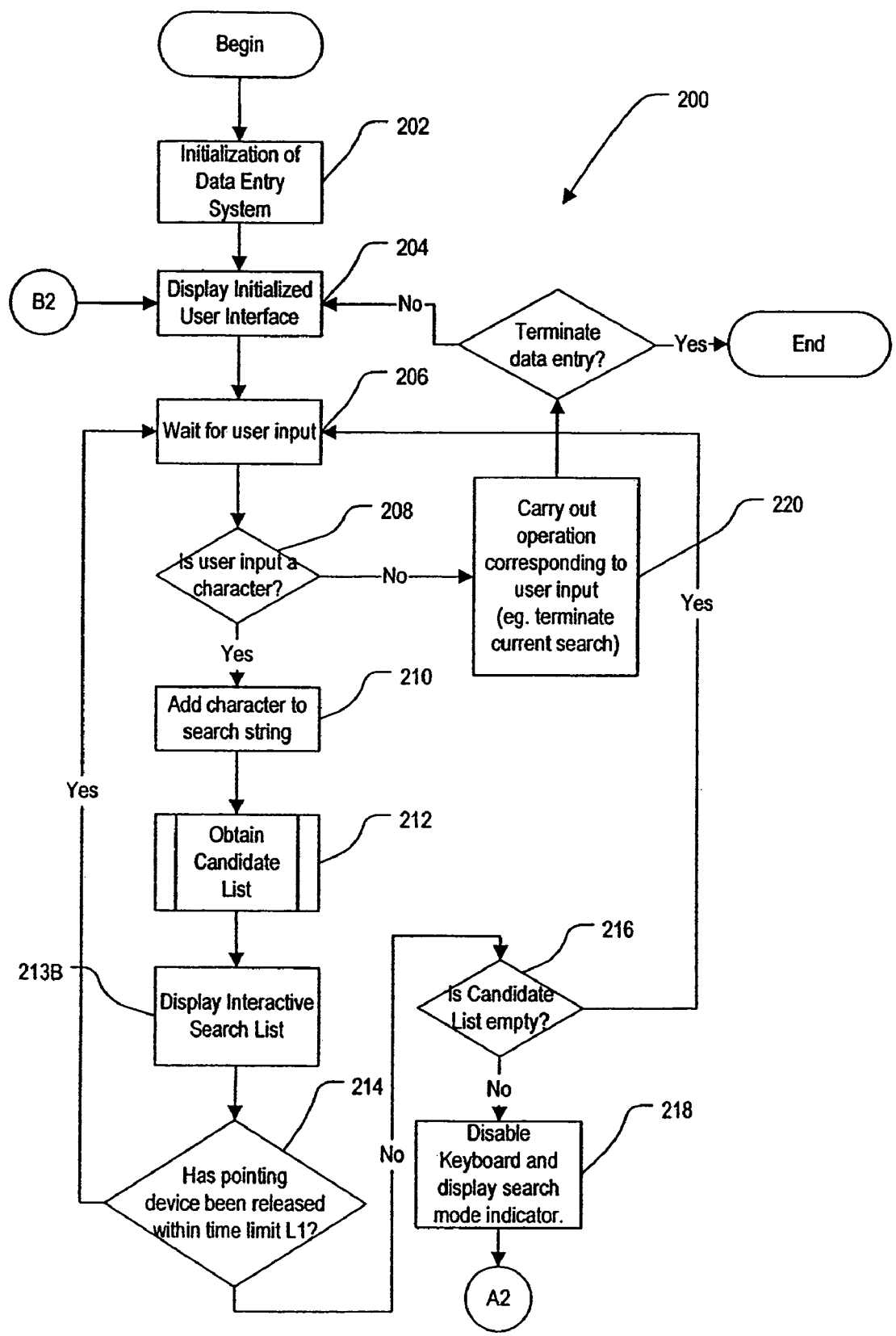
FIG. 23 to 24 are flow diagrams illustrating the flow of operation of the data entry system according to an alternative embodiment of the present invention.
Figure 24:
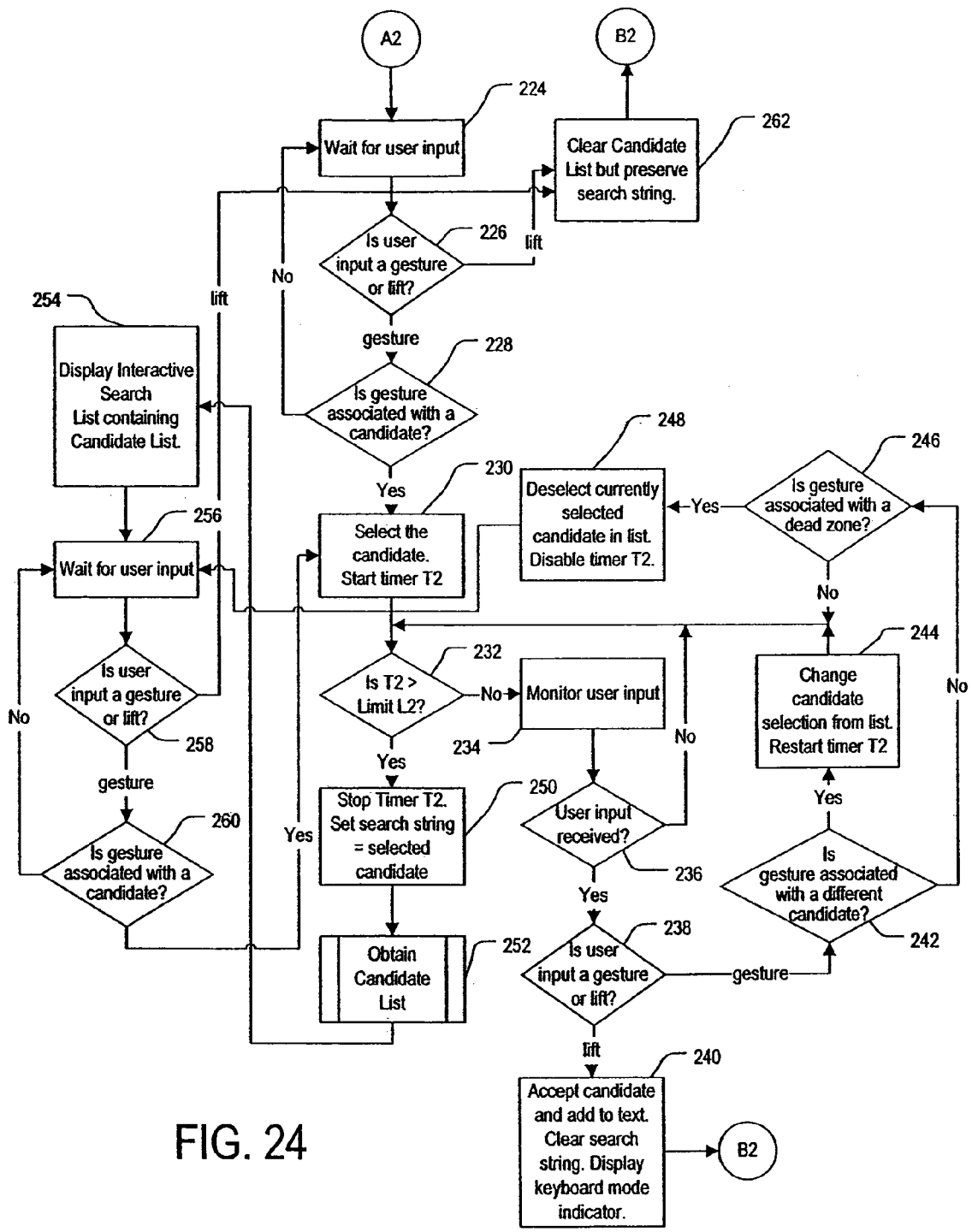

In one alternative embodiment, the data entry system 26 is programmed to notify the user of the active entry mode. In this variation, the data entry system 26 is programmed to display on the graphical user interface 34 an express indication of the currently active entry mode (as illustrated in blocks 218 and 240 of FIGS. 23 and 24). In this variation, two entry modes are tracked with the data entry system 26: (1) a keyboard mode to indicate that the digital keyboard 28 is active, and (2) a search mode to indicate that automated searching is active with the interactive search list 30. Displaying on the graphical user interface 34 an express indication of the current entry mode for the data entry system 26 is achieved by displaying a different color signal (or set of signals) on the graphical user interface 34 depending on which entry mode is currently active. Alternatively, specific icons can be assigned to each entry mode and displayed on the graphical user interface 34 when the corresponding entry mode is active. Notifying the user of the entry mode with one or more express indicators on the graphical user interface 34 minimizes the risk of the user losing track of whether the user is in keyboard mode or in search mode and enhances the ease of use of the data entry system 26. This can be particularly useful when both the digital keyboard 28 and the interactive search list 30 are displayed simultaneously on the graphical user interface 34.

Notification of Completion Candidates

Figure 21:
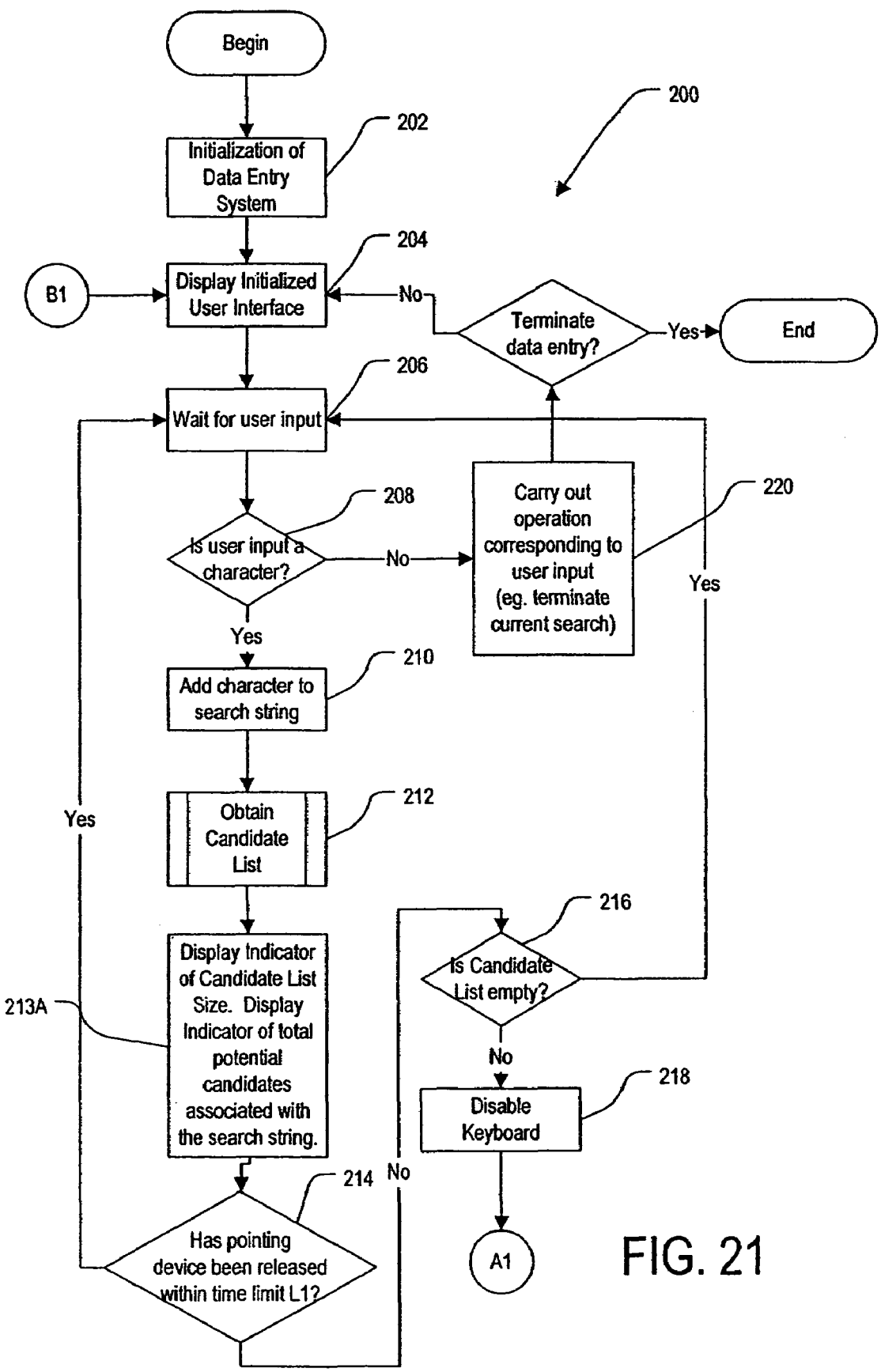
FIG. 21 to 22 are flow diagrams illustrating the flow of operation of the data entry system according to an alternative embodiment of the present invention.
Figure 22:
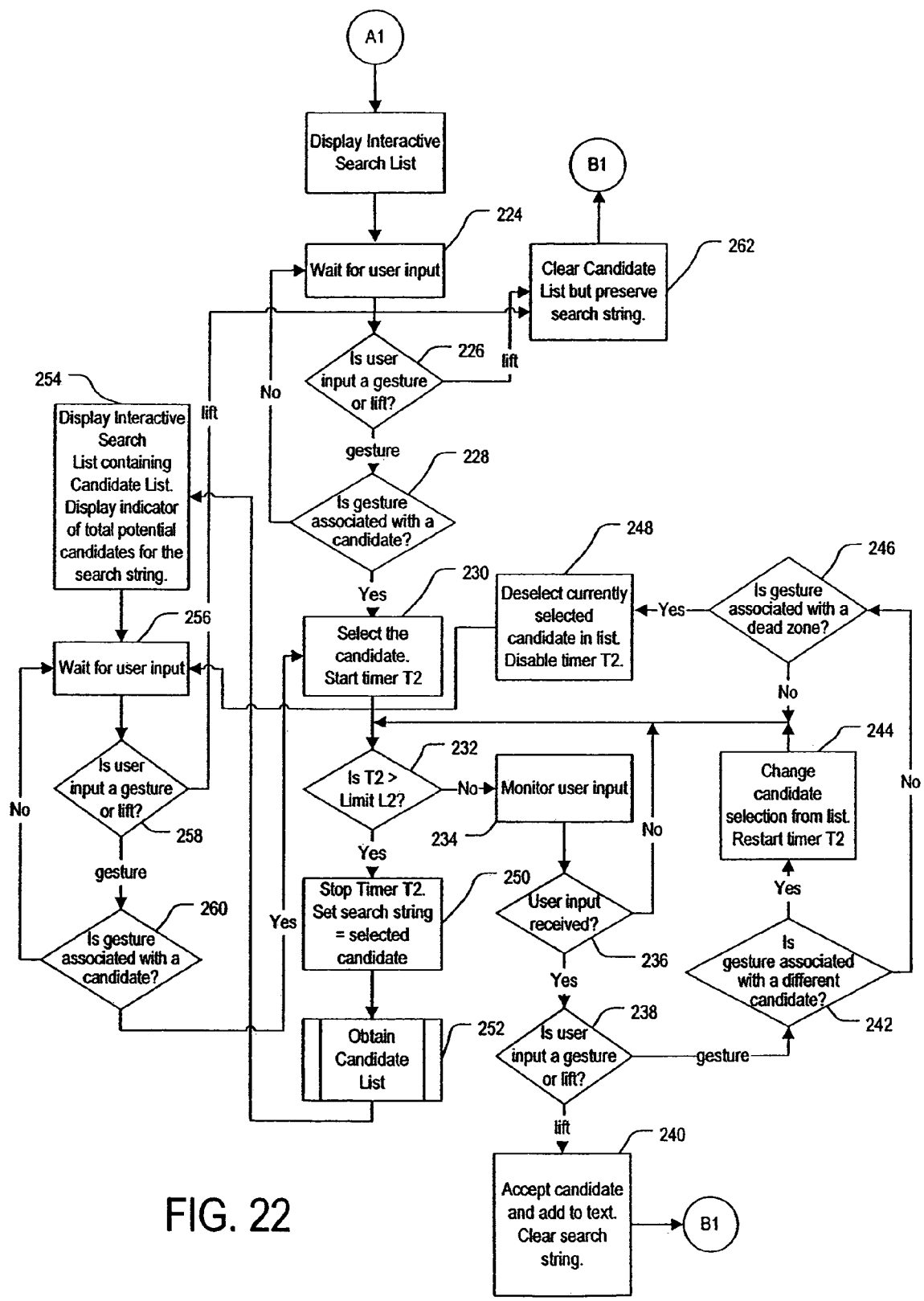

If the interactive search list 30 has fewer than the predetermined maximum number of displayable completion candidates, then this will serve as an indication to the user that the interactive search list 30 currently displayed contains all of the completion candidates in the dictionary 20 that begin with the partial text entry that the user has entered. If, however, the interactive search list 30 is full when it is activated by the user, it will not be clear from looking at the interactive search list 30 whether any other potential completion candidates for the current partial text entry may reside in the dictionary 20. In order to remove this ambiguity and expressly indicate if there are any more potential completion candidates and if so, how many, in another aspect the data entry system 26 is programmed to display on the graphical user interface 34 the number of potential completion candidates in the dictionary 20 that have leading characters matching the current partial text entry. The number of potential completion candidates is displayed and updated by the data entry system 26 when the digital keyboard 28 is in use and whenever the interactive search list 30 is activated or updated with new completion candidates (as illustrated for example at blocks 213A and 254 of FIGS. 21 and 22). Alternatively, the data entry system 26 can be programmed to display on the graphical user interface 34 a graphical indication of whether or not additional completion candidates having leading characters matching the current partial text entry are located in the dictionary 20, in addition to those candidates displayed in the interactive search list 30. Here again, the graphical indication is displayed and updated by the data entry system 26 when the digital keyboard 28 is in use and whenever the interactive search list 30 is activated or updated with new completion candidates. This notification feature enhances the user's ability to know, even before attempting to use the interactive search list 30, when automated searching may retrieve a list of possible completion candidates (or a refined list). With this advanced notification feature, the user can better decide when to continue adding further characters to the partial text entry with the digital keyboard 28 and when to activate and use the interactive search list 30.

Digital Keyboard Features

A variety of features may be implemented with the digital keyboard 28 in order to further enhance the user's ability to enter text with the data entry system 26. In one variation, the digital keyboard 28 can be programmed to be displayed in a frequency distributed layout. The frequency distributed layout takes advantage of the well known principle that certain characters in a character set are more frequently used than other characters within the same character set. For example, the digital keyboard may contain the letters of the English alphabet displayed in a frequency distributed layout based on an analysis of a large corpus of text. It will be appreciated, of course, that the characters or symbols in a particular character set may have different relative frequencies depending upon the sample population of data used to rank such characters relative to each other within a particular character set. It will be appreciated that when the data entry system 26 is employed, the frequency of characters entered may be different than that of traditional systems that enter text one character at a time. These general principles are used to generate a frequency distributed layout for the digital keyboard.

In one embodiment of the digital keyboard having a frequency distributed layout, the digital keyboard is programmed to include a plurality of characters assigned to predetermined locations within the layout for the digital keyboard according to a predetermined frequency distribution associated with the plurality of characters. The plurality of characters displayed on the digital keyboard include less commonly used characters and more commonly used characters based on the predetermined frequency distribution. In this embodiment, the digital keyboard is displayed on a graphical user interface with the less commonly used characters displayed substantially further from the center of the digital keyboard than the more commonly used characters. An example of this type of digital keyboard is illustrated generally in FIG. 3 except that the "space" key has been located in the outer ring rather than closer to the center of the digital keyboard 28. An example of the digital keyboard 28 having a frequency distributed layout with the space key near the center is shown in FIG. 10.

With the frequency distributed layout, it is preferable that the image of the digital keyboard 28, when substantially circular or elliptical, has a first group of most frequently used characters (i.e. the most commonly used characters) located substantially near to the center of the digital keyboard 28 with at least one group of less frequently used characters (relative to the first group) displayed at a distance further from the center of the keyboard than the characters of the first group. As illustrated by FIG. 3, the digital keyboard 28 is preferably configured to be displayed in a frequency distributed layout comprising a plurality of characters arranged into rings. When the characters on the digital keyboard 28 are arranged into rings, then the characters in a particular ring can be arranged to each be about the same distance from the center of the digital keyboard 28 providing some uniformity to the movements required to enter text. This can also be useful for certain arrangements including, for example, when the digital keyboard 28 is programmed to be dynamically re-positionable as discussed further below.

Figure 10:
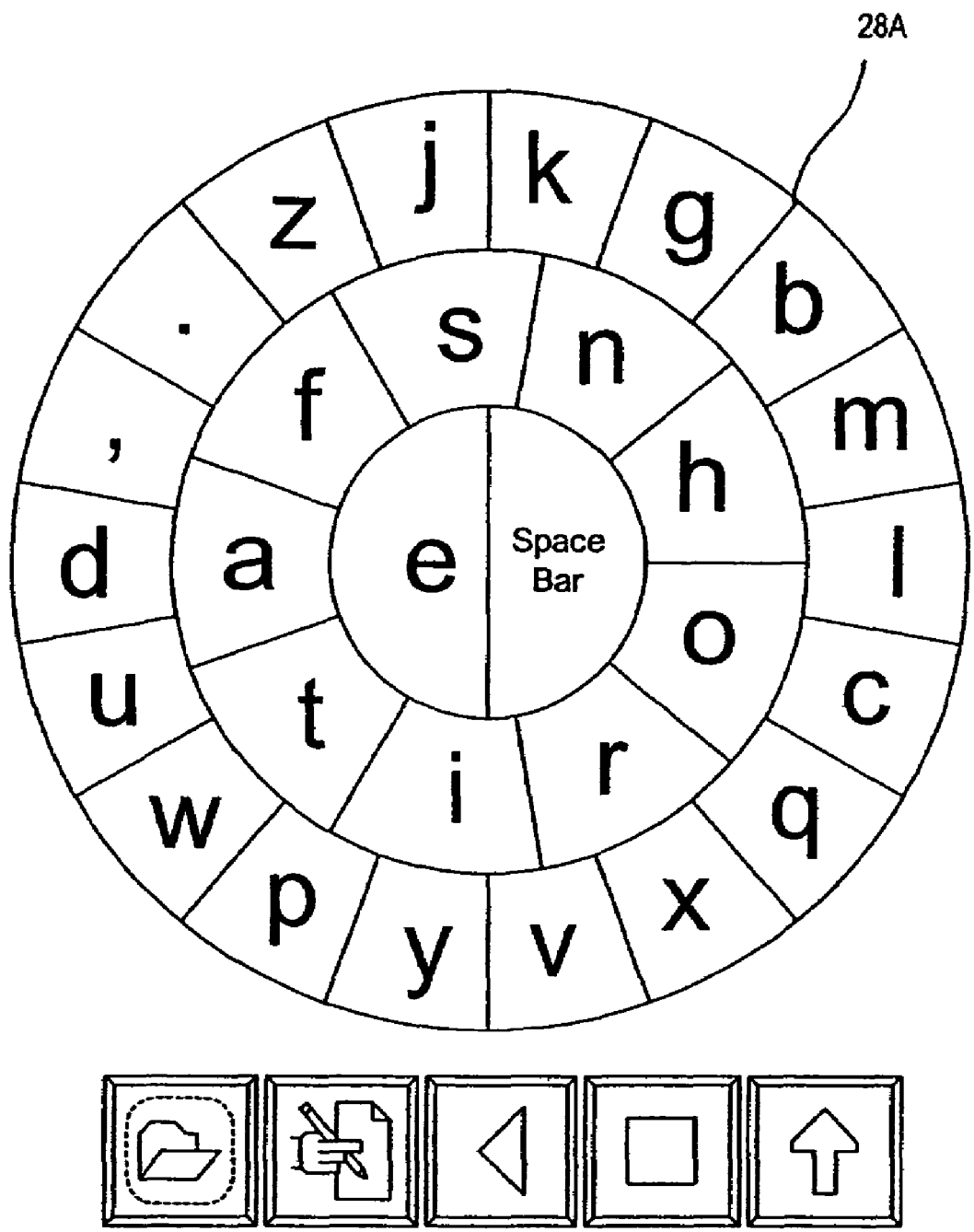
FIG. 10 is a schematic representation of an alternative embodiment of a digital keyboard layout according to the present invention.
Figure 10:
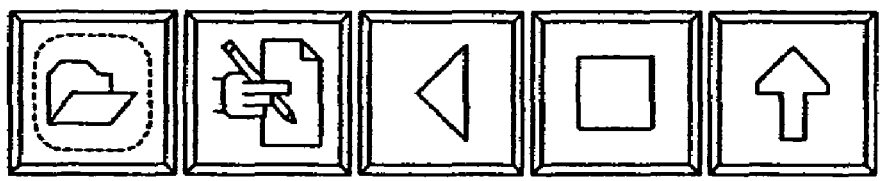

In the keyboard layouts shown in FIGS. 3 and 10, at least one most commonly used character of a pre-selected character set or subset (such as a subset or the ASCII character set) is located substantially in or near the center of the digital keyboard 28. As also shown, the next most commonly used characters are located within an intermediate ring, and the less commonly used characters of the character set are distributed in an outer ring of the digital keyboard 28. When the most commonly used characters are located in or close to the center of the digital keyboard 28, the degree of movement required with a pointing device to select characters displayed within the intermediate or inner rings of the digital keyboard 28 is minimized. In addition, arranging characters on the digital keyboard 28 in concentric-like rings according to their frequency of use provides an easy and efficient mechanism for retrieving characters and entering data using a pointing device.

When rings are used with the digital keyboard 28, it will be appreciated that the arrangements of the characters within each ring is by no means limited to the layout shown in FIG. 3 or 10. For instance, the characters within a particular ring may be organized alphabetically in a clockwise (or counter clockwise) order. A challenge with many keyboard designs is that they take time to learn. The above ordered organization increases the opportunity to quickly learn and recall the location of characters displayed on the digital keyboard 28, since user's are already familiar with this clockwise distribution. In another variation, the characters in one half of a ring (for example, the upper half) may be ordered alphabetically in one direction (for example, clockwise), and all characters in the other half of the same ring (for example, the lower half) may be ordered alphabetically in the other direction (counter-clockwise). These type of organizations within the rings can also enable a user to more quickly learn to locate a desired character displayed in the digital keyboard 28.

Several other characteristics of the digital keyboard 28 may also vary. In general, the type of characters displayed and available, the type and number of characters displayed on particular keys of the digital keyboard 28, the font size of each character displayed, and the value to be processed when a particular key is contacted (or selected) may all vary from keyboard to keyboard. As well, to minimize clutter the digital keyboard 28 can be displayed with no graphics outlining the keys on the digital keyboard 28. For circular or ring-like keyboard layouts, several other characteristics may also vary, including the number of rings making up the keyboard layout, the number of keys displayed in each ring, and in the keyboard as a whole and the thickness or width of each ring.

Figure 11:
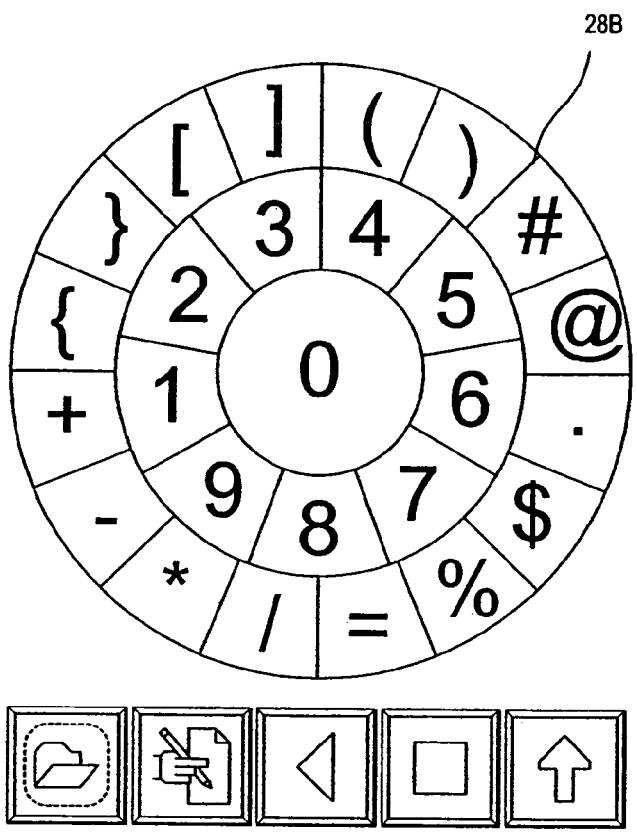
FIG. 11 is a schematic representation of another alternative embodiment of a digital keyboard layout according to the present invention.
Figure 12:
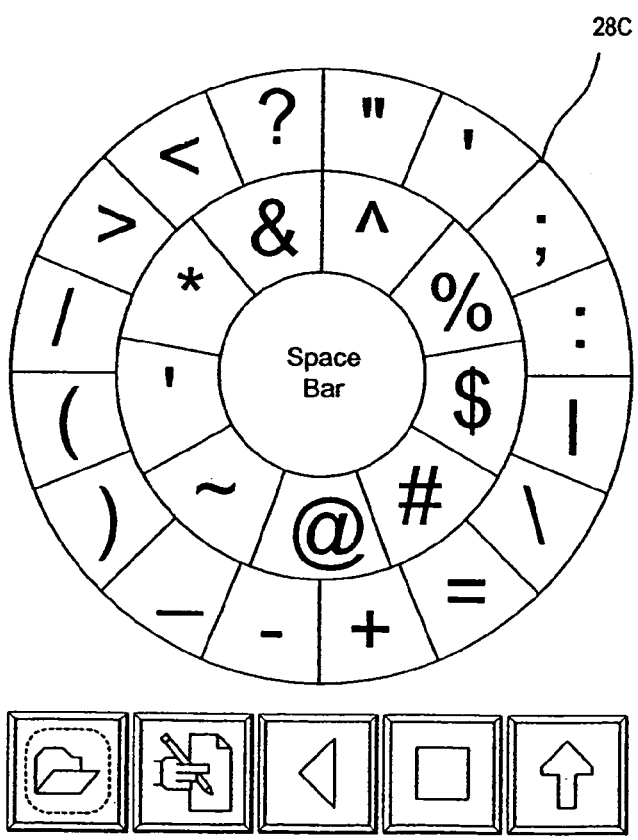
FIG. 12 is a schematic representation of another alternative embodiment of a digital keyboard layout according to the present invention.

In another variation, the digital keyboard 28 layout may be dynamically replaced by the user with another keyboard layout. This feature can be particularly advantageous when it is desirable to permit a user to quickly swap between several keyboard layouts (for example, as between the keyboard layouts in FIGS. 10, 11 and 12), as in the case where the touch-sensitive screen 14 is relatively small or the number of characters required to enter data exceeds the space available to display the digital keyboard 28 within a location on the touch-sensitive screen 14. Permitting the user to swap between multiple keyboard layouts provides the user with a significant degree of flexibility when entering characters with the data entry system 26. In addition, when multiple keyboard layouts are available, they can be organized according to various subclasses of characters. For instance, a default keyboard layout may contain alphabetic characters. A second keyboard layout may contain numeric characters. A third keyboard layout may contain special characters. Grouping a character set into logical subgroups and organizing these subgroups on multiple keyboard layouts provides the user with the ability to logically navigate amongst different types of keyboard layouts when desired. Preferably, the user may activate a particular keyboard layout using one or more hot keys each associated with at least one of the available keyboard layouts. A hot key may be any key or function associated with the digital keyboard 28 that triggers the display of an alternative keyboard layout. When a hot key associated with a particular keyboard layout is selected by the user from the digital keyboard 28, the currently displayed keyboard layout is replaced with the keyboard layout associated with the selected hot key.

In another variation, a number of different related symbols or characters may be accessed through one key on the digital keyboard 28. For example, when the user touches a punctuation key, a number of different punctuation marks may be displayed, and the user may select one of these choices by gesturing to select the desired symbol or character.

Dictionary Features

In another aspect of the present invention, multiple dictionaries may be stored in the computer-readable medium 16 (FIG. 1), with each dictionary containing completion candidates with associated weight values for ranking completion candidates relative to each other. For example, the weight values may represent frequency of use values weighted according to usage in a particular language or a particular field of use (eg. engineering, general business, law, accounting) or a particular user's use. With multiple dictionaries, a user may readily switch between language sets or language subsets or dictionaries for a particular application.

In one variation, the data entry system 26 (for example, in FIG. 1 to 5) can contain multiple simultaneously accessible dictionaries that the user can enable and disable individually. For instance, the data entry system 26 can have a first dictionary containing completion candidates based on Oxford English and a second dictionary containing completion candidates based on American English, both active at the same time and both accessed and used by the candidate prediction system 32 when a list of completion candidates is to be obtained. As another example, the data entry system 26 can have a legal dictionary, a civil engineering dictionary, and a regular American English dictionary all active simultaneously. This feature enables the user to obtain a list of completion candidates simultaneously containing variations on particular words, phrases, or character sequences particular to specific areas of practice or particular to specific types of dictionaries.

Figure 25:
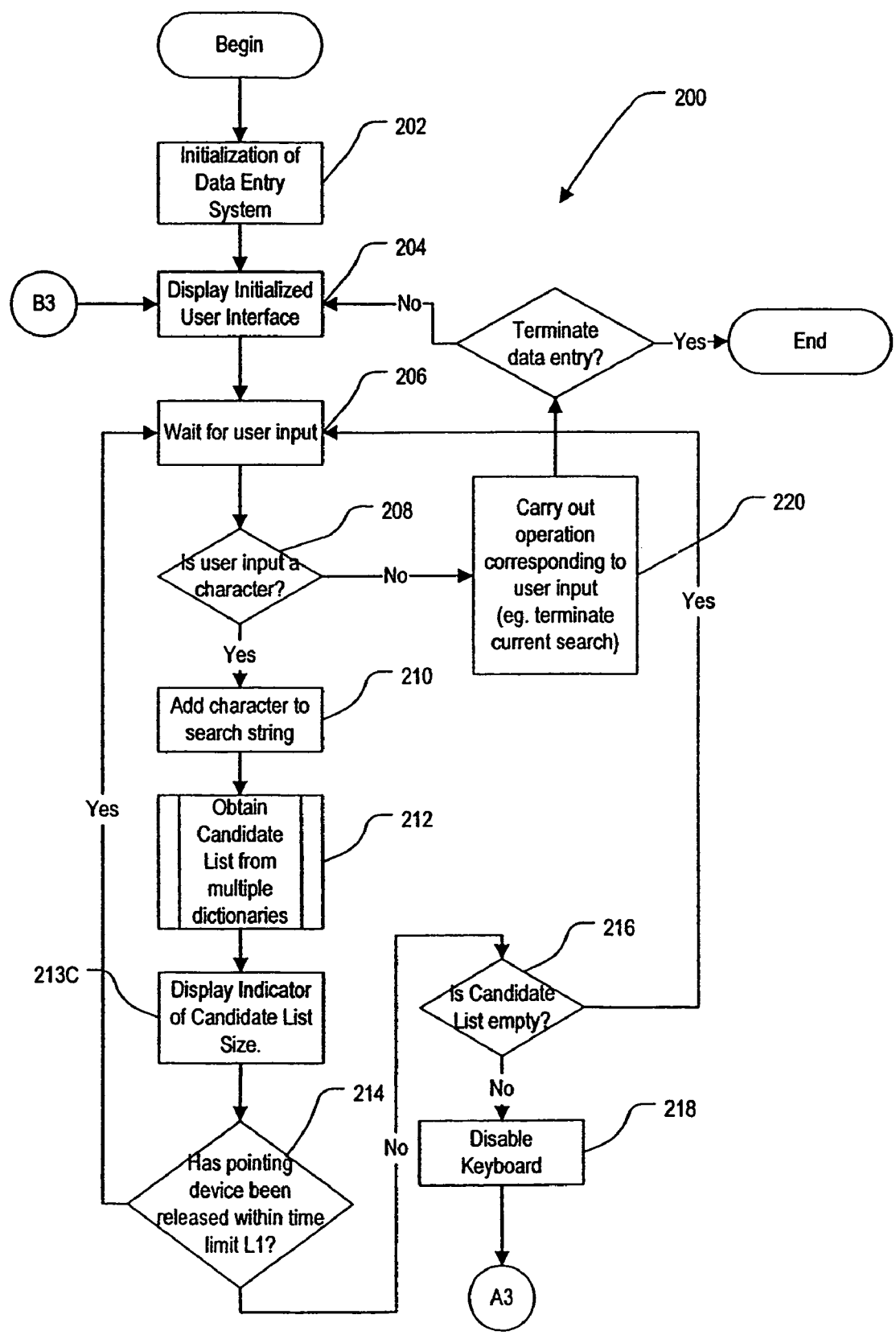
FIG. 25 to 26 are flow diagrams illustrating the flow of operation of the data entry system according to an alternative embodiment of the present invention.
Figure 26:
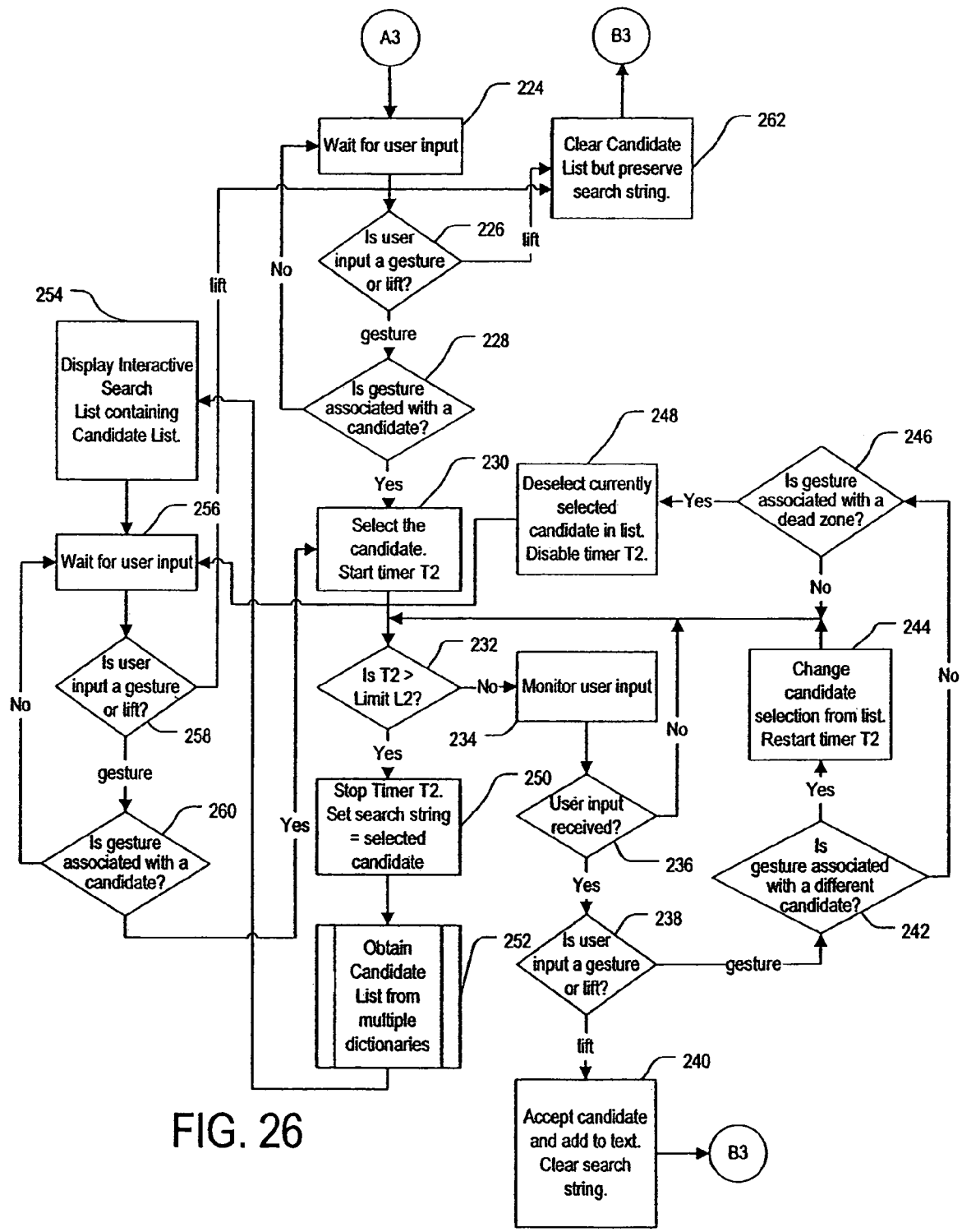

With multiple, simultaneously accessible dictionaries, the candidate prediction system 32 can be programmed to retrieve completion candidates from two or more dictionaries, each having their own weighting function for completion candidates (as illustrated in blocks 212 and 252 of FIGS. 25 and 26). When this is done, the candidate prediction system 32 can generate a final list of completion candidates based on a combining function that takes into account the weight values associated with the completion candidates retrieved from the multiple dictionaries and which also prioritizes the completion candidates based on the source dictionary from which a particular completion candidate is retrieved. By way of example, the candidate prediction system 32 may be programmed to include in the final list the top N completion candidates (where $N \geq 1$) from each list of completion candidates retrieved from the multiple dictionaries.

A predefined dictionary may also be modified or generated based on a particular user's usage of particular words or character sequences over the course of using the data entry system 26. Such a "personalized" dictionary may also be used to produce lists of the most common completion candidates used by a user. For example, the actual usage of completion candidates from the dictionary may be tracked by the data entry system 26. A personalized dictionary may also be used in combination with other dictionaries. For example, using a standardized dictionary and a personalize dictionary the candidate prediction system 32 may be programmed to give priority first to completion candidates (up to a predetermined limit) beginning with the contents of the search string and recorded in the personalized dictionary as having the highest weight values, and then, if space remains in the interactive search list 30, to completion candidates having the highest weight values in the standardized dictionary and beginning with the contents of the search string. As another example, a new dictionary may be generated based on the completion candidates selected by the user through the use of the data entry system 26 over time. The user may activate the new dictionary at any time so that it takes priority over any pre-existing dictionary(ies) if completion candidates beginning with the search string are located in the new dictionary.

In another variation of the dictionary 20 and the use of the dictionary 20 via the data entry system 26 of the present invention, the data entry system 26 may be programmed to monitor a specific user's pattern of usage of completion candidates from the interactive search list 30 over time. For example, as completion candidates are selected by the user and entered into the text using the data entry system 26, an additional weight field in each entry of the dictionary 20 may be used by the data entry system 26 to track the user's actual frequency of completion candidate usage. In this user-oriented variation the candidate prediction system 32 may be configured to find the most common completion candidates in the dictionary 20 beginning with a search string based firstly on the degree of actual user usage tracked in the additional usage fields of the dictionary 20 associated with completion candidates therein, and secondly based on the predefined weight fields 24 if the additional usage fields are null or are less than a predetermined threshold value defining a minimum percentage level of usage for evaluation, or if the list of completion candidates retrieved using the additional usage fields results in a number of completion candidates less than the maximum number which may be displayed with the interactive search list 30. In such a user-oriented variation, the candidate prediction system 32 tracks the total number of selections made from the dictionary 20 (for example, in a TOTAL_USAGE field in the candidate prediction system 32) over time by the user, as well as the total number of occasions on which a particular completion candidate in the dictionary 20 is actually used by the user to replace a partial text entry (for example, in a COMPLETION_CANDIDATE_USAGE field in the candidate prediction system 32). To determine whether or not an additional usage field for a particular completion candidate in the dictionary is less than the predetermined threshold value for acceptable usage and evaluation, the data entry system 26 compares the value COMPLETION_ CANDIDATE_USAGE/TOTAL_USAGE with the predetermined threshold value. In such a variation the endmost commonly used completion candidates retrieved for display may be configured based primarily on the user's actual completion candidate usage as opposed to a predefined frequency distribution preprogrammed into fields 24 of the dictionary 20.

It will be further appreciated from reading this specification that including common word prefixes in lists of completion candidates can reduce user effort in arriving at the desired final completion candidate. The inclusion of prefixes provides for one common entry path to all words that begin with that prefix. Compared to using an initial candidate list which, for example, simply lists all words beginning with certain characters this alternative method may in turn shorten the number of searches, or search iterations, required to find the final completion candidate. This results because the weight field for the prefix completion candidate can be made the sum of the weight fields for all entries that begin with the prefix which in turn means the prefix is more likely to show up at an earlier stage of an iterative search sequence.

An example of this is if the desired final candidate is the word 'telescope'. Without the use of prefixes the user might enter 't' but find no words beginning with 'tele' in the completion candidate list. This would then require the user to enter the next letter 'e' however telescope may still not have a high enough weight to show up in the next list of completion candidates and so the process would continue. The use of prefixes as completion candidates can shorten this process since the combined weight of all completion candidates beginning with 'tele' would cause this prefix to show up early in the search process, possibly as soon as 't' is entered, which would then allow the user to immediately narrow the search to only those words beginning with the characters 'tele'. Because the desired candidate is found after fewer searches or search iterations it reduces the memory load on the user which in turn can ease learning of the necessary sequence of operations the user must perform to enter words that begin with those prefixes."

Re-Positionable Keyboard

In another aspect of the present invention, the digital keyboard 28 is programmed to be dynamically re-positionable so as to follow the pointing device. When the digital keyboard 28 is programmed to be dynamically re-positionable, its image follows the movement of the pointing device on the touch-sensitive screen 14 so that the keyboard image remains generally centered beneath the pointing device after each keyboard selection. In this aspect, whenever the data entry system 26 is in keyboard mode, the digital keyboard 28 is programmed to automatically re-center itself on a location within the graphical user interface 34 associated with a last known set of position coordinates for the pointing device. For example, if the character "u" is selected with the pointing device from the digital keyboard 28 in FIG. 3, the digital keyboard 28 re-centers itself substantially over the position coordinates which were used by the pointing device to select the character "u". By substantially re-centering the digital keyboard 28 over the last known set of position coordinates for the pointing device, the position and distance of the keys on the digital keyboard 28 relative to the user's pointing device remains substantially constant. This provides a uniform mechanism for consistently selecting the same key on the digital keyboard 28 using substantially the same movement with the pointing device. In addition, when the digital keyboard 28 is dynamically re-positionable the degree and frequency with which the user is required to reposition the pointing device after selecting keyboard characters is minimized. If this re-positionable feature is combined with a frequency distributed keyboard having the most common characters near the center, the pointing device will generally always rest in the center of the most common characters. If the frequency distributed keyboard is made up of rings, then each of the characters in a particular ring will be equidistant from the pointing device when the pointing device is resting in the center of the keyboard, resulting in a uniformity of movement for character entry.

When the digital keyboard 28 is programmed to be dynamically re-positionable, it may also be programmed to reposition to a substantially central location within the graphical user interface 34 (or to another user-definable position) when the digital keyboard 28 approaches within a predetermined distance of any of the boundaries of the graphical user interface 34. Repositioning the digital keyboard 28 in this way provides a mechanism to adjust for circumstances where the digital keyboard 28 drifts too close to a boundary of the touch-sensitive screen 14. In an alternative repositioning mechanism, a hot key may be used to automatically re-center the digital keyboard 28. In yet another alternative, the dynamically re-positionable digital keyboard 28 may be programmed to re-center about position coordinates for the pointing device when the position coordinates correspond to a part of the graphical user interface 34 (or screen) that is not currently occupied by the digital keyboard 28. For example, if the digital keyboard 28 approaches an edge of the graphical user interface 34 the user can simply touch down in a center of the graphical user interface 34 and the digital keyboard 28 will relocate to that point.

When the digital keyboard 28 is dynamically re-positionable, it is preferable in general that the amount of keyboard movement, or drift, is minimized. This can be achieved by arranging the keyboard layout so that the keyboard characters are distributed about the digital keyboard 28 in a configuration that reduces the amount of drifting experienced when it is dynamically re-positionable. One way of achieving this is by configuring the digital keyboard 28 so that the total of the frequency of use values for characters located within a particular portion (or sector) of the digital keyboard 28 is substantially the same as other similarly shaped portions (sectors) of the digital keyboard 28. It will be recalled that for the frequency distributed arrangement of keyboard characters discussed earlier, each keyboard character has a predetermined frequency of use value assigned to (or associated with) it. In order to minimize drifting, the digital keyboard 28 may be divided into notional, substantially equally shaped sectors, and the keyboard characters may be assigned to locations within the digital keyboard 28 such that the total of combined frequency values for characters within a particular sector of the digital keyboard 28 is substantially equal to the total of combined frequency values for characters within any of the other sectors of the digital keyboard 28. In this way, the likelihood of selecting a character from any one of the predetermined sectors of the digital keyboard 28 is substantially the same. Thus, if one wishes to minimize drift in the case of the circular-type digital keyboard 28 layout in FIG. 3, it is preferable that the keyboard characters are distributed such that when the digital keyboard 28 is notionally divided into substantially equally shaped wedge-like sectors, each sector of the keyboard has substantially the same total 'weight' of characters, according to their frequency of use, as each of the other sectors.

Figure 13:
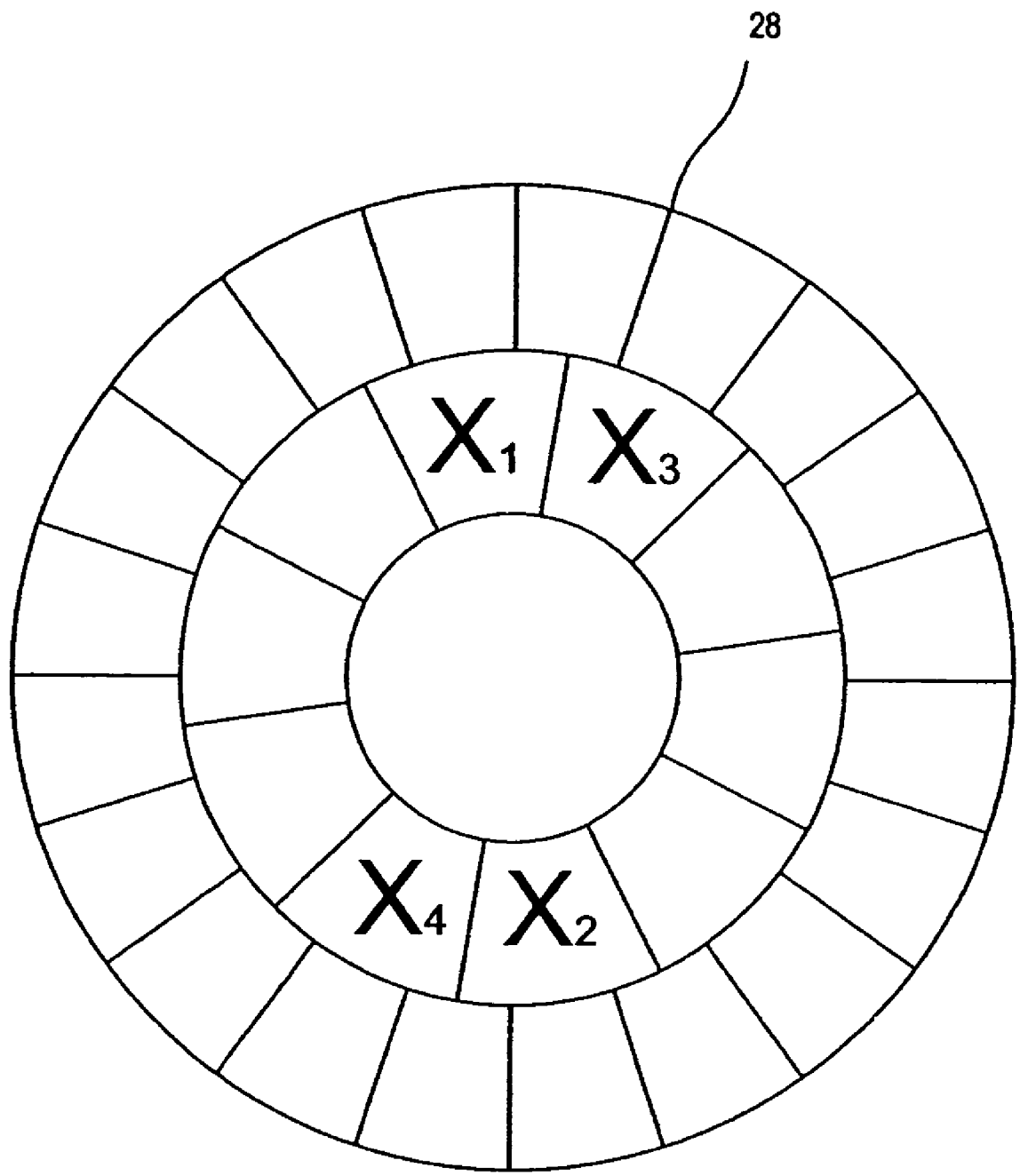
FIG. 13 is a schematic representation of another configuration of a digital keyboard according to an embodiment of the present invention.

Another way to minimize drift is to configure the digital keyboard 28 in a substantially symmetric layout of characters with pairs of opposing characters displayed on the digital keyboard 28 having substantially similar frequencies of use. With this configuration, the frequency of use of one character in a pair of opposing characters is as close as possible to that of the other character in the pair. An example of this configuration is shown in FIG. 13 which shows the frequencies ($f(X_1)$ and $f(X_2)$) of characters $X_1$ and $X_2$ being substantially the same as each other, and the frequencies ($f(X_3)$ and $f(X_4)$) of characters $X_3$ and $X_4$ being substantially the same as each other. The frequencies of use of the characters displayed in the digital keyboard 28 may be calculated using well-known techniques of analysis on a large corpus of text.

The dynamically re-positionable digital keyboard 28 minimizes the need for repositioning the pointing device and instead operates on the basis of repositioning the digital keyboard 28 relative to the pointing device. Making the digital keyboard 28 dynamically re-positionable also provides uniform movement for a particular character resulting in a more intuitive keyboard and a more intuitive data entry mechanism. When combined in a single embodiment, the character frequency distribution and the dynamically re-positionable aspects of the digital keyboard 28 further reduce the movement required for the pointing device when characters are to be selected from the digital keyboard 28.

Candidate Selection

In the first embodiment described earlier above, completion candidates are selected from the interactive search list 30 by way of gestures. Alternatively, other forms of candidate selection may be performed with pointing devices. For instance, if gesture-based selection is not desired for a particular implementation, candidates may be selected based on their location in the interactive search list 30. As another example, when the data entry system 26 is programmed to receive input from a mouse having two or more buttons, the data entry system 26 can be programmed to use input from one mouse button to toggle between activating and deactivating the interactive search list 30, and to use input from a second mouse button to insert a completion candidate from the interactive search list 30 into the text when the interactive search list 30 is active and the mouse has been used to highlight that completion candidate. In this latter case, the data entry system 26 may also be programmed to use input from the second mouse button as a trigger to select a key from the digital keyboard 28 if the mouse's cursor position (i.e. the mouse's position coordinates) on the graphical user interface 34 is associated with a key on the digital keyboard 28 at the time input from the second mouse button is received.

In another aspect, candidate selection using the interactive search list 30 may be modified to replace the time delay-based technique for triggering the activation of the interactive search list 30 or for triggering iterative searching, with other forms of input indicators from the pointing device. For instance, with a mouse, an input signal from a mouse button when the mouse position is located over a particular function button or location on graphical user interface 34 or when a double click signal from that mouse button is received by the data entry system 26.

Interactive Search List Layout

Although the interactive search list 30 is displayed in the first embodiment (FIG. 1 to 5) as a vertical list of completion candidates, the interactive search list 30 can be displayed in several different ways depending upon which options the data entry system 26 has been programmed with and which of those options have been selected by the user. There are four main considerations for the display of the interactive search list 30. The first is where the interactive search list 30 is to be positioned within the graphical user interface 34. The second is whether the interactive search list 30 is continuously visible or not. The third consideration is the type of interactive search list, more specifically, how the completion candidates in the interactive search list 30 are arranged visually within the graphical user interface 34. The fourth consideration is whether the interactive search list 30 replaces the digital keyboard 30 or whether the interactive search list 30, when active, temporarily appears remote from or superimposed over a portion of the digital keyboard 30.

In an alternative to swapping the display of the interactive search list 30 with the digital keyboard 28, the interactive search list 30 may be displayed in a fixed location within the graphical user interface 34. In another variation, the interactive search list 30 may be docked with the digital keyboard 28, when it is repositionable, and displayed continuously. With either the docked or fixed location interactive search list 30, the results of automated searching are continuously displayed within the interactive search list 30 as the user enters characters with the digital keyboard 28 or uses the interactive search list 30 itself (as illustrated by block 213B and 254 of FIGS. 23 and 24). Activating a docked or fixed location interactive search list 30 can be achieved by pausing with the pointing device on a keyboard character selected within the digital keyboard 28. As soon as the predetermined time limit L1 has expired, the interactive search list 30 becomes active. At this point, if the user wishes, the user can select one of the completion candidates (if any) within the interactive search list 30 or the user can return to keyboard mode and continue adding to or otherwise modifying the current partial text entry from the digital keyboard 28. In a further variation, the interactive search list 30, when arranged in a docked or fixed location, may be continuously updated with potential completion candidates based on the current contents of the search string being constructed by the user via the digital keyboard 28. In this variation, the user can simply continue adding characters to the end of the current partial text entry one character at a time via the digital keyboard 28 so as to continue building the desired word, phrase, or character sequence until such time as the desired completion candidate or a partial completion candidate thereof appears in the interactive search list 30. In a further alternative, the interactive search list 30, when activated, may be shown superimposed over a portion of the digital keyboard 28.

The digital keyboard 28 may be instructed to make itself visible or invisible to view on the graphical user interface 34. For instance, in the first embodiment in FIG. 1 to 5 the digital keyboard 28 may be programmed to be displayed on the graphical user interface 34 in response to a user selection on the personal computing device, and to be hidden (or cleared) from view in response to another user selection. This feature also provides, for example, the option for the application 27 to instruct the digital keyboard 28 when to be visible and when to be invisible. Preferably, the application 27 is programmed to decide when and where the digital keyboard 28 is to be displayed. This feature can be applied to many types of personal computing devices including, for example, where a touch-sensitive screen is used, or where the digital keyboard 28 is displayed on a display device that is separate from the hardware input interface 17 such as with a data tablet, a proximity sensing input surface or an equivalent input interface. For example, the hardware input interface can be located on a remote control device used to control when the digital keyboard 28 is displayed on a television or a remotely located computer display. With a proximity sensing input surface, the digital keyboard can be displayed when the pointing device is detected within a set predetermined distance of a proximity sensing input surface, and the digital keyboard can be hidden when the pointing device is not detected within the set predetermined distance of the proximity sensing input surface. As another example, if a proximity sensing input surface is used capable of position sensing, then when a stylus or the like is lifted a set predetermined distance from the proximity sensing input surface, the application 27 can instruct the digital keyboard 28 to become invisible so as to swap to full text mode. When the stylus or the like is brought back within the set predetermined distance of the proximity sensing input surface, the application 27 reactivates the display of the digital keyboard 28 over position coordinates associated with the position of the pointing device over the proximity sensing input surface or to an area remote to the pointing device. Variations on handling text entry with the proximity sensing input surface are discussed further on below.

The API for the data entry system 26 also allows the application 27 to programmatically change the partial text entry which is used for searching. For example, the user of a text editor might place the cursor after a word or character sequence and the application 27 could then tell the data entry system 26 to use that word or character sequence as a partial text entry for further searching.

Types of Interactive Search List Layouts

Figure 14:
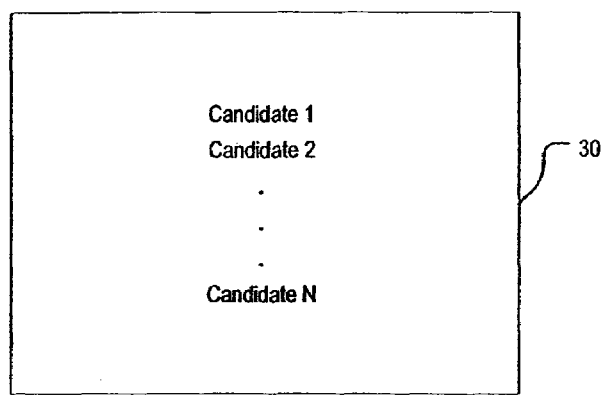
FIG. 14 is a schematic representation of the layout for the interactive search list according to the first embodiment.
Figure 15:
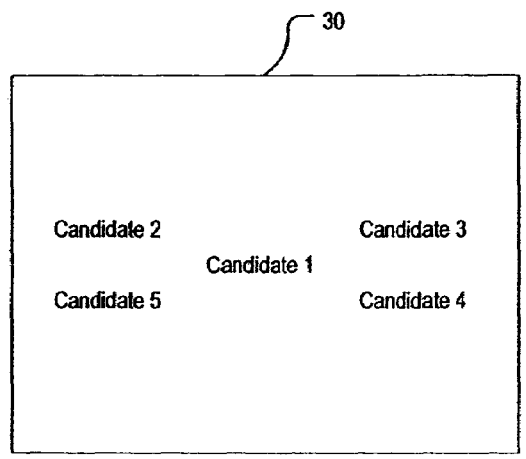
FIG. 15 to 18 are schematic representations of alternative layouts for the interactive search list according to alternate embodiments of the present invention.
Figure 16:
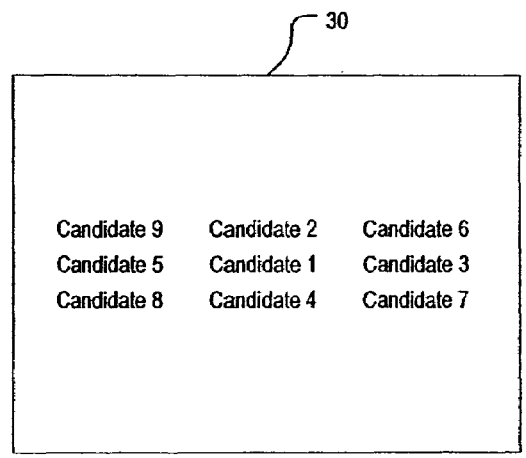
Figure 17:
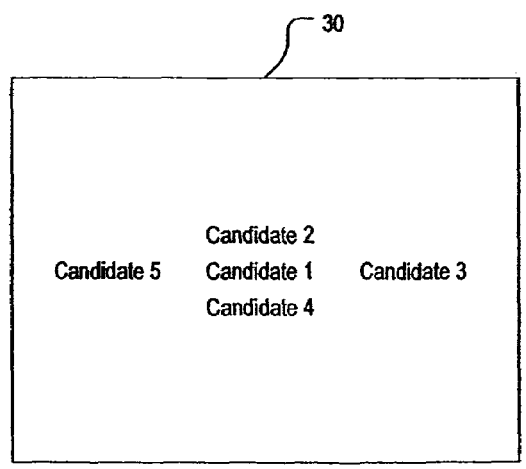
Figure 18:
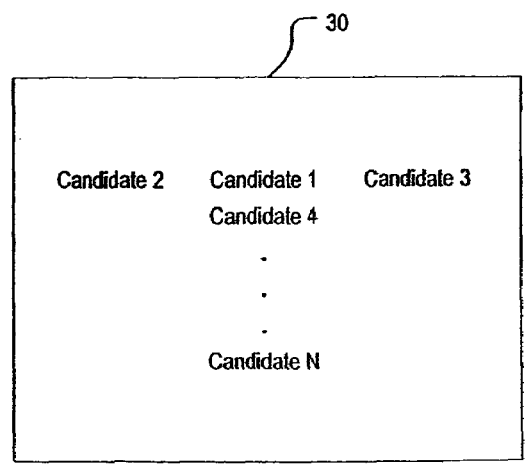

Several alternative layouts for the interactive search list 30 may be used by the data entry system 26. In the first embodiment, a vertical list of completion candidates is used, as further illustrated in FIG. 14. In other layouts, completion candidates within the interactive search list 30 may be displayed in an X configuration (FIG. 15), in a rectangular configuration (FIG. 16), in a cross configuration (FIG. 17), in a T configuration (FIG. 18), or in a horizontal configuration. With the X configuration, one completion candidate is preferably located slightly offset in the x-axis or y-axis from a central location within the X configuration and surrounded by four or more completion candidates located within the north-west, north-east, south-west, and south-east directions (relative to the central completion candidate displayed). With an X configuration of the search list (like the one above) a unique direction is provided for each of the five completion candidates displayed in the list, so as to minimize pen movement. For the cross configuration, a substantially centrally displayed completion candidate within the interactive search list 30 is surrounded by up to four completion candidates in the north, east, south, and west directions (relative to the central completion candidate displayed).

Interactive Search List Configuration

When the digital keyboard 28 is programmed to share the same display space on the graphical user interface 34 as the interactive search list 30, it is preferable that the data entry system 26 is also programmed to display all completion candidates near the last known position coordinates for the pointing device so that they are slightly off-set from the x-axis or y-axis of the last known position coordinates so as to minimize the degree to which such completion candidates in the interactive search list 30 are obscured from the user's view by the pointing device. This feature can be particularly useful when the pointing device is a pen or finger and the user interfaces with a touch-sensitive screen 14. In this way, the interactive search list may be displayed in a location which makes it easily visible and accessible to the user.

In another variation, when the digital keyboard 28 and the interactive search list 30 are interchangeably displayed, the list of completion candidates within the interactive search list 30 can be displayed such that the most common of the completion candidates is displayed closest to the last known position coordinates of the pointing device while the other completion candidates within the interactive search list 30 are displayed further away from the last known position coordinates of the pointing device relative to the most common of the completion candidates. This variation results in a frequency distributed interactive search list 30 which can assist in further minimizing the amount of motion required with the pointing device in order to use and select from the interactive search list 30.

Figure 19:
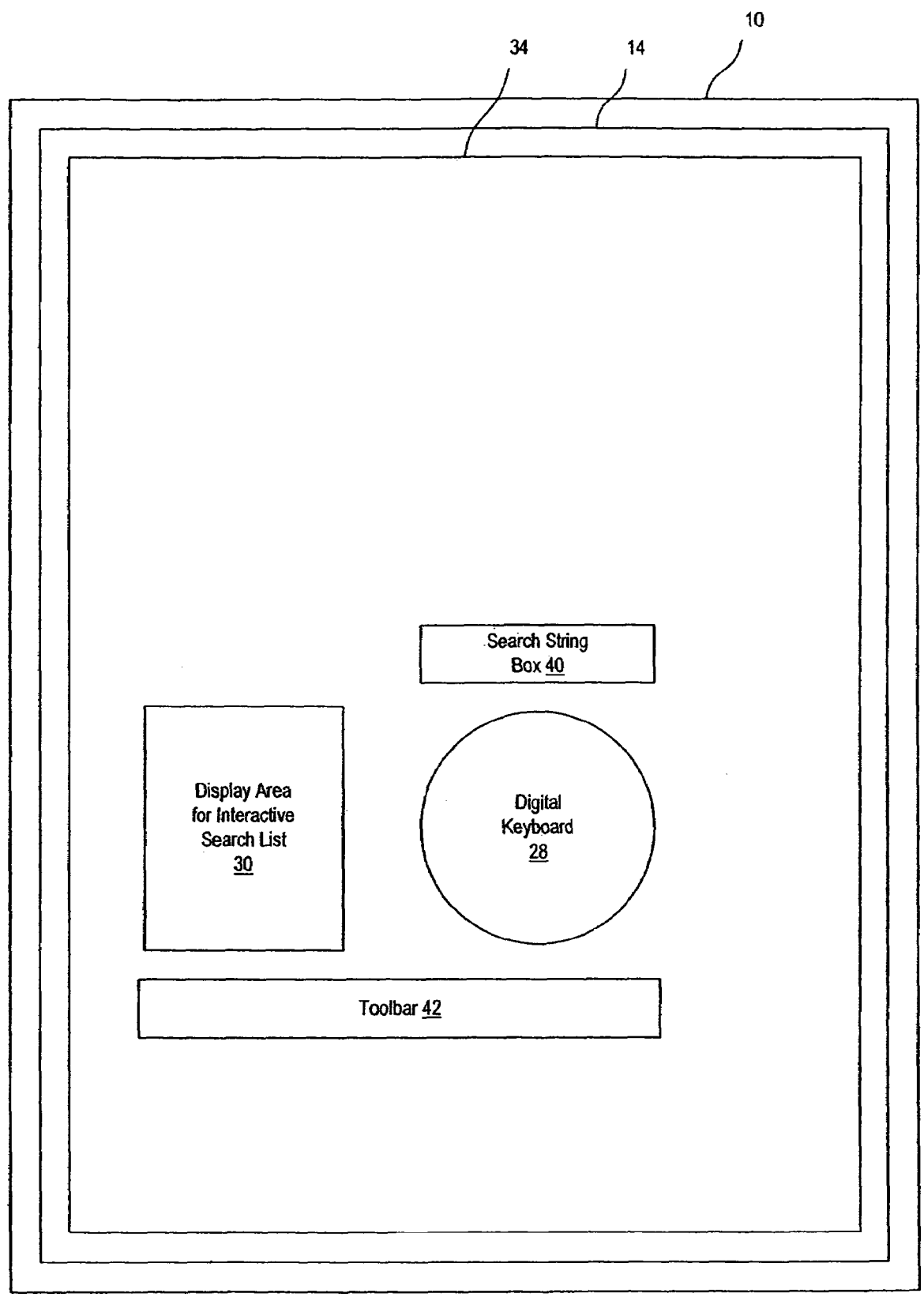
FIG. 19 is a schematic representation of a configuration for the digital keyboard and the interactive search list according to an embodiment of the present invention.
Figure 20:
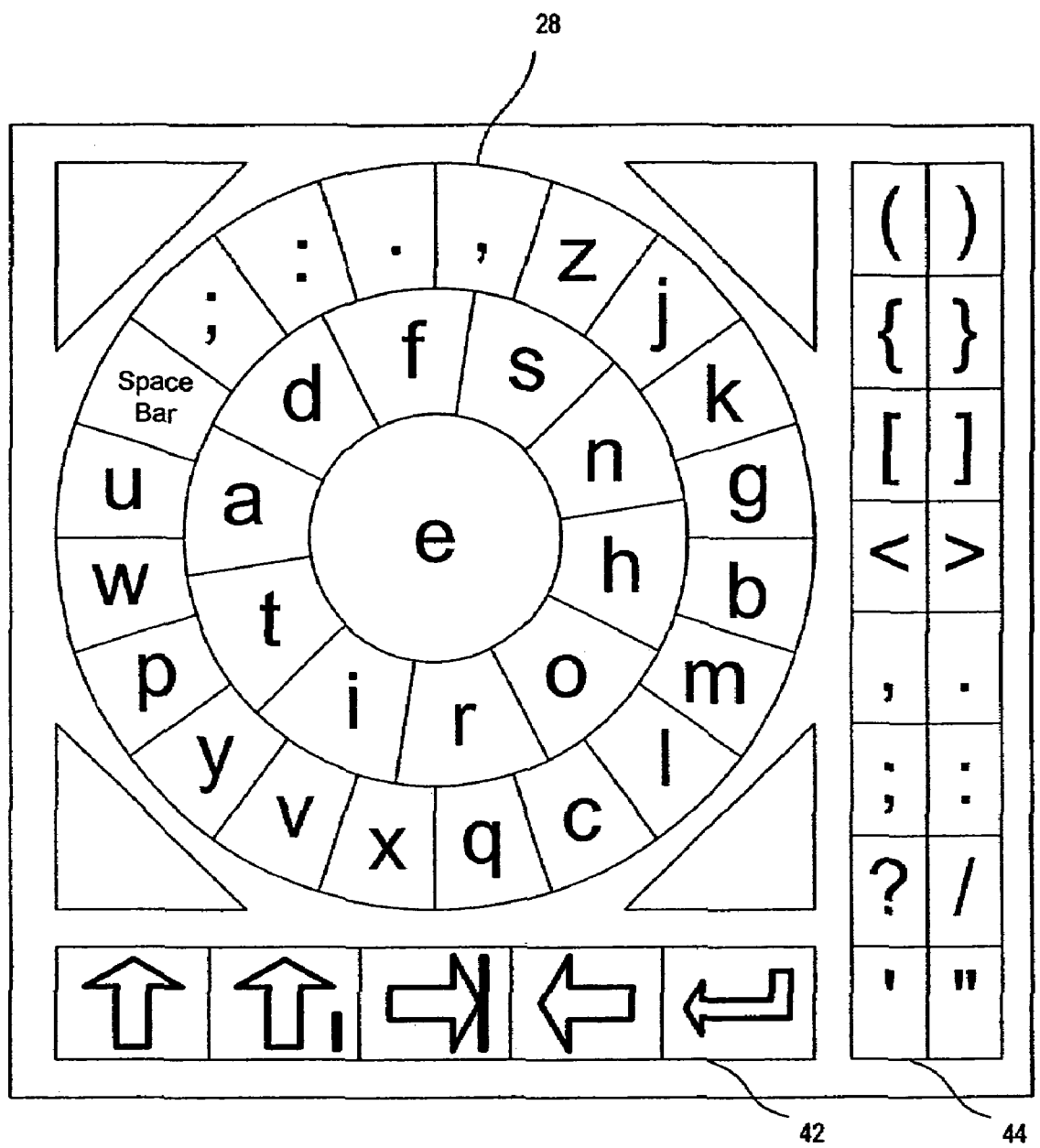
FIG. 20 is a schematic representation of an alternative configuration for the digital keyboard according to an embodiment of the present invention.

As illustrated in FIG. 19, in another variation, both the digital keyboard 28 and the interactive search list 30 may be continuously displayed within fixed separate locations on the graphical user interface 34, along with a search string window 40 used to display the current contents of the search string. A tool bar 42 may also be displayed to identify predefined functions and commands that may be selected by the user while using the data entry system 26. When the tool bar 42 is included in the dynamically re-positionable configuration for the digital keyboard 28, the tool bar 42 may be repositioned dynamically along with the digital keyboard 28, or the tool bar 42 may be located and remain in a fixed location within the graphical user interface 34. As illustrated in FIG. 20, whenever the digital keyboard 28 is displayed, with or without the interactive search list 30, a toolbar 42 and additional character layouts 44 may be used to enhance the functionality for the user while using the digital keyboard 28.

In another aspect of the present invention, a commonly used word or character sequence may appear in the same position each time such a word or character sequence is displayed in a search list. This helps the user become familiar with the location of such a word or character sequence within the search list, and thereby helps the user to access such a word or character sequence more readily.

In another alternative embodiment, as the user begins to learn the position of common words within a search list, the user may begin to know which gesture is required to enter a certain word even before the predetermined delay period L1 has expired and the search list is displayed. In this case, the date entry system 26 may be programmed to recognize such gestures even before the predetermined delay period L1 has expired and the interactive search list 30 is displayed.

In another alternative embodiment, the interactive search list may display completion candidates with the part of each completion candidate matching the search string displayed in a different manner (for example a different color, font, or boldness) than the remaining parts of the completion candidates. For example, if the remaining parts were significantly bolder than the part of the completion candidates matching the search string, the user's eye can be drawn to those portions which distinguish the completion candidates on the interactive search list from one another, therefore facilitating selection of the desired completion candidate.

Tracking the Movement of the Pointing Device

In another variation, when a stylus (or pen, finger or the like) is used with a touch-sensitive or pressure-sensitive input surface (e.g. a touch-sensitive screen, a data tablet or input pad), the data entry system 26 may be programmed to determine whether or not the position of a cursor displayed on the graphical user interface 34 tracks the stylus position precisely or whether it moves relatively to the stylus movement. In the first case, if the cursor position tracks the stylus position precisely, then the stylus and cursor function like a mouse and the cursor on a conventional user interface and the position of the cursor tracks precisely the position of the stylus tip on the hardware input surface (i.e. the last known position coordinates for the stylus).

In the second case, the cursor displayed on the graphical user interface 34 is moved by a distance proportional to the movement with the stylus. This latter behaviour can come into effect when the interactive search list 30 is displayed. For instance, when moving up a vertical list of completion candidates, the cursor can move up faster than the actual physical movement of the stylus.

In either case, the stylus (or other pointing device) can be used locally on the display device if it is a touch-sensitive screen, or remotely such as with a data tablet, a proximity-sensing input interface, or with the character input space on a Palm Pilot™ or another hand-held personal computing device.

Figure 27:
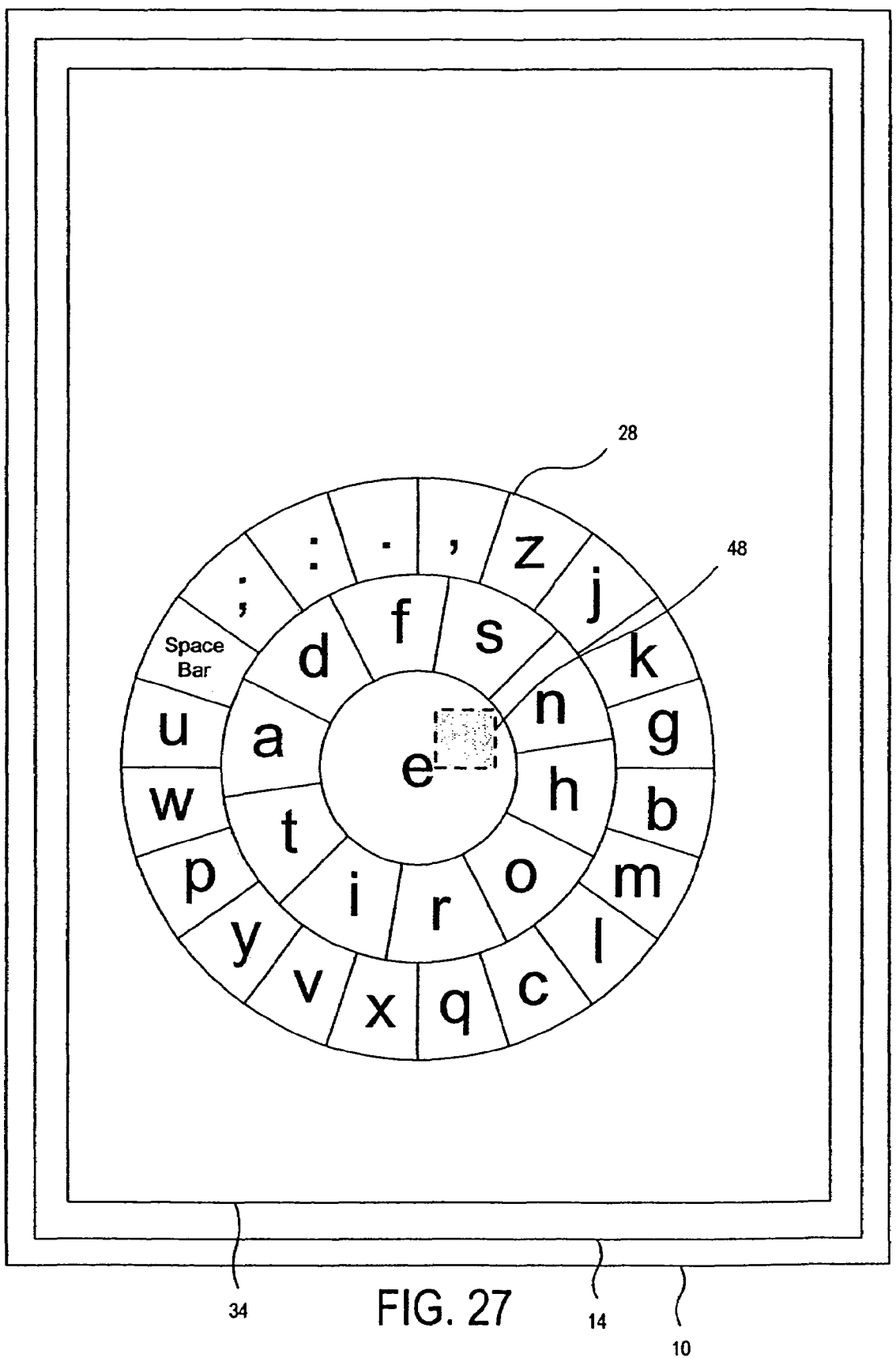
FIG. 27 is a schematic representation of an alternative configuration for the digital keyboard according to an embodiment of the present invention.

Using the cursor to track the position coordinates of the pointing device can help the user keep their attention on the digital keyboard 28 or the interactive search list 30 displayed on the display device 15 without having to be distracted with looking at the physical position of the pointing device (see, for instance, cursor 48 as illustrated in FIG. 27). This can be helpful when, for example, a data tablet or input pad is used and is located remote from the display area of the graphical display device 15 where the digital keyboard 28 or the interactive search list 30 (or both) are displayed. Also, using the cursor to remotely track the movement of the stylus, pen or finger provides a mechanism for using the digital keyboard 28 and the interactive search list 30 without obscuring them from the user's view with the stylus, pen or finger.

When the data entry system 26 is programmed to use the cursor to remotely track the movement of the stylus, pen or finger, the cursor may be displayed over the digital keyboard 28 when the data entry system 26 is in keyboard mode, and the cursor may be programmed to relocate to the center of the digital keyboard 28 whenever a character from the keyboard or a completion candidate from the interactive search list 30 is selected. Once the cursor is centered in the digital keyboard 28, further movements with the pointing device can be used to make selections from the digital keyboard 28 as if the pointing device were physically centered about the center of the digital keyboard 28. In this variation, the digital keyboard 28 is displayed in a fixed remote location on the graphical user interface 34. With this variation, the user is not visually distracted by movement of the digital keyboard 28, while enjoying many of the advantages of the dynamically re-positionable digital keyboard 28. For instance, when the cursor relocates to the center of the digital keyboard 28 when the keyboard is active and waiting for user input, a particular character on the digital keyboard 28 remains the same distance and direction from the pointing device no matter what input was made last with the pointing device. This feature of the cursor enables the user to incorporate unconscious learning and therefore, learned efficiency. When a frequency distributed keyboard layout is used with most frequently used characters located near a central location, relocating the cursor to the center of the digital keyboard 28 enables ready access to the characters most likely to be chosen next, thereby reducing finger movement and increasing efficiency.

In one variation, the movement of the cursor need not necessarily be directly proportional to the movement of the pointing device. In this variation, the data entry system 26 is programmed so that moving the pointing device a small distance equates to moving the cursor a larger distance on the digital keyboard 28 or the interactive search list 30. This variation uses scaling to minimize the movement required to accurately distinguish and select characters from the digital keyboard 28 and completion candidates from the interactive search list 30. In another variation, the distance of the cursor movement may be related by the data entry system 26 to the speed that the pointing device moves, so that the faster the movement with the pointing device, the greater the distance traveled by the cursor, and the slower the movement of the pointing device, the less distance traveled by the cursor on the graphical user interface 34.

It will be appreciated, as indicated above, that when the pointing device is used on a digital keyboard that is displayed in a location remote from the pointing device, such as where the pointing device is a mouse, a finger on a touch sensitive palette, or a stylus. In such cases the digital keyboard is not displayed under the pointing device, but is viewed on a display device, and pointer motion is seen as relative motions of a cursor displayed on the digital keyboard. In these cases characters on the digital keyboard are not obscured.

Obtaining Completion Candidates of Specific Type or Minimum Length

In another aspect of the present invention, a special display area containing a series of numbers are displayed as part of or in association with the digital keyboard 28 to enable the user to rapidly instruct the data entry system 26 to obtain and display in the interactive search list 30 completion candidates having at least a minimum number of characters. In this aspect, when a user selects one of the characters on the digital keyboard 28 followed by one of the numbers in the special display area, the data entry system 26 is programmed to have the candidate prediction system 32 obtain from the dictionary 20 completion candidates beginning with the selected character and having at least as many characters as the number that was selected by the user from the special display area. Alternatively, the user may type in a number from the special display area, followed by holding down on one of the characters on the digital keyboard 28 to instruct the data entry system 26 to have the candidate prediction system 32 obtain from the dictionary 20 completion candidates beginning with the selected character and having at least as many characters as the number that was selected by the user from the special display area. In another variation, the data entry system 26 may be programmed so that when the user touches a number from the special display area and lifts the pointing device, the data entry system 26 retrieves a list of completion candidates having a number of characters equal to the number selected touched on the special display area. In yet another variation, the data entry system 26 may be programmed to obtain completion candidates of at least a predetermined length when the user selects a number from the special display area with the pointing device, gestures a significant distance in a predetermined direction (for example, to the right), lifts up the pointing device, touches down on a character on the digital keyboard 28 and then pauses on that character. In yet a further variation, another special display area may be included with the digital keyboard 28 from which the category of completion candidates can be narrowed. In this further special display area, for example, the data entry system 26 may be programmed to display general identifiers for nouns, verbs, adjectives, etc. If a general identifier is selected by the user before the interactive search list 30 is activated, the data entry system 26 in this variation is programmed to have the candidate prediction system 32 obtain completion candidates that are identified in the dictionary 20 as falling within the category associated with the selected identifier (for example, only nouns, or only verbs). This variation may be combined with the other aspects herein to assist the user in obtaining completion candidates of one or more specific categories identified in the dictionary 20.

In another aspect, a physical button or switch located on the personal computing device, or on the pointing device, and within easy reach of a user's finger or hand, may be used to easily activate certain features of the data entry system 26. As an example, when the button on the personal computing device is pressed, the data entry system 26 may be programmed to make, with each press, the digital keyboard 28 invisible or visible. Alternatively, the data entry system 26 may be programmed to recognize that if the button or switch is pressed, the interactive search list 30, when displayed, should display only certain types of completion candidates available within the dictionary. As another example, when the button is depressed, the data entry system 26 may be programmed to activate the interactive search list 30. As another example, when the button on the personal computing device is pressed, the data entry system 26 may be programmed to require that the interactive search list 30 display completion candidates of a certain minimum length of characters.

Proximity Triggered Display of Digital Keyboard

In another variation, a stylus (or pen or finger or like handheld pointing device) is used with a proximity sensing input surface. Proximity sensing input surfaces can detect the proximity of a pointing device to the input surface as well as the location of the pointing device over the proximity sensing input surface. The proximity sensing input surface may also detect the distance and angle that a pointing device is being held relative to the input surface. When a proximity sensing input surface is used, the data entry system 26 can be programmed so as to display the digital keyboard 28 (or another digital keyboard) with the cursor displayed over it when the stylus approaches within a set predetermined distance of the proximity sensing input surface. The proximity sensing input surface detects the position of the stylus over the proximity sensing input surface when the stylus is within the set predetermined distance. As the user moves the pointing device over the proximity sensing input surface, the cursor moves correspondingly. The digital keyboard 28 can be displayed directly beneath the stylus in some embodiments or, for other embodiments, remote from the stylus. When the stylus is moved away from the proximity sensing input surface further than the set predetermined distance, the data entry system 26 is programmed to hide (or clear) the digital keyboard 28 from the graphical user interface 34. This variation enables the entire screen to be used to display text while the digital keyboard 28 is hidden. This variation also avoids screen clutter by displaying the digital keyboard 28 only when the stylus is found to be within the set predetermined distance of the proximity sensing input surface. At the same time, the user can quickly and intuitively return to adding to or deleting from the text using the digital keyboard 28 by bringing the stylus within the set predetermined distance of the proximity sensitive input surface. Thus, the digital keyboard 28 is displayed when the user's hand controlling the stylus (the "typing hand") is placed in a natural position for continuing text and data entry. The location where the digital keyboard 28 is displayed on the graphical user interface 34 may be near and possibly follow the line of text under construction by the user, so as to facilitate the eye following the digital keyboard 28 and the entered text simultaneously. In another variation, the digital keyboard 28 can be displayed in the same location as the stylus. In another variation, the digital keyboard 28 is programmed to be displayed just below or above the line of text that the user is creating or editing on a personal computing device. These variations also allow the user to view the digital keyboard 28 and the text simultaneously.

As an alternative to the above variation, if the user wishes to use the stylus (or pen or finger) to reposition the cursor within previously typed text, the data entry system 26 may be programmed to allow for the cursor to be repositioned within previously typed text with the stylus while the stylus is within the minimum distance, provided the stylus is detected as approaching the proximity sensing input surface from a particular side of the input surface (for example, the right side of the proximity sensing input surface). Once the cursor was repositioned, the user could then approach the proximity sensing input surface from another direction (for example, from above) to trigger the display of the digital keyboard 28 to assist with further text entry and modification.

In the first embodiment, the data entry system 26 is application independent and communicates with applications via an API. In an alternative embodiment, the data entry system 26 may be embedded in an application.

It will be appreciated that many of the aspects of the present invention may be applied to several types of digital keyboards and keyboard layouts, including traditional keyboard layouts, and rectangular keyboard layouts. It will also be appreciated that the digital keyboard may contain other symbols that could encode a language. One example of this would be a digital keyboard that contains regions representing the strokes used in writing an oriental language. The user would select the strokes by pointing to them, and the characters would be constructed from the strokes.

Although this invention has been described with reference to illustrative and preferred embodiments of carrying out the invention, this description is not to be construed in a limiting sense. Various modifications of form, arrangement of parts, steps, details and order of operations of the embodiments illustrated, as well as other embodiments of the invention, will be apparent to persons skilled in the art upon reference to this description. It is therefore contemplated that the appended claims will cover such modifications and embodiments as fall within the true scope of the invention.

What is claimed is:

1. A method of supporting text entry on a personal computing device by using automated searching to search for completion candidates which are based on a partial text entry received from a user, the method comprising:
   (a) receiving a user input signal which corresponds to activating the automated searching;
   (b) in response to receiving the user input signal, obtaining a list of completion candidates and providing the list of completion candidates for display in a search list;
   (c) receiving a further user input signal;
   (d) if the further user input signal corresponds to declining all of the completion candidates displayed in the search list, terminating the automated searching with no consequence to the text entered into the personal computing device;
   (e) if the further user input signal corresponds to accepting a completion candidate from among the completion candidates in the search list to replace the partial text entry and to terminate the automated searching, terminating the automated searching and causing the partial text entry to become the accepted completion candidate; and
   (f) if the user input signal corresponds to selecting a completion candidate from the search list to initiate further searching, obtaining a new list of completion candidates based on the selected completion candidate and displaying the new list of completion candidates in the search list for further selection, wherein the new list of completion candidates is obtained if a completion candidate in the search list remains selected for a predetermined time limit.

2. The method of claim 1, further comprising
   (a) receiving at least part of the partial text entry via a digital keyboard displayed in a graphical user interface; and
   (b) displaying the search list while not displaying the digital keyboard within the graphical user interface in response to obtaining the new list of completion candidates.

3. A computer-readable medium having stored instructions for directing a processor unit to execute the method of claim 2.

4. A method of supporting text entry on a personal computing device by using automated searching to search for completion candidates which are based on a partial text entry received from a user, the method comprising:
   (a) receiving a user input signal caused by user input associated with a digital keyboard displayed in a graphical user interface, the user input signal corresponding to activating the automated searching;
   (b) in response to receiving the user input signal, obtaining a list of completion candidates and causing the list of completion candidates to be displayed in a search list in the graphical user interface while the digital keyboard is not displayed in the graphical user interface;
   (c) receiving a further user input signal;
   (d) if the further user input signal corresponds to declining all of the completion candidates displayed in the search list, causing the digital keyboard to be redisplayed in the graphical user interface; and
   (e) if the further user input signal corresponds to accepting a completion candidate from among the completion candidates in the search list to replace the partial text entry and to terminate the automated searching, terminating the automated searching and causing the partial text entry to become the accepted completion candidate;
   wherein the automated search is terminated if the further user input signal indicates selection, for less than a predetermined time limit, of the completion candidate from among the completion candidates in the search list.

5. The method of claim 4, wherein the user input signal received corresponds to activating the automated searching in response to selection by the user of a particular key from a plurality of keys, and wherein the particular key identifies the first character of the partial text entry.

6. The method of claim 5, wherein each completion candidate in the list of completion candidates begins with the partial text entry.

7. The method of claim 6, wherein the part of a particular completion candidate in the list of completion candidates that matches the partial text entry is represented for display in a manner different from the remaining part of the particular completion candidate.

8. A computer-readable medium having stored instructions for directing a processor unit to execute the method of claim 7.

9. The method of claim 6, further comprising:
   (a) if the further user input signal corresponds to selecting a completion candidate from among the completion candidates in the search list to initiate further searching,
      (i) obtaining a new list of completion candidates based on the selected completion candidate, and
      (ii) providing the new list of completion candidates for display in the search list for further selection by the user.

10. A computer-readable medium having stored instructions for directing a processor unit to execute the method of claim 9.

11. A computer-readable medium having stored instructions for directing a processor unit to execute the method of claim 6.

12. A computer-readable medium having stored instructions for directing a processor unit to execute the method of claim 5.

13. The method of claim 4, wherein the user input signal received corresponds to activating the automated searching if a character associated with the digital keyboard remains selected for the predetermined time limit.

14. A computer-readable medium having stored instructions for directing a processor unit to execute the method of claim 13.

15. A computer-readable medium having stored instructions for directing a processor unit to execute the method of claim 4.

16. A method of supporting text entry on a personal computing device by using automated searching to search for completion candidates which are based on a partial text entry received from a user, the method comprising:
(a) receiving a user input signal caused by user input associated with a digital keyboard displayed in a graphical user interface, the user input signal corresponding to activating the automated searching;
(b) in response to receiving the user input signal, obtaining a list of completion candidates and causing the list of completion candidates to be displayed in a search list in the graphical user interface while the digital keyboard is not displayed in the graphical user interface;
(c) receiving a further user input signal;
(d) if the further user input signal corresponds to declining all of the completion candidates displayed in the search list, causing the digital keyboard to be redisplayed in the graphical user interface;
(e) if the further user input signal indicates selection, for less than a predetermined time limit, of the completion candidate from among the completion candidates in the search list, accepting the completion candidate from among the completion candidates in the search list to replace the partial text entry and terminating the automated searching, accepting the completion candidate from among the completion candidates in the search list to replace the partial text entry and terminating the automated searching; and
(f) if the further user input signal does not indicate selection, for less than the predetermined time limit, of the completion candidate from among the completion candidates in the search list, not accepting the completion candidate from among the completion candidates in the search list to replace the partial text entry.

17. A computer-readable medium having stored instructions for directing a processor unit to execute the method of claim 16.

18. The method of claim 16, wherein the user input signal received corresponds to activating the automated searching in response to selection by the user of a particular key from a plurality of keys, and wherein the particular key identifies the first character of the partial text entry.

19. The method of claim 18, wherein each completion candidate in the list of completion candidates begins with the partial text entry.

20. The method of claim 19, wherein the part of a particular completion candidate in the list of completion candidates that matches the partial text entry is represented for display in a manner different from the remaining part of the particular completion candidate.

21. A computer-readable medium having stored instructions for directing a processor unit to execute the method of claim 20.

22. The method of claim 19, further comprising:
(a) if the further user input signal corresponds to selecting a completion candidate from among the completion candidates in the search list to initiate further searching,
(i) obtaining a new list of completion candidates based on the selected completion candidate, and
(ii) providing the new list of completion candidates for display in the search list for further selection by the user.

23. A computer-readable medium having stored instructions for directing a processor unit to execute the method of claim 22.

24. A computer-readable medium having stored instructions for directing a processor unit to execute the method of claim 19.

25. A computer-readable medium having stored instructions for directing a processor unit to execute the method of claim 18.

26. The method of claim 16, wherein the user input signal received corresponds to activating the automated searching if a character associated with the digital keyboard remains selected for the predetermined time limit.

27. A computer-readable medium having stored instructions for directing a processor unit to execute the method of claim 26.

28. A computer-readable medium having stored instructions for directing a processor unit to execute the method of claim 1.

29. A system for supporting text entry on a personal computing device by using automated searching to search for completion candidates which are based on a partial text entry received from a user, the system comprising:
(a) means for receiving a user input signal caused by user input associated with a digital keyboard displayed in a graphical user interface, the user input signal corresponding to activating the automated searching;
(b) means for obtaining a list of completion candidates and causing the list of completion candidates to be displayed in a search list in the graphical user interface while the digital keyboard is not displayed in the graphical user interface, in response to receiving the user input signal;
(c) means for receiving a further user input signal;
(d) means for causing the digital keyboard to be redisplayed in the graphical user interface, if the further user input signal corresponds to declining all of the completion candidates displayed in the search list; and
(e) means for terminating the automated searching and causing the partial text entry to become a particular completion candidate, if the further user input signal corresponds to accepting the particular completion candidate from among the completion candidates in the search list to replace the partial text entry and to terminate the automated searching, wherein accepting the particular completion candidate includes selecting the particular completion candidate for less than a predetermined time limit.

* * * * *